(12) United States Patent
Aramoto et al.

(10) Patent No.: US 11,419,048 B2
(45) Date of Patent: Aug. 16, 2022

(54) UE AND COMMUNICATION METHOD FOR SAME

(71) Applicants: SHARP KABUSHIKI KAISHA, Sakai (JP); FG Innovation Company Limited, Tuen Mun (HK)

(72) Inventors: Masafumi Aramoto, Sakai (JP); Tsuyoshi Takakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 52 days.

(21) Appl. No.: 17/254,662

(22) PCT Filed: Jun. 20, 2019

(86) PCT No.: PCT/JP2019/024600
§ 371 (c)(1),
(2) Date: Dec. 21, 2020

(87) PCT Pub. No.: WO2019/245001
PCT Pub. Date: Dec. 26, 2019

(65) Prior Publication Data
US 2021/0227455 A1 Jul. 22, 2021

(30) Foreign Application Priority Data
Jun. 21, 2018 (JP) .............................. JP2018-117939

(51) Int. Cl.
*H04W 48/18* (2009.01)
*H04W 28/02* (2009.01)
(Continued)

(52) U.S. Cl.
CPC ....... *H04W 48/18* (2013.01); *H04W 28/0289* (2013.01); *H04W 80/10* (2013.01)

(58) Field of Classification Search
CPC . H04W 48/18; H04W 28/0289; H04W 80/10; H04W 8/065; H04W 60/00; H04W 76/18; H04L 47/12
See application file for complete search history.

(56) References Cited

U.S. PATENT DOCUMENTS

2020/0178196 A1* 6/2020 Wang .................... H04W 48/18
2020/0389830 A1* 12/2020 Park .................. H04W 28/0226
(Continued)

OTHER PUBLICATIONS

Sharp, "Clarification on SM congestion control specific to PLMN", C1-184402, 3GPP TSG-CT WG1 Meeting #111bis, Sophia-Antipolis (France), Jul. 9-13, 2018.
(Continued)

*Primary Examiner* — Eunsook Choi
(74) *Attorney, Agent, or Firm* — ScienBiziP, P.C.

(57) ABSTRACT

A User Equipment (UE) includes a transmitter configured to, in a case that, at a time when a Public Land Mobile Network (PLMN) is changed, a first timer is running for a certain Data Network Name (DNN) and an old PLMN but that a second timer is not running for the DNN or a new PLMN and is not deactivated, be capable of transmitting a PDU session establishment request message for the DNN or no DNN in the new PLMN without stopping the first timer for the DNN and the old PLMN. Thus, a communication control method is provided that is used in a case that, in 5G congestion control in which multiple types of congestion control are applied, the PLMN is changed during application of the congestion control.

5 Claims, 12 Drawing Sheets

(51) Int. Cl.
   *H04L 47/12*   (2022.01)
   *H04W 80/10*  (2009.01)

(56) References Cited

U.S. PATENT DOCUMENTS

2021/0029628 A1* 1/2021 Kim .................... H04W 48/18
2021/0153286 A1* 5/2021 Park .................... H04W 28/24

OTHER PUBLICATIONS

Qualcomm Incorporated, "DNN and/or slice congestion applies regardless of PLMN", C1-186359, 3GPP TSG-CT WG1 Meeting #112bis, Vilnius(Lithuania), Oct. 15-19, 2018.
Sharp, "Clarification on SM congestion control specific to PLMN", C1-184744, 3GPP TSG-CT WG1 Meeting #111bis, Sophia-Antipolis (France), Jul. 9-13, 2018.
3GPP TS 23.501 V15.0.0 (Dec. 2017), 3rd Generation Partnership Project; Technical Specification Group Services and System Aspects; System Architecture for the 5G System; Stage 2 (Release 15).
3GPP TS 23.502 V15.0.0 (Dec. 2017), 3rd Generation Partnership Project; Technical Specification Group Services and System Aspects; Procedures for the 5G System; Stage 2 (Release 15).
3GPP TS 24.501 V15.0.0 (Jun. 2018), 3rd Generation Partnership Project; Technical Specification Group Core Network and Terminals; Non-Access-Stratum (NAS) protocol for 5G System (5GS); Stage 3 (Release 15).

* cited by examiner

UE AND COMMUNICATION METHOD FOR SAME

TECHNICAL FIELD

The present application relates to a UE and a communication method for the UE. This application claims priority based on JP 2018-117939 filed on Jun. 21, 2018 in Japan, the contents of which are incorporated herein in its entirety by reference.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE). The 3GPP is in the process of standardizing Evolved Packet System (EPS) as a communication system for realizing an all-Internet Protocol (IP) architecture. Note that a core network constituting the EPS is called an Evolved Packet Core (EPC).

Additionally, the 3GPP recently has been studying a next-generation communication technology and a system architecture for 5th Generation (5G) mobile communication system which is a next-generation mobile communication system. Especially, as a system for achieving the 5G mobile communication system, the 3GPP is in a process of standardizing 5G System (5GS) (see NPL 1 and NPL 2). In the 5GS, technical problems attributable to connection of various terminals to a cellular network are extracted to standardize solutions.

For example, requirement conditions include optimization and diversification of a communication procedure for supporting a continual mobile communication service depending on a terminal supporting various access networks, optimization of a system architecture suitable for the optimization and diversification of the communication procedure, and the like.

CITATION LIST

Non Patent Literature

NPL 1: 3GPP TS 23.501 v15.0.0; 3rd Generation Partnership Project; Technical Specification Group Services and System Aspects; System Architecture for the 5G system; Stage 2 (Release 15)

NPL 2: 3GPP TS 23.502 v15.0.0; 3rd Generation Partnership Project; Technical Specification Group Services and System Aspects; Procedures for the 5G System; Stage 2 (Release 15)

SUMMARY OF INVENTION

Technical Problem

For the 5GS, in addition to a mechanism providing a function corresponding to congestion control in an EPS, congestion control in Network Slices has further been studied (see NPL 1 and NPL 2).

However, in a rejection response to a terminal-initiated session management request made while congestion control corresponding to congestion control in the EPS and congestion control directed to network slices are simultaneously in effect, processing has not been clarified that is related to how the network indicates the congestion control in effect to the terminal apparatus and how the terminal apparatus, having received the rejection response, identifies the application of the congestion control expected by the network. Additionally, processing has not been clarified that is performed in a case that a network-initiated session management request is received while the terminal apparatus is keeping timers for congestion control associated with multiple types of congestion control active, the processing involving identifying the timer for the congestion control to which the session management request is directed. In addition, processing has not been clarified that is performed in a case that the Public Land Mobile Network (PLMN) is changed while the identified congestion control is in effect, the processing being related to the application of the congestion control in the resultant PLMN.

In light of the foregoing, an object of the present invention is to provide a mechanism and a communication control method for implementing management processing such as congestion control for each network slice.

Solution to Problem

A User Equipment (UE, a terminal apparatus) according to an embodiment of the present invention includes a transmitter configured to, in a case that, at a time when a Public Land Mobile Network (PLMN) is changed, a first timer is running for a certain Data Network Name (DNN) and an old PLMN but that a second timer is not running for the DNN or a new PLMN and is not deactivated, be capable of transmitting a PDU session establishment request message for the DNN or no DNN in the new PLMN without stopping the first timer for the DNN and the old PLMN.

The first timer and the second timer are timers for DNN-based congestion control.

A communication method performed by a User Equipment (UE) according to one embodiment of the present invention includes the step of, at a time when a Public Land Mobile Network (PLMN) is changed, in a case that a first timer is running for a certain Data Network Name (DNN) and an old PLMN but that a second timer is not running for the DNN or a new PLMN and is not deactivated, transmitting a PDU session establishment request message for the DNN or no DNN in the new PLMN without stopping the first timer for the DNN and the old PLMN.

The first timer and the second timer are timers for DNN-based congestion control.

Advantageous Effects of Invention

According to the present invention, the terminal apparatus constituting a 5GS and the apparatus in the core network can perform terminal apparatus-initiated or network-initiated management processing such as congestion control for each network slice and/or for each DNN or APN.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. System Overview

Figure 1:
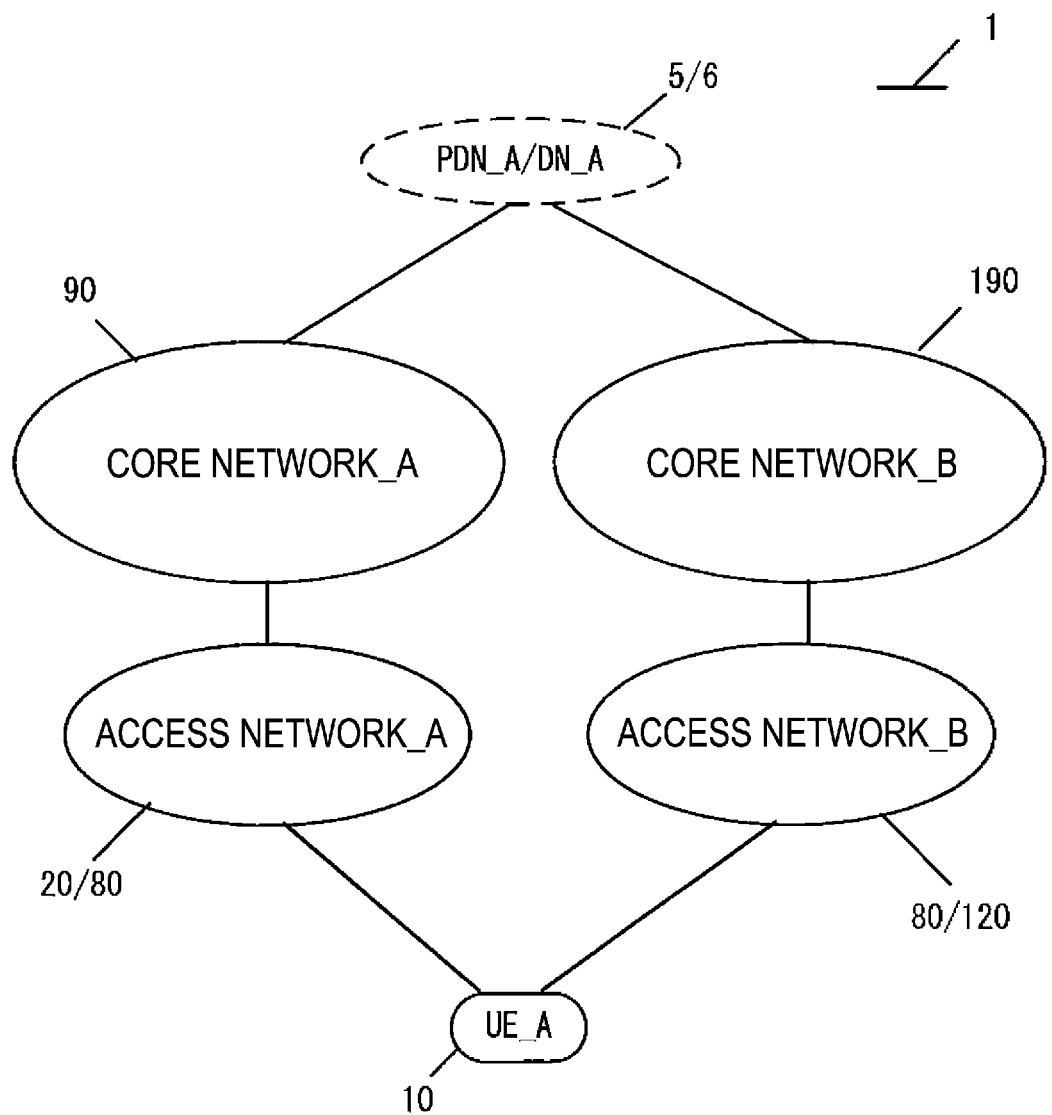
FIG. 1 is a diagram illustrating an overview of a mobile communication system.
Figure 2:
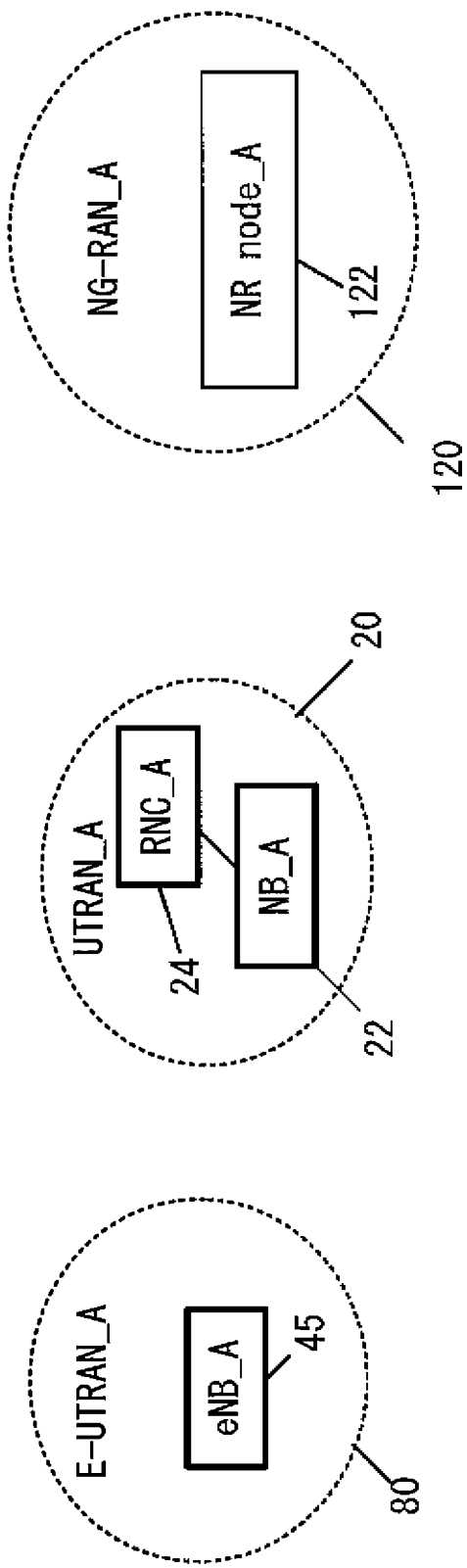
FIG. 2 is a diagram illustrating an example of a configuration and the like of access networks in the mobile communication system.
Figure 3:
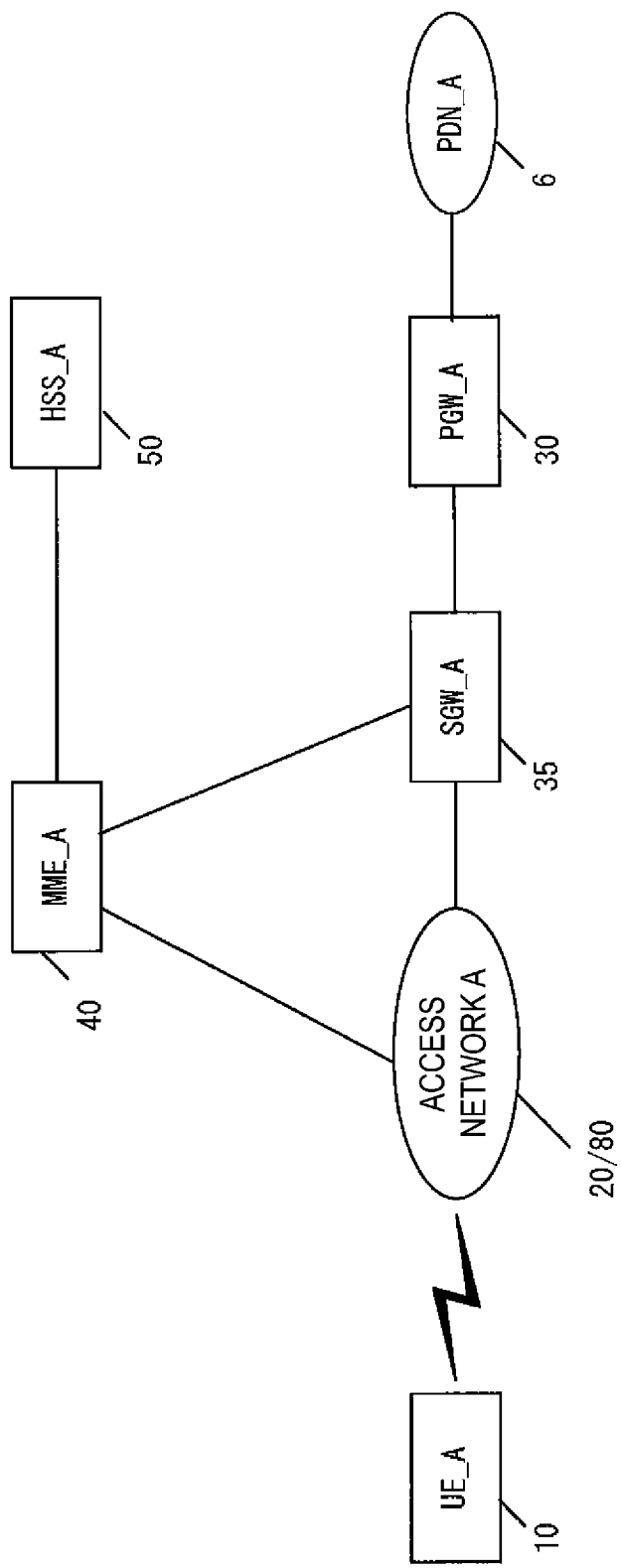
FIG. 3 is a diagram illustrating an example of a configuration and the like of a core network_A in the mobile communication system.
Figure 4:
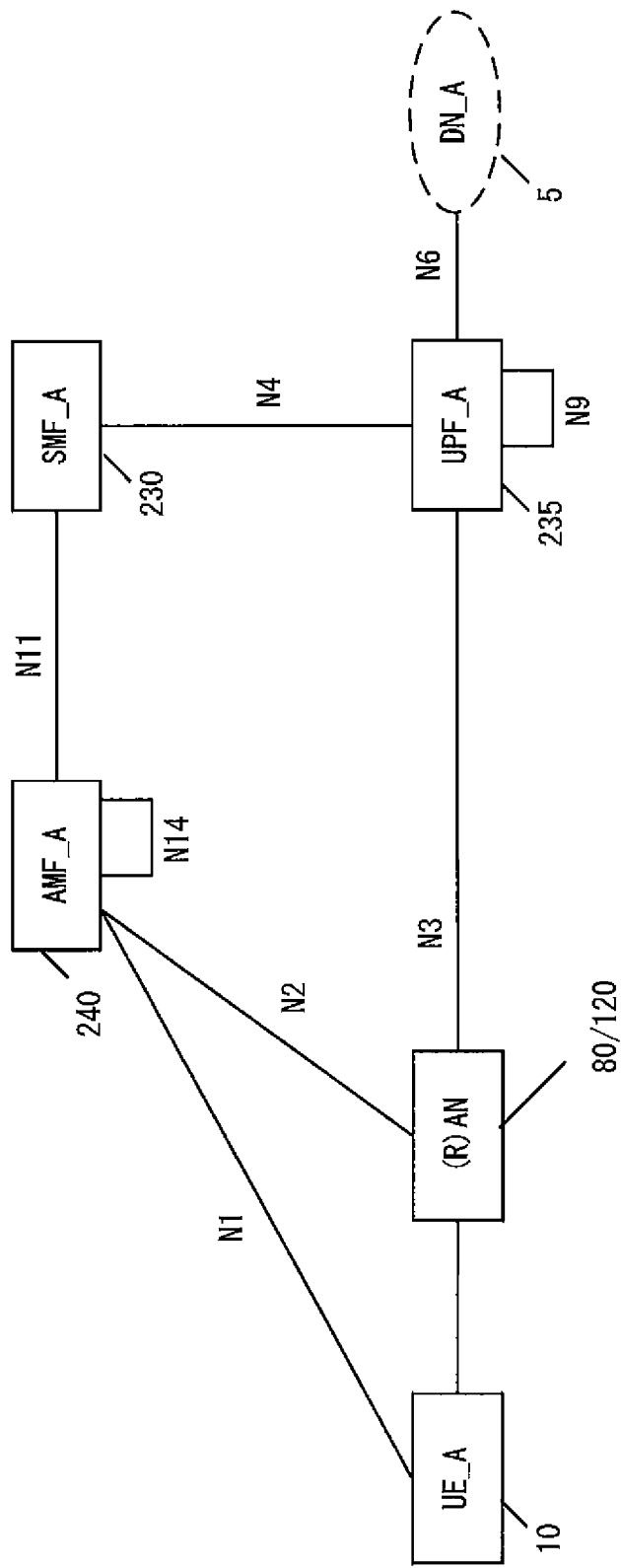
FIG. 4 is a diagram illustrating an example of a configuration and the like of a core network_B in the mobile communication system.

An overview of a mobile communication system according to the present embodiment will be described with reference to FIG. 1, FIG. 2, FIG. 3, and FIG. 4. FIG. 2 is a diagram for detailing access networks of the mobile communication system of FIG. 1. FIG. 3 is a diagram mainly illustrating details of a core network_A 90 in the mobile communication system of FIG. 1. FIG. 4 is a diagram mainly illustrating details of a core network_B 190 in the mobile communication system of FIG. 1. As illustrated in FIG. 1, the mobile communication system 1 according to the present embodiment includes a terminal apparatus (which is also referred to as a user apparatus or a mobile terminal apparatus) or a User Equipment (UE)_A 10, an Access Network (AN)_A, an access network_B, and a Core Network (CN)_A 90, a core network_B 190, a Packet Data Network (PDN)_A 6, and a Data Network (DN)_A 5. Note that a combination of the access network_A and the core network_A 90 may be referred to as an Evolved Packet System (EPS; 4G mobile communication system) or that a combination of the access network_B, the core network_B 190, and the UE_A 10 may be referred to as a 5G System (5GS; 5G mobile communication system) or that configurations of the 5GS and EPS may not be limited to these combinations. Note that, for the sake of simplicity, the core network_A 90, the core network_B, or a combination thereof may also be referred to as a core network, and the access network_A, the access network_B, or a combination thereof may also be referred to as an access network or a radio access network, and the DN_A 5, the PDN_A 6, or a combination thereof may also be referred to as a DN.

Here, the UE_A 10 may be an apparatus that can connect to a network service via 3GPP access (also referred to as 3GPP access or a 3GPP access network) and/or non-3GPP access (also referred to as non-3GPP access or a non-3GPP access network). In addition, the UE_A 10 may also include a Universal Integrated Circuit Card (UICC) and an embedded UICC (eUICC). Furthermore, the UE_A 10 may be a wirelessly connectable terminal apparatus and may be Mobile Equipment (ME), a Mobile Station (MS), a cellular Internet of Things (CIoT) terminal (CIoT UE), or the like.

In addition, the UE_A 10 can be connected to an access network and/or core network. In addition, the UE_A 10 can be connected to the DN_A and/or the PDN_A via the access network and/or the core network. The UE_A 10 transmits and/or receives (communicates) the user data to and/or from the DN_A and/or the PDN_A by using a Protocol Data Unit or Packet Data Unit (PDU) session and/or a Packet Data Network (PDN) connection (also referred to as PDN connection). Furthermore, the communication of the user data is not limited to Internet Protocol (IP) communication (IPv4 or IPv6), and may be, for example, non-IP communication in the EPS, or Ethernet (registered trademark) communication or Unstructured communication at the 5GS.

Here, IP communication is data communication using IP, and is data communication achieved by transmitting and/or receiving an IP packet including an IP header. Note that a payload section constituting the IP packet may include the user data transmitted and/or received by the UE_A 10. Furthermore, non-IP communication is data communication without using IP, and is data communication achieved by transmitting and/or receiving data without IP header. For example, the non-IP communication may be the data communication achieved through transmitting and/or receiving application data not given the IP address, or may transmit and/or receive the user data transmitted and/or received by the UE_A 10 to which another header such as a MAC header and an Ethernet (registered trademark) frame header is given.

Additionally, the PDU session is connectivity established between the UE_A 10 and the DN_A 5 to provide a PDU connection service. To be more specific, the PDU session may be connectivity established between the UE_A 10 and an external gateway. Here, the external gateway may be a UPF, a Packet Data Network Gateway (PGW), or the like. Additionally, the PDU session may be a communication path established to transmit and/or receive the user data between the UE_A 10 and the core network and/or the DN, or a communication path established to transmit and/or receive the PDU. Furthermore, the PDU session may be a session established between the UE_A 10 and the core network and/or the DN, or may be a logical communication path including a transfer path such as one or more bearers and the like between apparatuses in the mobile communication system 1. To be more specific, the PDU session may be a connection established by the UE_A 10 between a core network_B 190 and/or the external gateway, or may be a connection established between the UE_A 10 and a UPF. Additionally, the PDU session may be connectivity and/or a connection between the UE_A 10 and the UPF_A 235 via an NR node_A 122. Furthermore, the PDU session may be identified by a PDU session ID and/or an EPS bearer ID.

Note that the UE_A 10 can transmit and/or receive the user data to and/or from an apparatus, such as an application server, that is located in the DN_A 5 by using the PDU session. In other words, the PDU session can transfer the user data transmitted and/or received between the UE_A 10 and the apparatus, such as the application server, that is located in the DN_A 5. Furthermore, each apparatus (the UE_A 10, the apparatus in the access network, and/or the apparatus in the core network, and/or the apparatus in the data network) may correlate one or more pieces of identification information to the PDU session for management. Note that these pieces of identification information may include at least one of an Access Point Name (APN), a Traffic Flow Template (TFT), a session type, application identification information, identification information of the DN_A 5, Network Slice Instance (NSI) identification information, Dedicated Core Network (DCN) identification information, and access network identification information, or may further include other information. Furthermore, in a case that multiple PDU sessions are established, respective pieces of identification information correlated to the PDU sessions may be the same contents or may be different contents. Furthermore, the NSI identification information is information for identifying an NSI, and hereinafter may be an NSI ID or a Slice Instance ID.

In addition, the access network_A and/or the access network_B may be any of a Universal Terrestrial Radio Access Network (UTRAN)_A 20, an Evolved Universal Terrestrial Radio Access Network (E-UTRAN)_A 80, and NG-RAN (5G-RAN)_A 120 as illustrated in FIG. 2. Note that hereinafter, the UTRAN_A 20 and/or E-UTRAN_A 80 and/or the NG-RAN_A 120 may be referred to as a 3GPP access or a 3GPP access network, and the wireless LAN access network or non-3 GPP AN may be referred to as a non-3GPP access or a non-3GPP access network. Each radio access network includes an apparatus to which the UE_A 10 is actually connected (e.g., a base station apparatus or an access point), and the like.

For example, the E-UTRAN_A 80 is an access network for Long Term Evolution (LTE) and configured to include one or more eNBs_A 45. The eNB_A 45 is a radio base station to which the UE_A 10 connects through Evolved Universal Terrestrial Radio Access (E-UTRA). Furthermore, in a case that multiple eNBs are present in the E-UTRAN_A 80, the multiple eNBs may be connected to each other.

Additionally, the NG-RAN_A 120 is a 5G access network, may be an (R) AN described in FIG. 4, and includes one or more New Radio Access Technology nodes (NR nodes)_A 122 and/or ng-eNBs. The NR node_A 122 is a radio base station to which the UE_A 10 connects with 5G Radio Access and is also referred to as a gNB. Note that the ng-eNB may be an eNB (E-UTRA) configuring a 5G access network, may be connected to the core network_B 190 via the NR node_A, or may be directly connected to the core network_B 190. Additionally, in a case that there are multiple NR nodes_A 122 and/or ng-eNB in the NG-RAN_A 120, the NR nodes_A 122 and/or ng-eNBs may be connected to one another.

Note that the NG-RAN_A 120 may be an access network including the E-UTRA and/or the 5G Radio Access. In other words, the NG-RAN_A 120 may include the eNB_A 45, the NR node_A 122, or both the eNB_A 45 and the NR node_A 122. In this case, the eNB_A 45 and the NR node_A 122 may be similar apparatuses. Therefore, the NR node_A 122 can be substituted with the eNB_A 45.

The UTRAN_A 20 is an access network in a 3G mobile communication system, and includes a Radio Network Controller (RNC)_A 24 and a Node B (NB)_A 22. The NB_A 22 is a radio base station to which the UE_A 10 connects through Universal Terrestrial Radio Access (UTRA), and the UTRAN_A 20 may include one or multiple radio base stations. Furthermore, the RNC_A 24 is a controller for connecting the core network_A 90 and the NB_A 22, and the UTRAN_A 20 may be configured to include one or multiple RNCs. Moreover, the RNC_A 24 may be connected to one or multiple NBs_A 22.

Note that, in the present specification, the expression "the UE_A 10 is connected to each radio access network" is equivalent to "the UE_A 10 is connected to a base station apparatus, an access point, or the like included in each radio access network," and is equivalent to "transmitted and/or received data, signals, and the like are also transferred through the base station apparatus and the access point." Note that control messages transmitted and/or received between the UE_A 10 and the core network_B 190 may be the same control message, regardless of a type of the access network. Accordingly, the expression "UE_A 10 and the core network_B 190 transmit and/or receive a message to and/or from each other via the NR node_A 122" may be equivalent to the expression "UE_A 10 and the core network_B 190 transmit a message to each other via the eNB_A 45."

Furthermore, the access network is a radio network connecting with the UE_A 10 and/or the core network. The access network may be a 3GPP access network, or a non-3GPP access network. Note that the 3GPP access network may be the UTRAN_A 20, the E-UTRAN_A 80 and the NG-Radio Access Network (RAN)_A 120, and the non-3GPP access network may be a wireless LAN access point (WLAN AN). Note that the UE_A 10 may connect to the access network or to the core network via the access network in order to connect to the core network.

Additionally, the DN_A 5 and the PDN_A 6 are Data Networks that provide communication services to the UE_A 10, may be configured as packet data service networks, and may be configured for each service. Furthermore, the DN_A 5 may include a connected communication terminal. Accordingly, connecting with the DN_A 5 may be connecting with the communication terminal or a server device located in the DN_A 5. Furthermore, the transmission and/or reception of the user data to and/or from the DN_A 5 may be transmission and/or reception of the user data to and/or from the communication terminal or server device located in the DN_A 5. In addition, although the DN_A 5 is outside the core networks in FIG. 1, DN_A 5 may be within the core networks.

Additionally, the core network_A 90 and/or the core network_B 190 may be configured as one or more apparatuses in the core network. Here, the apparatuses in the core network apparatuses may be apparatuses that perform part or all of processing or functions of apparatuses included in the core network_A 90 and/or the core network_B 190. Note that the apparatus in the core network may be referred to as a core network apparatus.

Furthermore, the core network is an IP mobile communication network, operated by a Mobile Network Operator (MNO), that connects to the access network and/or the DN. The core network may be a core network for a mobile communication operator that operates and manages the mobile communication system 1, or may be a core network for a virtual mobile communication operator such as a Mobile Virtual Network Operator (MVNO) and a Mobile Virtual Network Enabler (MVNE), or a virtual mobile communication service provider. Note that the core network_A 90 may be an Evolved Packet Core (EPC) constituting an Evolved Packet System (EPS), and the core network_B 190 may be a 5G Core Network (5GC) constituting a 5GS. Furthermore, the core network_B 190 may be a core network for a system providing the 5G communication service. Conversely, the EPC may be the core network_A 90, and the 5GC may be the core network_B 190. Note that the core network_A 90 and/or the core network_B 190 is not limited to the above, and may be a network for providing a mobile communication service.

Now, the core networks_A 90 will be described. The core network_A 90 may include at least one of a Home Subscriber Server (HSS)_A 50, an Authentication Authorization Accounting (AAA), a Policy and Charging Rules Function (PCRF), the PGW_A 30, an ePDG, the SGW_A 35, the Mobility Management Entity (MME)_A 40, a Serving GPRS Support Node (SGSN), and an SCEF. Furthermore, these may also be configured as Network Functions (NFs). The NF may be a processing function included in a network. In addition, the core network_A 90 is capable of connecting to multiple radio access networks (the UTRAN_A 20 and the E-UTRAN_A 80).

Although only the HSS (HSS_A 50), the PGW (PGW_A 30), the SGW (SGW_A 35), and the MME (MME_A 40) among the network elements are described in FIG. 3 for simplicity, it does not mean that no other apparatuses and/or NFs are included therein. Note that the UE_A 10 is also referred to as a UE, the HSS_A 50 as an HSS, the PGW_A 30 as a PGW, the SGW_A 35 as an SGW, the MME_A 40 as an MME, and the DN_A 5 and/or the PDN_A 6 as a DN or a PDN for simplicity.

The following briefly describes each apparatus included in the core network_A 90.

The PGW_A 30 is a relay apparatus that is connected to the DN, the SGW_A 35, the ePDG, the WLAN ANa 70, the PCRF, and the AAA, and transfers the user data as a gateway between the DN (the DN_A 5 and/or the PDN_A 6) and the core network_A 90. Note that the PGW_A 30 may serve as a gateway for the IP communication and/or non-IP communication. Furthermore, the PGW_A 30 may have a function to transfer the IP communication, or may have a function to perform conversion between the non-IP communication and the IP communication. Note that multiple gateways like this may be deployed in the core network_A 90. Furthermore, the multiple gateways deployed may serve as gateways for connecting the core network_A 90 with a single DN.

Note that a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

Furthermore, the PGW_A 30 may be connected to the SGW and the DN and a User plane function (UPF) and/or a Session Management Function (SMF) or may be connected to the UE_A 10 via the U-Plane. Furthermore, the PGW_A 30 may be configured integrally with the UPF_A 235 and/or the SMF_A 230.

The SGW_A 35 is a relay apparatus that is connected to the PGW_A 30, the MME_A 40, the E-UTRAN_A 80, the SGSN, and the UTRAN_A 20, and transfers the user data as a gateway between the core network_A 90 and the 3GPP access networks (the UTRAN_A 20, the GERAN, and the E-UTRAN_A 80).

The MME_A 40 is a control apparatus that is connected to the SGW_A 35, the access network, the HSS_A 50, and the SCEF, and performs location information management including mobility management of the UE_A 10 via the access network, and access control. Furthermore, the MME_A 40 may include a function as a session management device to manage a session established by the UE_A 10. Multiple control apparatuses like this may be deployed in the core network_A 90, and, for example, a location management apparatus different from the MME_A 40 may be configured. Like the MME_A 40, the location management apparatus different from the MME_A 40 may be connected to the SGW_A 35, the access network, the SCEF, and the HSS_A 50. Furthermore, the MME_$A_{40}$ may be connected to an Access and Mobility Management Function (AMF).

Furthermore, in a case that multiple MMEs are included in the core network_A 90, the multiple MMEs may be connected to each other. With this configuration, a context of the UE_A 10 may be transmitted and/or received between the MMEs. In this way, the MME_A 40 is a management apparatus to transmit and/or receive the control information related to the mobility management and the session management to and/or from the UE_A 10. In other words, the MME_A 40 may be a control apparatus for a Control Plane (C-Plane; CP).

The example is described in which the MME_A 40 is configured to be included in the core network_A 90, but the MME_A 40 may be a management apparatus configured in one or multiple core networks, DCNs, or NSIs, or may be a management apparatus connected to one or multiple core networks, DCNs, or NSIs. Here, multiple DCNs or NSIs may be operated by a single network operator, or by different network operators respectively.

The MME_A 40 may be a relay apparatus for transferring the user data as a gateway between the core network_A 90 and the access network. Note that the user data transmitted and/or received by the MME_A 40 serving as a gateway may be small data.

Furthermore, the MME_A 40 may be an NF having a function of the mobility management of the UE_A 10 or the like, or an NF managing one or multiple NSIs. The MME_A 40 may be an NF having one or multiple of these functions. Note that the NF may be one or multiple apparatuses deployed in the core network_A 90, a CP function (hereinafter, also referred to as a Control Plane Function (CPF) or a Control Plane Network Function) for the control information and/or control message, or a common CP function shared between multiple network slices.

Here, the NF is a processing function included in a network. That is, the NF may be a function apparatus such as an MME, an SGW, a PGW, a CPF, an AMF, an SMF, or a UPF, or may be a function such as mobility management (MM) and session management (SM), or capability information. The NF may be a function device to realize a single function, or a function device to realize multiple functions. For example, an NF to realize the MM function and an NF to realize the SM function may be separately present, or an NF to realize both the MM function and the SM function may be present.

The HSS_A 50 is a managing node that is connected to the MME_A 40, the AAA, and the SCEF, and manages subscriber information. The subscriber information of the HSS_A 50 is referred to during the access control performed by the MME_A 40, for example. Furthermore, the HSS_A 50 may be connected to a location management device different from the MME_A 40. For example, the HSS_A 50 may be connected to the CPF_A 140.

Furthermore, the HSS_A 50, a Unified Data Management (UDM)_A 245 may be configured as different apparatuses and/or NFs or the same apparatus and/or NF.

The AAA is connected to the PGW 30, the HSS_A 50, the PCRF, and the WLAN ANa 70 and performs access control for the UE_A 10 connected via the WLAN ANa 70.

The PCRF is connected to the PGW_A 30, the WLAN ANa 75, the AAA, the DN_A 5 and/or the PDN_A 6 and performs QoS management on data delivery. For example, the PCRF manages QoS of a communication path between the UE_A 10, the DN_A 5, and/or the PDN_A 6. Furthermore, the PCRF may be an apparatus to create and/or manage a Policy and Charging Control (PCC) rule and/or a routing rule used by each apparatus for transmitting and/or receiving user data.

In addition, the PCRF may be a PCF to create and/or manage a policy. More specifically, the PCRF may be connected to the UPF_A 235.

The ePDG is connected to the PGW 30 and the WLAN ANb 75 and delivers user data as a gateway between the core network_A 90 and the WLAN ANb 75.

The SGSN is a control apparatus, connected to the UTRAN_A 20, the GERAN, and the SGW_A 35, for performing location management between the access network (UTRAN/GERAN) of 3G/2G and the access network (E-UTRAN) of LTE (4G). In addition, the SGSN has functions of selecting the PGW and the SGW, managing a time zone of the UE_A 10, and selecting the MME_A 40 at the time of handover to the E-UTRAN.

The SCEF is a relay apparatus that is connected to the DN_A 5 and/or the PDN_A 6, the MME_A 40, and the HSS_A 50 and transfers the user data as a gateway for connecting the DN_A 5 and/or the PDN_A 6 with the core network_A 90. Note that the SCEF may serve as a gateway for non-IP communication. Furthermore, the SCEF may have a function to perform conversion between non-IP communication and IP communication. Multiple gateways like this may be deployed in the core network_A 90. Furthermore, multiple gateways connecting the core network_A 90 with a single DN_5 and/or PDN_A 6 and/or DN may be also deployed. Note that the SCEF may be outside or inside the core network.

Next, the core network_B 190 will be described. Next, the core network_B 190 may include at least one of an Authentication Server Function (AUSF), an Access and Mobility Management Function (AMF)_A 240, an Unstructured Data Storage Function (UDSF), a Network Exposure Function (NEF), an Network Repository Function (NRF), a Policy Control Function (PCF), a Session Management Function (SMF)_A 230, a Unified Data Management (UDM), a User Plane Function (UPF)_A 235, an Application Function (AF), and a Non-3GPP InterWorking Function (N31 W F). Furthermore, these may also be configured as Network Functions (NFs). The NF may be a processing function included in a network.

Although, among the above-described elements, only the AMF (AMF_A 240), the SMF (SMF_A 230), and the UPF (UPF_A 235) are illustrated in FIG. 4 for simplicity, it does not mean that no other elements (apparatuses and/or Network Functions (NFs)) are included. Note that the UE_A 10 will also be referred to as a UE, the AMF_A 240 as an AMF, the SMF_A 230 as an SMF, the UPF_A 235 as a UPF, and the DN_A 5 as a DN for simplicity.

In addition, FIG. 4 illustrates an N1 interface (hereinafter, also referred to as a reference point), an N2 interface, an N3 interface, an N4 interface, an N6 interface, an N9 interface, and an N11 interface. Here, the N1 interface is an interface between the UE and the AMF, the N2 interface is an interface between (R) access network (AN) and the AMF, and the N3 interface is an interface between the (R) access network (AN) and the UPF, the N4 interface is an interface between the SMF and the UPF, the N6 interface is an interface between the UPF and the DN, the N9 interface is an interface between the UPF and the UPF, and the N11 interface is an interface between the AMF and the SMF. These interfaces can be used to perform communication between the apparatuses. Here, the (R) AN is hereinafter also referred to as the NG RAN.

The following briefly describes each apparatus included in the core network_B 190.

First, the AMF_A 240 is connected to another AMF, the SMF (SMF_A 230), the access network (i.e., the UTRAN_A 20, the E-UTRAN_A 80, and the NG-RAN_A 120), the UDM, the AUSF, and the PCF. The AMF_A 240 may play roles of registration management, connection management, reachability management, mobility management of the UE_A 10 or the like, transfer of a Session Management (SM) message between the UE and the SMF, access authentication or access authorization, a Security Anchor Function (SEA), Security Context Management (SCM), support for the N2 interface for the N31WF, support for transmission and/or reception of NAS signals to and/or from the UE via the N31WF, authentication of the UE connected via the N31WF, management of Registration Management (RM) states, management of Connection Management (CM) states, and the like. In addition, one or more AMF_A 240s may be deployed within the core network_B 190. In addition, the AMF_A 240 may be an NF that manages one or more Network Slice Instances (NSI). In addition, the AMF_A 240 may also be a Common Control Plane Network Function (Common CPNF, or CCNF) shared among multiple NSIs.

Additionally, the RM state includes a deregistered state (RM-DEREGISTERED state) and a registered state (RM-REGISTERED state). In the RM-DEREGISTERED state, the UE is not registered in the network, and thus the AMF is not able to reach the UE because the UE context in the AMF does not have valid location information and routing information for the UE. In the RM-REGISTERED state, the UE is registered in the network, and thus the UE can receive services that requires registration with the network.

Additionally, the CM state includes a disconnected state (CM-IDLE state) and a connected state (CM-CONNECTED state). In the CM-IDLE state, the UE is in the RM-REGISTERED state but does not have a NAS signaling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. Also, in the CM-CONNECTED state, the UE may have the N2 interface connection (N2 connection) and/or the N3 interface connection (N3 connection).

Additionally, the SMF_A 230 may have a Session Management (SM) function such as a PDU session, or the like, IP address allocation for the UE and a management function for the IP address allocation, a UPF selection and control function, a UPF configuration function for routing traffic to an appropriate destination, a function for notifying arrival of downlink data (Downlink Data Notification), a function for providing AN-unique SM information (for each AN) transmitted, via an N2 interface, to the AN via the AMF, a function for determining a Session and Service Continuity mode (SSC mode) for a session, a roaming function, and the like. Additionally, the SMF_A 230 may be connected to the AMF_A 240, the UPF_A 235, the UDM, and the PCF.

In addition, the UPF_A 235 is connected to the DN_A 5, the SMF_A 230, another UPF, and the access network (i.e., the UTRAN_A 20, the E-UTRAN_A 80, and the NG-RAN_A 120). The UPF_A 235 may play roles of an anchor to intra-RAT mobility or inter-RAT mobility, packet routing & forwarding, an uplink classifier (UL CL) function to support routing of multiple traffic flows for one DN, a branching point function to support a multi-homed PDU session, QoS processing for a user plane, verification of uplink traffic, buffering of downlink packets, a function of triggering downlink data notification, and the like. Furthermore, the UPF_A 235 may be a relay apparatus that transfers the user data as a gateway between the DN_A 5 and the core network_B 190. Note that the UPF_A 235 may serve as a gateway for IP communication and/or non-IP communication. Furthermore, the UPF_A 235 may have a function of transferring IP communication or a function to perform conversion between non-IP communication and IP communication. The multiple gateways deployed may serve as gateways for connecting the core network_B 190 with a single DN. Note that the UPF_A 235 may have connectivity with another NF or may be connected to each apparatus via another NF.

A UPF_C 239 (also referred to as a branching point or an uplink classifier), which is a UPF different from the UPF_A 235, may be present between the UPF_A 235 and the access network as an apparatus or an NF. In a case that the UPF_C 239 is present, the PDU session between the UE_A 10 and the DN_A 5 is established via the access network, the UPF_C 239, and the UPF_A 235.

Additionally, the AUSF is connected to the UDM and the AMF_A 240. The AUSF functions as an authentication server.

The UDSF provides a function for all NFs to store or retrieve information as unstructured data.

The NEF provides a means to securely provide services and capabilities provided by the 3GPP network. The NEF stores information received from another NF as structured data.

In a case that a NF discovery request is received from a NF instance, the NRF provides the NF with information of found NF instances or holds information of available NF instances or services supported by the instances.

The PCF is connected to the SMF (SMF_A 230), the AF, and the AMF_A 240. The PCF provides a policy rule and the like.

The UDM is connected to the AMF_A 240, the SMF (SMF_A 230), the AUSF, and the PCF. The UDM includes a UDM FE (application front end) and a User Data Repository (UDR). The UDM FE performs processing of authentication information (credentials), location management, subscriber management (subscription management), and the like. The UDR stores data necessary for the UDM FE for provision and the policy profile necessary for the PCF.

The AF is connected to the PCF. The AF affects traffic routing or is involved in the policy control.

The N31WF provides functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying user plane packets between the UE and the UPF, selecting the AMF, and the like.

1.2. Configuration of Each Apparatus

The configuration of each apparatus will be described below. Note that some or all of apparatuses to be described below and functions of units of the apparatuses may operate on physical hardware, or logical hardware which is virtually configured on general-purpose hardware.

1.2.1. Configuration of UE

Figure 5:
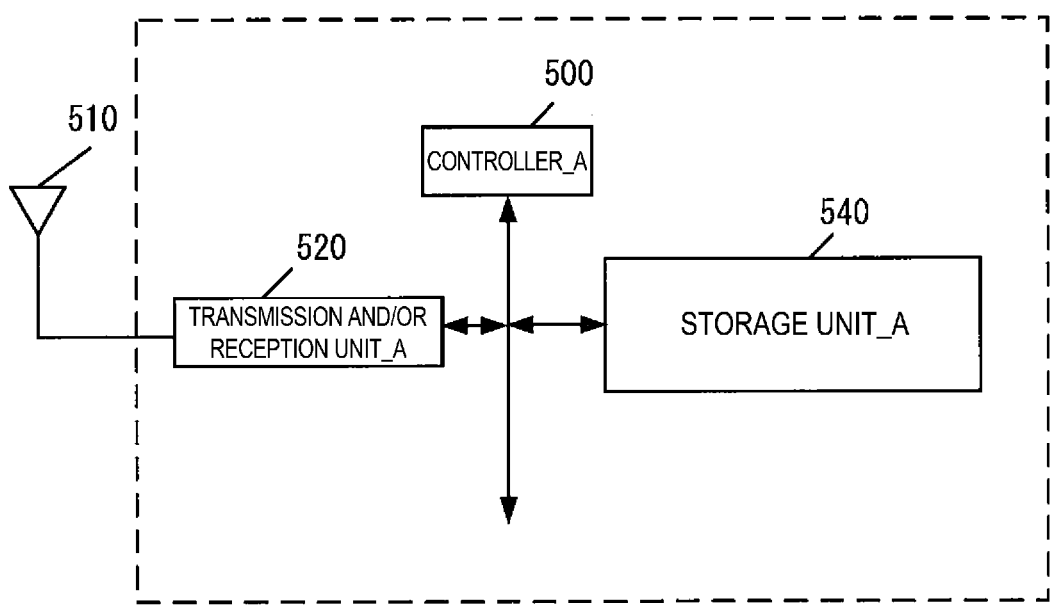
FIG. 5 is a diagram illustrating an apparatus configuration of UE.

First, an example of an apparatus configuration of the UE_A 10 is illustrated in FIG. 5. As illustrated in FIG. 5, the UE_A 10 includes a controller_A 500, a transmission and/or reception unit_A 520, and a storage unit_A 540. The transmission and/or reception unit_A 520 and the storage unit_A 540 are connected to the controller_A 500 via a bus. Furthermore, an external antenna 410 is connected to the transmission and/or reception unit_A 520.

The controller_A 500 is a function unit for controlling the entire UE_A 10 and implements various processes of the entire UE_A 10 by reading out and performing various types of information and programs stored in the storage unit_A 540.

The transmission and/or reception unit_A 520 is a function unit through which the UE_A 10 connects to the base station (the UTRAN_A 20 and the E-UTRAN_A 80 and the NG-RAN_A 120) and/or the wireless LAN access point (the WLAN AN) in the access network to connect to the access network. In other words, the UE_A 10 can connect to the base station and/or the access point in the access network via the external antenna 410 connected to the transmission and/or reception unit_A 520. To be specific, the UE_A 10 can transmit and/or receive user data and/or control information to and/or from the base station and/or the access point in the access network via the external antenna 410 connected to the transmission and/or reception unit_A 520.

The storage unit_A 540 is a function unit that stores programs, data, and the like necessary for each operation of the UE_A 10, and include, for example, a semiconductor memory, a Hard Disk Drive (HDD), a Solid State Drive (SSD), or the like. The storage unit_A 540 stores identification information, control information, a flag, a parameter, a rule, a policy, and the like included in a control message which is transmitted and/or received in the communication procedure described below.

1.2.2. eNB/NR Node

Figure 6:
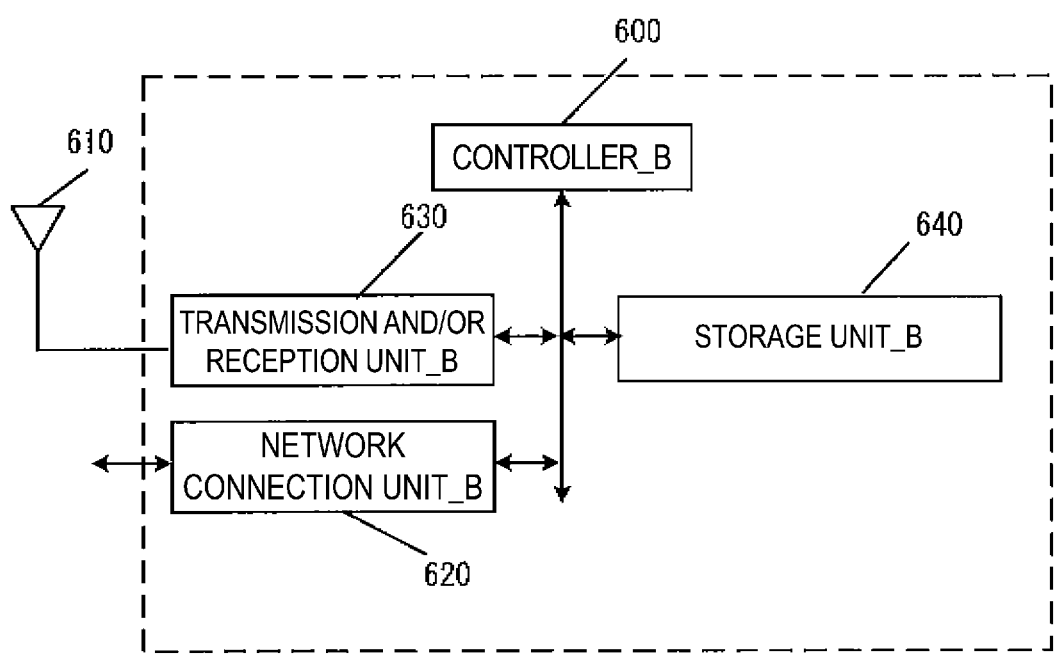
FIG. 6 is a diagram illustrating an apparatus configuration of an eNB/NR node.

Now, FIG. 6 illustrates an example of an apparatus configuration of the eNB_A 45 and the NR node_A 122. As illustrated in FIG. 6, the eNB_A 45 and the NR node_A 122 include a controller_B 600, a network connection unit_B 620, a transmission and/or reception unit_B 630, and a storage unit_B 640. The network connection unit_B 620, the transmission and/or reception unit_B 630, and the storage unit_B 640 are connected to the controller_B 600 via a bus. Additionally, an external antenna 510 is connected to the transmission and/or reception unit_B 630.

The controller_B 600 is a function unit for controlling the entire eNB_A 45 and NR node_A 122, and implements various processes of the entire eNB_A 45 and NR node_A 122 by reading out and performing various types of information and programs stored in the storage unit_B 640.

The network connection unit_B 620 is a function unit through which the eNB_A 45 and the NR node_A 122 connect to the AMF_A 240 and the UPF_A 235 in the core network. In other words, the eNB_A 45 and the NR node_A 122 can be connected to the AMF_A 240 and the UPF_A 235 in the core network via the network connection unit_B 620. Specifically, the eNB_A 45 and the NR node_A 122 can transmit and/or receive user data and/or control information to and/or from the AMF_A 240 and/or the UPF_A 235 via the network connection unit_B 620.

The transmission and/or reception unit_B 630 is a function unit through which the eNB_A 45 and the NR node_A 122 connect to the UE_A 10. In other words, the eNB_A 45 and the NR node_A 122 can transmit and/or receive user data and/or control information to and/or from the UE_A 10 via the transmission and/or reception unit_B 630.

The storage unit_B 640 is a function unit for storing programs, data, and the like necessary for each operation of the eNB_A 45 and the NR node_A 122. The storage unit_B 640 includes, for example, a semiconductor memory, an HDD, an SSD, or the like. The storage unit_B 640 stores identification information, control information, a flag, a parameter, and the like included in a control message which is transmitted and/or received in the communication procedure described below. The storage unit_B 640 may store these pieces of information as the contexts for each UE_A 10.

1.2.3. Configuration of MME/AMF

Figure 7:
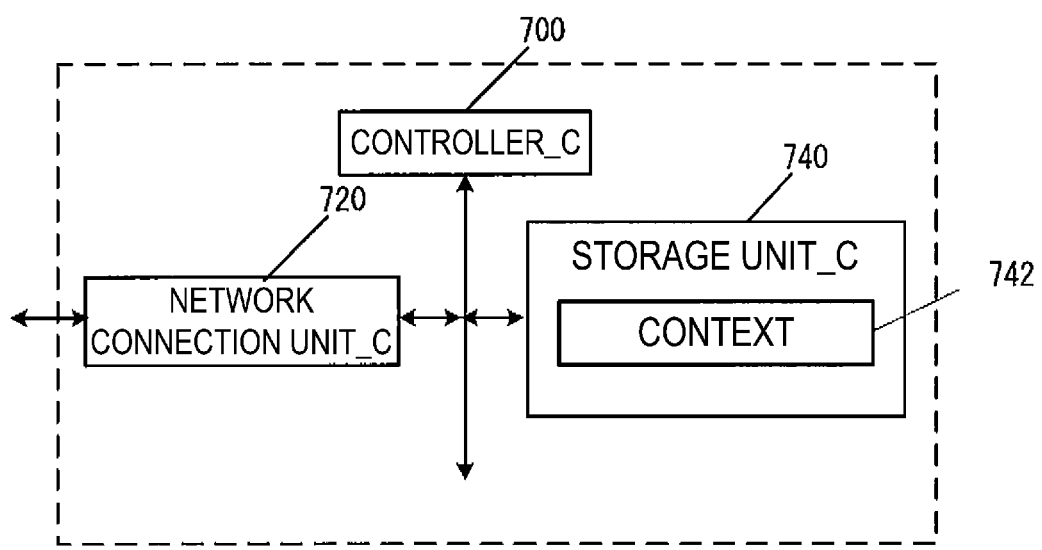
FIG. 7 is a diagram illustrating an apparatus configuration of an MME/AMF.

Now, FIG. 7 illustrates an example of an apparatus configuration of the MME_A 40 or the AMF_A 240. As illustrated in FIG. 7, the MME_A 40 or the AMF_A 240 includes a controller_C 700, a network connection unit_C 720, and a storage unit_C 740. The network connection unit_C 720 and the storage unit_C 740 are connected to the controller_C 700 via a bus. Furthermore, the storage unit_C 740 stores a context 642.

The controller_C 700 is a function unit for controlling the entire MME_A 40 or AMF_A 240. The controller_C 600 reads out and performs various kinds of information and programs stored in the storage unit_C 740 to achieve various processes of the entire AMF_A 240.

The network connection unit_C 720 is a function unit through which the MME_A 40 or the AMF_A 240 connects to another MME_A 40, the AMF_240, the SMF_A 230, and a base station (the UTRAN_A 20 and the E-UTRAN_A 80 and the NG-RAN_A 120) and/or the wireless LAN access point (the WLAN AN), the UDM, the AUSF, and the PCF in the access network. In other words, the MME_A 40 or the AMF_A 240 can transmit and/or receive user data and/or control information to and/or from the base station and/or access point, the UDM, the AUSF, and the PCF in the access network via the network connection unit_C 720.

The storage unit_C 740 is a function unit for storing programs, data, and the like necessary for each operation of the MME_A 40 or the AMF_A 240. The storage unit_C 740 includes, for example, a semiconductor memory, an HDD, an SSD, or the like. The storage unit_C 740 stores identification information, control information, a flag, a parameter, and the like included in a control message which is transmitted and/or received in the communication procedure described below. Examples of the context 642 stored in the storage unit_C 740 may include a context stored for each UE, a context stored for each PDU session, and a context stored for each bearer. The context stored for each UE may include an IMSI, an MSISDN, MM State, a GUTI, a ME Identity, a UE radio access capability, a UE network capability, an MS network capability, an access restriction, an MME F-TEID, an SGW F-TEID, an eNB address, an MME UE S1AP ID, an eNB UE S1AP ID, an NR node address, an NR node ID, a WAG address, and a WAG ID. Furthermore, the context stored for each PDU session may include an APN in Use, an assigned session type, IP address(es), a PGW F-TEID, an SCEF ID, and a default bearer. Additionally, the context stored for each bearer may include an EPS bearer ID, a TI, a TFT, an SGW F-TEID, a PGW F-TEID, an MME F-TEID, an eNB address, an NR node address, a WAG address, an eNB ID, an NR node ID, and a WAG ID.

1.2.4. Configuration of SMF

Figure 8:
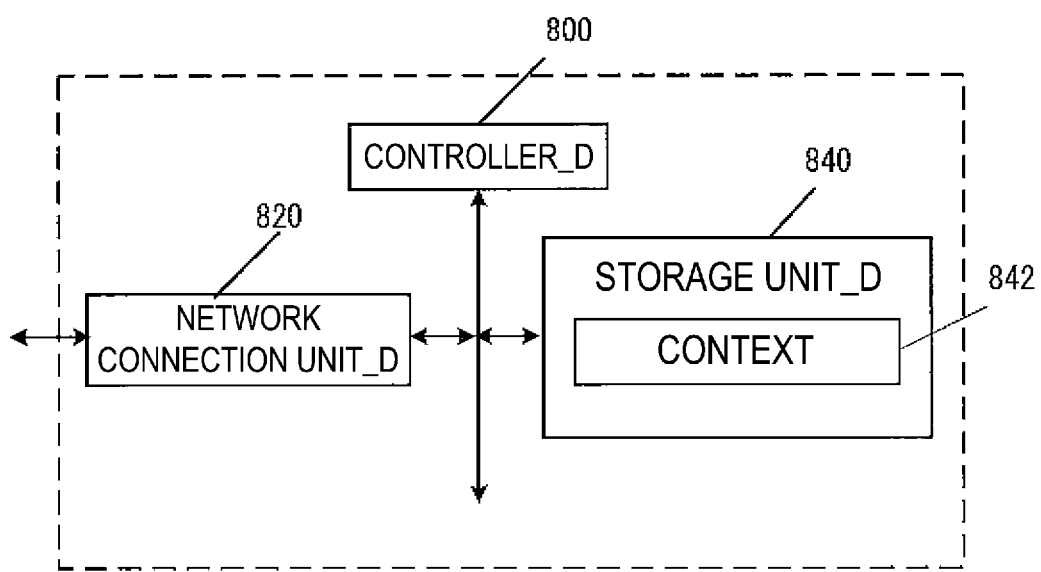
FIG. 8 is a diagram illustrating an apparatus configuration of an SMF/PGW/UPF.

Next, FIG. 8 illustrates an example of an apparatus configuration of the SMF_A 230. As illustrated in FIG. 8, the SMF_A 230 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 742.

The controller_D 800 of the SMF_A 230 is a function unit for controlling the entire SMF_A 230 and implements various processes of the entire SMF_A 230 by reading out and performing various types of information and programs stored in the storage unit_D 840.

Additionally, the network connection unit_D 820 in the SMF_A 230 is a function unit for the SMF_A 230 to connect to the AMF_A 240, the UPF_A 235, the UDM, and the PCF. In other words, the SMF_A 230 can transmit and/or receive user data and/or control information to and/or from the AMF_A 240, the UPF_A 235, the UDM, and the PCF via the network connection unit_D 820.

Additionally, the storage unit_D 840 of the SMF_A 230 is a function unit for storing programs, data, and the like necessary for each operation of the SMF_A 230. The storage unit_D 840 of the SMF_A 230 includes, for example, a semiconductor memory, an HDD, an SSD, or the like. The storage unit_D 840 of the SMF_A 230 stores identification information, control information, a flag, a parameter, and the like included in a control message which is transmitted and/or received in the communication procedure described below. In addition, examples of the context 742 stored in the storage unit_D 840 of the SMF_A 230 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include an assigned session type, IP address (es), an SGW F-TEID, a PGW F-TEID, and a default bearer. The context stored for each bearer may include an EPS bearer ID, a TFT, an SGW F-TEID, and a PGW F-TEID.

1.2.5. Configuration of PGW/UPF

Next, FIG. 8 illustrates an example of an apparatus configuration of the PGW_A 30 or the UPF_A 235. As illustrated in FIG. 8, each of the PGW_A 30 or the UPF_A 235 includes the controller_D 800, the network connection unit_D 820, and the storage unit_D 840. The network connection unit_D 820 and the storage unit_D 840 are connected to the controller_D 800 via a bus. In addition, the storage unit_D 840 stores a context 742.

The controller_D 800 of the PGW_A 30 or the UPF_A 235 is a function unit for controlling the entire PGW_A 30 or UPF_A 235, and implements various steps of processing of the entire PGW_A 30 or UPF_A 235 by reading out and performing various types of information and programs stored in the storage unit_D 840.

The network connection unit_D 820 in the PGW_A 30 or the UPF_A 235 is a function unit for the PGW_A 30 or the UPF_A 235 to connect to the DN (that is, the DN_A 5), the SMF_A 230, another UPF_A 235, and the access network (that is, the UTRAN_A 20 and the E-UTRAN_A 80 and the NG-RAN_A 120). In other words, the UPF_A 235 can transmit and/or receive the user data and/or the control information to and/or from the DN (that is, the DN_A 5), the SMF_A 230, another UPF_A 235, and the access network (that is, the UTRAN_A 20 and the E-UTRAN_A 80 and the NG-RAN_A 120) via the network connection unit_D 820.

Additionally, the storage unit_D 840 in the UPF_A 235 is a function unit for storing programs, data, and the like necessary for each operation by the UPF_A 235. The storage unit_D 840 in the UPF_A 235 includes, for example, a semiconductor memory, an HDD, an SSD, or the like. The storage unit_D 840 in the UPF_A 235 stores identification information, control information, a flag, a parameter, and the like included in the control message transmitted and/or received in a communication procedure described below. In addition, examples of the context 742 stored in the storage unit_D 840 of the UPF_A 235 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include an assigned session type, IP address (es), an SGW F-TEID, a PGW F-TEID, and a default bearer. The context stored for each bearer may include an EPS bearer ID, a TFT, an SGW F-TEID, and a PGW F-TEID.

1.2.6. Information Stored in Storage Unit of Each Apparatus

Next, each piece of information stored in the storage unit of each of the above-described apparatuses will be described.

An International Mobile Subscriber Identity (IMSI) is permanent identification information of a subscriber (user), and is identification information assigned to a user using the UE. The IMSI stored by the UE_A 10, the MME_A 40/CPF_A 140/AMF_A 2400, and the SGW_A 35 may be the same as the IMSI stored by an HSS_A 50.

The EMM State/MM State indicates a mobility management state of the UE_A 10 or the MME_A 40/CPF_A 140/AMF_A 240. For example, the EMM State/MM State may be an EMM-REGISTERED state (registered state) in which the UE_A 10 is registered in the network, and/or an EMM-DEREGISTERD state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information for distinguishing a state in which the UE_A 10 is registered in the EPC from a state in which the UE_A 10 is registered in the NGC or 5GC.

The Globally Unique Temporary Identity (GUTI) is temporary identification information of the UE_A 10. The GUTI includes identification information (Globally Unique MME Identifier (GUMMEI)) of the MME_A 40/CPF_A 140/AMF_A 240 and identification information (M-Temporary Mobile Subscriber Identity (M-TMSI)) of the UE_A 10 in a specific MME_A 40/CPF_A 140/AMF_A 240. The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by the storage unit of the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. Furthermore, the IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

The SGW F-TEID is information for identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. In addition, the IP address of the PGW_A 30/UPGW_A 130/SMF_A 230/UPF_A 235 and the TEID of the PGW_A 30/UPGW_A 130/SMF_A 230/UPF_A 235 may be stored independently of each other. The PGW F-TEID may be identification information for user data, or identification information for control information.

The eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 for connecting the core network A_90. Note that the APN may be a Data Network Name (DNN). Therefore, the APN may be represented by a DNN, or the DNN may be represented by the APN.

Note that the APN may be identification information for identifying such a gateway, or identification information for identifying an external network such as the DN. Note that, in a case that multiple gateways connecting the core network and the DN are deployed, there may be multiple gateways that can be selected according to the APN. Furthermore, one gateway may be selected among such multiple gateways by another method using identification information other than the APN.

The UE Radio Access Capability is identification information indicating a radio access capability of the UE_A 10. The UE Network Capability includes an algorithm of security supported by the UE_A 10 and a key derivation function. The MS Network Capability is information including, in the UE_A 10 having a function of a GERAN_A 25 and/or a UTRAN_A 20, one or more pieces of information necessary for an SGSN_A 42. The Access Restriction is registration information for access restriction. The eNB Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is an APN recently used. The APN in Use may be Data Network Identifier. This APN may include identification information of the network and identification information of a default operator. Furthermore, the APN in Use may be information for identifying a DN with which the PDU session is established.

The Assigned Session Type is information indicating a PDU session type. The Assigned Session Type may be Assigned PDN Type. The PDU session type may be IP, or non-IP. Furthermore, in a case that the PDU session type is IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, an IPv6 prefix, or an Interface ID. Note that in a case that the Assigned Session Type indicates non-IP, an element of the IP Address may not be included.

The DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or identification information for identifying an external network such as the DN. Note that, in a case that multiple gateways connecting the core network_B 190 and the DN are deployed, there may be multiple gateways that can be selected according to the DN ID. Furthermore, one gateway may be selected among such multiple gateways by another method using identification information other than the DN ID.

Furthermore, the DN ID may be information equivalent to the APN, or different from the APN. Note that in a case that the DN ID is the information different from the APN, each apparatus may manage information indicating correspondence between the DN ID and the APN, perform a procedure to inquire the APN by using the DN ID, or perform a procedure to inquire the DN ID by using the APN.

SCEF ID is an IP address of an SCEF_A 46 used in the PDU session. The Default Bearer is information acquired and/or created in a case that a PDU session is established and is EPS bearer identification information for identifying a default bearer associated with the PDU session.

The EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all packet filters associated with the EPS bearer. The TFT is information for identifying some pieces of user data to be transmitted and/or received, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as application data to be transmitted and/or received with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with a PDU session. Note that the EPS bearer may be a logical communication path established between the UE_A 10 and the PGW_A 30/UPGW_A 130/UPF_A 235, or a communication path constituting the PDN connectionPDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. Furthermore, the Default Bearer may be information that the UE_A 10 and/or the SGW_A 35 and/or the PGW_A 30/UPGW_A 130/SMF_A 230/UPF_A 235 acquire from the core network in a case that the PDU session is established. Note that the default bearer is an EPS bearer first established during the PDN connection/PDU session, and is such an EPS bearer that only one bearer can be established during one PDN connectionPDU session. The default bearer may be an EPS bearer that can be used for communication of user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used for communication of user data not associated with the TFT.

User Identity is information for identifying a subscriber. The User Identity may be an IMSI, or an MSISDN. Furthermore, the User Identity may also be identification information other than the IMSI or the MSISDN. Serving Node Information is information for identifying the MME_A 40/CPF_A 140/AMF_A 240 used in a PDU session, and may be an IP address of the MME_A 40/CPF_A 140/AMF_A 240.

The eNB Address is an IP address of the eNB_A 45. The eNB ID is information for identifying the UE in the eNB_A 45. MME Address is an IP address of the MME_A 40/CPF_A 140/AMF_A 240. MME ID is information for identifying the MME_A 40/CPF_A 140/AMF_A 240. The NR node Address is an IP address of the NR node_A 122. The NR node ID is information for identifying the NR node_A 122. The WAG Address is an IP address of the WAG. The WAG ID is information for identifying the WAG.

The anchor or anchor point is a UFP with a gateway function for the PDU session with the DN. The UPF used as an anchor point may be a PDU session anchor or an anchor.

The SSC mode indicates the mode of Session and Service Continuity (SSC) supported by a system and/or each apparatus in the 5GC. To be more specific, the SSC mode may be a mode indicating the type of the session and service continuity supported by a PDU session established between the UE_A 10 and the anchor point). Here, the anchor point may be the UPGW or may be the UPF_A 235. Note that the SSC mode may be a mode indicating a type of the session and service continuity configured for each PDU session. The SSC mode may be configured to include three modes of SSC mode 1, SSC mode 2, and SSC mode 3. The SSC mode is associated with the anchor point and cannot be changed while the PDU session is established.

Furthermore, the SSC mode 1 in the present embodiment is a mode of session and service continuity in which the same UPF is continuously maintained as the anchor point regardless of the access technology such as the Radio Access Technology (RAT) and the cell used in a case that the UE_A 10 connects to a network. To be more specific, the SSC mode 1 may be a mode in which even in a case that the mobility of the UE_A 10 occurs, the session and service continuity is achieved without changing the anchor point used by the established PDU session.

Furthermore, the SSC mode 2 in the present embodiment is a mode of session and service continuity in which, in a case that the PDU session contains an anchor point associated with one SSC mode 2, the PDU session is released and subsequently a PDU session is established. More particularly, the SSC mode 2 is a mode that, in a case that a relocation of the anchor point occurs, the PDU session is temporarily deleted and then a new PDU session is established.

Furthermore, the SSC mode 2 is a mode of the session and service continuity in which the same UPF is continuously maintained as the anchor point only in a serving area of the UPF. To be more specific, the SSC mode 2 may be a mode in which as long as the UE_A 10 is in the serving area of the UPF, the session and service continuity is achieved without changing the UPF used by the established PDU session. Furthermore, the SSC mode 2 may be a mode in which in a case that the mobility of the UE_A 10 such as mobility of exit of the UE_A 10 from the serving area of the UPF occurs, the session and service continuity is achieved by changing the UPF used by the established PDU session.

Here, the serving area of the TUPF may be an area in which one UPF can provide a session and service continuity function, or a subset of the access network such as the RAT or the cell used in a case that the UE_A 10 connects to a network. The subset of the access network may be a network including one or multiple RATs and/or cells, or may be the TA.

Furthermore, the SSC mode 3 in the present embodiment is a mode of session and service continuity in which, without releasing the PDU session between the UE and the anchor point, a PDU session can be established between a new anchor point and the UE for the same DN.

Furthermore, the SSC mode 3 is a mode of the session and service continuity that allows a new PDU session and/or communication path to be established via a new UPF for the same DN before disconnecting the PDU session and/or the communication path established between the UE_A 10 and the UPF. The SSC mode 3 may be a mode of session and service continuity that allows the UE_A 10 to be multi-homed.

And/or, the SSC mode 3 may be a mode that allows session and service continuity using multiple PDU sessions and/or the UPFs associated with the PDU sessions. In other words, in the case of the SSC mode 3, each apparatus may achieve the session and service continuity using the multiple PDU sessions, or may achieve the session and service continuity using the multiple TUPFs.

Here, in the case that each apparatus establishes a new PDU session and/or communication path, a new UPF may be selected by the network, or a new UPF may be an optimal UPF for a place at which the UE_A 10 connects to the network. In a case that the multiple PDU sessions and/or the UPFs used by the PDU sessions are effective, the UE_A 10 may correlate the application and/or flow to the PDU sessions for which communications have been newly established, immediately or based on the completion of the communications.

1.3. Description of Initial Procedure

Next, before describing detailed processes of an initial procedure in the present embodiment, in order to avoid redundant descriptions, terminology specific to the present embodiment and primary identification information used in each procedure will be described beforehand.

"Network" in the present embodiment refers to at least some of the access network_A 20/B 80, the access network_B 80/120, the core network_A 90, the core network_B 190, the DN_A 5, and the PDN_A 6. Additionally, one or more apparatuses included in at least some of the access network_A 20/B 80, the access network_B 80/120, the core network_A 90, the core network_B 190, the DN_A 5, and the PDN_A 6 may also be referred to as a network or network apparatuses. Specifically, the expression "the network performs transmission and/or reception of a message and/or performs a procedure" signifies that "an apparatus (network apparatus) in the network performs transmission and/or reception of a message and/or performs a procedure".

The Session Management (SM) message (also referred to as the Non-Access-Stratum (NAS) SM message or an SM message) in the present embodiment may be a NAS message used in a procedure for the SM (also referred to as a session management procedure or an SM procedure), or may be a control message transmitted and/or received between the UE_A 10 and the SMF_A 230 via the AMF_A 240. Furthermore, the SM message may include a PDU session establishment request message, a PDU session establishment accept message, a PDU session completion message, a PDU session reject message, a PDU session modification request message, a PDU session modification accept message, a PDU session modification reject message, and the like. The procedure for SM may include a PDU session establishment procedure, a PDU session modification procedure, and the like.

A Tracking Area (also referred to as a TA) in the present embodiment is a range that can be represented by location information of the UE_A 10 managed by the core network, and may include one or more cells, for example. Furthermore, the TA may be a range in which a control message such as a paging message is broadcast, or a range in which the UE_A 10 can move without performing a handover procedure.

A TA list in the present embodiment is a list including one or more TAs allocated to the UE_A 10 by the network. Note that, while the UE_A 10 is moving within the one or more TAs included in the TA list, the UE_A 10 can move without performing the registration procedure. In other words, the TA list may be an information group indicating an area in which the UE_A 10 can move without performing the registration procedure.

A Network Slice in the present embodiment is a logical network that provides particular network capabilities and network performance. Hereinafter, the network slice is also referred to as a NW slice.

The Network Slice Instance (NSI) in the present embodiment is an entity of each of one or multiple Network Slices configured in the core network_B 190. Additionally, the NSI in the present embodiment may include a virtual Network Function (NF) generated using a Network Slice Template (NST). Here, the NST is associated with a resource request for providing a required communication service or capability, and is a logical expression of one or multiple Network Functions (NFs). Specifically, the NSI may be an aggregation including multiple NFs in the core network_B 190. The NSI may be a logical network configured to classify the user data delivered through a service or the like. The network slice may include at least one or more NFs. The NF included in the network slice may be an apparatus shared by another network slice or otherwise. The UE_A 10 and/or an apparatus in the network can be assigned to one or multiple network slices, based on registration information such as NSSAI and/or S-NSSAI and/or UE usage type and/or one or multiple network slice type IDs and/or one or multiple NS IDs, and/or APNs.

The S-NSSAI in the present embodiment is an abbreviation for Single Network Slice Selection Assistance information, and is information for identifying a network slice. The S-NSSAI may include an SST (Slice/Service type) and an SD (Slice Differentiator). The S-NSSAI may include only the SST or may include both SST and SD. Here, the SST is information indicating an operation of a network slice expected in terms of function and service. Additionally, the SD may be information that complements the SST in a case that one piece of NSI is selected from multiple pieces of NSI indicated by the SST. The S-NSSAI may be information unique to each Public Land Mobile Network (PLMN), or may be standard information shared between PLMNs, or may be information that is unique to each network operator and that varies with the PLMN.

More specifically, the SST and/or SD may be standard information (Standard Value) common among the PLMNs or may be information (Non Standard Value) that is unique to each network operator and that varies with the PLMN. Additionally, the network may store one or multiple pieces of S-NSSAI in the registration information of the UE_A 10 as the default S-NSSAI.

The Single Network Slice Selection Assistance information (NSSAI) in the present embodiment is a group of S-NSSAI. Each piece of S-NSSAI included in the NSSAI is information that assists the access network or the core network in selecting the NSI. The UE_A 10 may store the NSSAI granted by the network for each PLMN. Additionally, the NSSAI may be information used to select the AMF_A 240.

The operator A network according to the present embodiment is a network operated by a network operator A (operator A). Here, for example, the operator A may have deployed a NW slice common to an operator B described below.

The operator B network according to the present embodiment is a network operated by a network operator B (operator B). Here, for example, the operator B may have deployed a NW slice common to the operator A.

The first NW slice in the present embodiment is an NW slice to which an established PDU session belongs in a case that the UE connects to a particular DN. Note that for example, the first NW slice may be an NW slice managed in the operator A network, or a NW slice that is commonly managed in the operator B network.

The second NW slice in the present embodiment is an NW slice to which another PDU session for connecting to the DN to which the PDU session belonging to the first NW slice is connected belongs to. Note that the first NW slice and the second NW slice may be operated by the same operator or may be operated by different operators.

The equivalent PLMN in the present embodiment is a PLMN treated as the same PLMN as any PLMN in the network.

The Dedicated Core Network (DCN) in the present embodiment is one or multiple specific subscriber type dedicated core networks configured in the core network_A 90. Specifically, a DCN for a UE registered as a Machine to Machine (M2M) communication function user may be configured in the core network_A 90, for example. In addition, a default DCN for a UE with no proper DCN may be configured in the core network_A 90. Furthermore, in the DCN, at least one or more MMEs_40 or SGSNs_A 42 may be located, and further, at least one or more SGWs_A 35, PGWs_A 30 or PCRFs_A 60 may be located. The DCN may be identified by the DCN ID, and the UE may be assigned to one DCN, based on the information such as the UE usage type and/or DCN ID.

The first timer in the present embodiment is a timer configured to manage the initiation of a procedure for session management, such as the PDU session establishment procedure, and/or transmission of a Session Management (SM) message such as a PDU session establishment request message, and may be information indicating a value of a back-off timer for managing the behavior of the session management. Hereinafter, the first timer and/or the back-off timer may be referred to as a timer. While the first timer is running, the initiation of the procedure for the session management and/or the transmission and/or reception of the SM message for each apparatus may be prohibited. Note that the first timer may be configured in association with at least one of the congestion control unit applied by the NW and/or the congestion control unit identified by the UE. For example, the first timer may be configured in at least one unit of an APN/DNN unit, and/or an identification information unit indicating one or more NW slices, and/or a rejection cause value unit in the session management procedure, and/or a session unit in which a rejection is indicated in the session management procedure, and/or a PTI unit for the session management procedure.

The SM message may be an NAS message used in a procedure for the session management, or may be a control message transmitted and/or received between the UE_A 10 and the SMF_A 230 via the AMF_A 240. Furthermore, the SM message may include a PDU session establishment request message, a PDU session establishment accept message, a PDU session completion message, a PDU session reject message, a PDU session modification request message, a PDU session modification accept message, a PDU session modification reject message, and the like. Furthermore, the procedure for the session management may include the PDU session establishment procedure, the PDU session modification procedure, and the like. Additionally, in these procedures, a back-off timer value may be included in each message received by the UE_A 10. The UE may configure a back-off timer received from the NW as a first timer, or may otherwise configure a timer value or configure a random value. Additionally, in a case that the back-off timer received from the NW includes multiple back-off timers, the UE may manage multiple "first timers" corresponding to the multiple back-off timers, or select one timer value from the multiple back-off timer values received by the NW based on a policy held by the UE, and configure the selected timer value as the first timer for management. For example, in a case that the UE receives two back-off timer values, the UE configures the back-off timer values received from the NW as the "first timer #1" and the "first timer #2" respectively for management. Alternatively, one value may be selected from the multiple back-off timer values received from the NW based on the policy held by the UE and set as the first timer for management.

In a case of receiving multiple back-off timer values from the NW, the UE_A 10 may manage multiple "first timers" corresponding to the multiple back-off timers. Here, for a distinction among the multiple "first timers" received by the UE_A 10, the following description may include, for example, the designation "first timer #1" or "first timer #2". Note that the multiple back-off timers may be acquired in a single session management procedure, or may be acquired in a different, another session management procedure.

Here, the first timer may be a back-off timer configured for multiple associated NW slices based on information for identifying one NW slice as described above, to inhibit reconnection, or a back-off timer configured in units of a combination of the APN/DNN and one NW slice, to inhibit reconnection. However, no such limitation is intended, and the first timer may be a back-off timer configured in units of a combination of the APN/DNN and multiple associated NW slices based on information for identifying one NW slice, to inhibit reconnection.

Re-attempt information in the present embodiment is information provided by the network (NW) to indicates to the UE_A 10 whether to allow reconnection to a rejected PDU session using the same identification information. Note that the re-attempt information may be configured for each UTRAN access, E-UTRAN access, NR access, or slice information. Furthermore, the re-attempt information specified in the access unit may be allowed to reconnect to the network based on an access change. The re-attempt information specified in the slice unit may be designated with slice information different from the slice information of the rejected slice, and reconnection using the specified slice information may be allowed.

A network slice association rule in the present embodiment is a rule that associates information for identifying multiple network slices. Note that the network slice association rule may be received in the PDU session reject message or may be previously configured in the UE_A 10. Furthermore, as the network slice association rule, the newest one in the UE_A 10 may be applied. In contrast, the UE_A 10 may perform behavior based on the latest network slice association rule. For example, with the network slice association rule initially configured with the UE_A 10, in a case of receiving a new network slice association rule in the PDU session reject message, the UE_A 10 may update the network slice association rule held in the UE_A 10.

A priority management rule for the back-off timer in the present embodiment is a rule configured in the UE_A 10 to collectively manage, in a single back-off timer, multiple back-off timers activated in multiple PDU sessions. For example, in a case that conflicting or overlapping different types of congestion control are applied and that the UE holds multiple back-off timers, the UE_A 10 may collectively manage multiple back-off timers based on the priority management rule for the back-off timers. Note that a pattern in which different types of congestion control conflict or overlap corresponds to a case where congestion control based solely on the DNN and different types of congestion control based on both the DNN and the slice information are applied at the same time and that, in this case, congestion control based solely on DNN is given top priority. Note that the priority management rule for the back-off timer may not be limited to this rule. The back-off timer may be a first timer included in the PDU session reject message.

A first state in the present embodiment is a state in which each apparatus has completed the registration procedure and the PDU session establishment procedure, and in which one or more of the first to fourth types of congestion control are applied to the UE_A 10 and/or each apparatus. H ere, in the UE_A 10 and/or each apparatus, the UE_A 10 may be registered in the network (RM-REGISTERED state) due to completion of the registration procedure, and the completion of the PDU session establishment procedure may correspond to reception of the PDU session establishment reject message from the network by the UE_A 10.

The congestion control in the present embodiment includes one or more types of congestion control included in the first to fourth types of congestion control. Note that the control of the UE by the NW is achieved by the congestion control recognized by the first timer and the UE and that the UE may store association of such information.

The first type of congestion control in the present embodiment indicates control signal congestion control directed to a DNN parameter. For example, in a case that congestion on DNN #A is detected in the NW and that the NW recognizes a UE-initiated session management request directed only to the DNN #A parameter, the NW can apply the first type of congestion control. Note that, even in a case that the UE-initiated session management request includes no DNN information, on the initiative of the NW, the default DNN may be selected as a congestion control target. Alternatively, even in a case of recognizing that the UE-initiated session management request includes DNN #A and S-NSSAI #A, the NW may apply the first type of congestion control. In a case that the first type of congestion control is applied, the UE may inhibit the UE-initiated session management request intended only for DNN #A.

In other words, the first type of congestion control in the present embodiment is control signal congestion control intended for the DNN and may be congestion control resulting from a congested state of connectivity to the DNN. For example, the first type of congestion control may be congestion control for restricting connection to DNN #A in all of the connectivity. Here, the connection to the DNN #A in all of the connectivity may be connection to DNN #A in connectivity using any S-NSSAI available to the UE, and may be connection to DNN #A via network slices to which the UE can connect. Furthermore, the connection to the DNN #A in all of the connectivity may include connectivity to DNN #A with no intermediary of a network slice.

The second type of congestion control in the present embodiment indicates control signal congestion control directed to an S-NSSI parameter. For example, in a case that the control signal congestion on S-NSSAI #A is detected in the NW and that the NW recognizes a UE-initiated session management request directed only to the S-NSSAI #A parameter, the NW can apply the second type of congestion control. In a case that the second type of congestion control is applied, the UE may inhibit the UE-initiated session management request directed only to S-NSSAI #A.

In other words, the second type of congestion control in the present embodiment is control signal congestion control intended for the S-NSSAI and may be congestion control resulting from a congested state of the network slice selected based on the S-NSSAI. For example, the second type of congestion control may be congestion control for restricting all connections based on S-NSSAI #A. That is, the second type of congestion control may be congestion control for restricting connection to all DNNs via network slices selected by using S-NSSAI #A.

The third type of congestion control in the present embodiment indicates control signal congestion control directed to the DNN and S-NSSAI parameters. For example, in a case that control signal congestion on DNN #A and control signal congestion on S-NSSAI #A are detected at the same time in the NW and that the NW recognizes a UE-initiated session management request directed to the DNN #A and S-NSSAI #A parameters, the NW may apply the third type of congestion control. Note that even in a case that the UE-initiated session management request includes no information indicating the DNN, then on the initiative of the NW, the default DNN may be selected also as a congestion control target. In a case that the third type of congestion control is applied, the UE may inhibit the UE-initiated session management request directed to the DNN #A and S-NSSAI #A parameters.

In other words, the third type of congestion control in the present embodiment is control signal congestion control intended for the DNN and S-NSSAI parameters, and may be congestion control resulting from a congested state of the connectivity to the DNN via the network slice selected based on the S-NSSAI. For example, the third type of congestion control may be congestion control for restricting the connection to DNN #A included in the connectivity based on S-NSSAI #A.

The fourth type of congestion control in the present embodiment indicates control signal congestion control directed to at least one of the DNN and/or S-NSSAI parameter. For example, in a case that control signal congestion on DNN #A and control signal congestion on S-NSSAI #A are simultaneously detected in the NW and that the NW recognizes a UE-initiated session management request directed to at least one of the DNN #A and/or S-NSSAI #A parameter, the NW may apply the fourth type of congestion control. Note that even in a case that the UE-initiated session management request includes no information indicating the DNN, then on the initiative of the NW, the default DNN may be selected also as a congestion control target. In a case that the fourth type of congestion control is applied, the UE may inhibit the UE-initiated session management request directed to at least one of the DNN #A and/or S-NSSAI #A parameter.

In other words, the fourth type of congestion control in the present embodiment is control signal congestion control intended for the DNN and S-NSSAI parameters, and may be congestion control resulting from a congested state of the network slice selected based on the S-NSSAI and the connectivity to the DNN. For example, the fourth type of congestion control is congestion control for restricting all connections based on S-NSSAI #A and may be congestion control for restricting the connection to DNN #A in all of the connectivity. That is, the fourth type of congestion control is congestion control for restricting the connection to all DNNs via network slices selected based on S-NSSAI #A, and may be congestion control for restricting the connection to DNN #A in all of the connectivity. Here, the connection to the DNN #A in all of the connectivity may be connection to DNN #A in connectivity using any S-NSSAI available to the UE, and may be connection to DNN #A via network slices to which the UE can connect. Furthermore, the connection to the DNN #A in all of the connectivity may include connectivity to DNN #A with no intermediary of a network slice.

Thus, the fourth type of congestion control using DNN #A and S-NSSAI #A as parameters may be congestion control that simultaneously performs the first type of congestion control using DNN #A as a parameter and the second type of congestion control using S-NSSAI #A as a parameter.

First behavior in the present embodiment is behavior in which the UE stores slice information transmitted in the first PDU session establishment request message in association with the transmitted PDU session identification information. In the first behavior, the UE may store slice information transmitted in the first PDU session establishment request message or may store slice information received in a case that the first PDU session establishment request is rejected.

Second behavior in the present embodiment is behavior in which the UE transmits a PDU session establishment request for connecting to an APN/DNN identical to the APN/DNN included in the first PDU session establishment request using another slice information different from the slice information specified in the first PDU session establishment. Specifically, the second behavior may be such that in a case that the back-off timer value the UE has received from the network is zero or invalid, the UE uses slice information separate from the slice information specified in the first PDU session establishment to transmit a PDU session establishment request for connecting to an APN/DNN identical to the APN/DNN included in the first PDU session establishment request. Additionally, the second behavior may be as follows: in a case that the first PDU session is rejected because wireless access to the particular PLMN to which the designated APN/DNN is connected is not supported, or in a case that the first PDU session is rejected for a temporary cause, the UE uses slice information separate from the slice information specified in the first PDU session establishment to transmit a PDU session establishment request for connecting to an APN/DNN identical to the APN/DNN included in the first PDU session establishment request.

Third behavior in the present embodiment is behavior in which, in a case that the PDU session establishment request is rejected, the UE transmits no new PDU session establishment request with the identical identification information until the first timer expires. Specifically, the third behavior may be behavior in which, in a case that the back-off timer value received from the network is not zero or invalid, the UE transmits no new PDU session establishment request with the identical identification information until the first timer expires. Here, the identical identification information may mean whether the first piece of identification information and/or the second piece of identification information carried in the new PDU session establishment request is identical to the first piece of identification information and/or the second piece of identification information transmitted in the rejected PDU session establishment request.

Additionally, the behavior may be as follows: in a case that another PLMN or another NW slice is selected and that a rejection cause for a configuration failure for network operation is received, and that the back-off timer is active that has been received in a case that the first PDU session establishment request is rejected, no new PDU session establishment request using the identical identification information is transmitted until the first timer expires.

In particular, the PDU session in which no new PDU session establishment request in the third behavior is transmitted may be a PDU session to which congestion control associated with the first timer is applied. More specifically, the third behavior may be behavior such that no new PDU session establishment request is transmitted for the PDU session based on the connectivity corresponding to the type of the congestion control associated with the first timer, the PDU session using the DNN and/or S-NSSAI associated with the congestion control. Note that the processing in which the present behavior prohibits the UE may include the initiation of the procedure for the session management including the PDU session establishment request and/or transmission and/or reception of an SM message.

Fourth behavior in the present embodiment is behavior in which, in a case that the PDU session establishment request is rejected, the UE transmits no new PDU session establishment request carrying no slice information or DNN/APN information until the first timer expires. Specifically, the fourth behavior may be behavior in which, in a case that the back-off timer received from the network is not zero or invalid, the UE transmits no new PDU session establishment request carrying no slice information or DNN/APN information until the first timer expires.

Fifth behavior in the present embodiment is behavior in which, in a case that the PDU session establishment request is rejected, the UE transmits no new PDU session establishment request with the identical identification information. Specifically, the fifth behavior may be behavior in which, in a case that the UE and the network differ in a PDP type supported and are served by equivalent PLMNs, the UE transmits no new PDU session establishment request with the identical identification information.

Sixth behavior in the present embodiment is behavior in which, in a case that the PDU session establishment request is rejected, the UE transmits a new PDU session establishment request as an initial procedure by using the identical identification information. Specifically, the sixth behavior may be behavior in which, in a case that the first PDU session establishment request is rejected because no target PDN session context is present in handover from non-3GPP access, the UE transmits a new PDU session establishment request as an initial procedure by using the identical identification information.

Seventh behavior in the present embodiment is behavior in which, in a case of selecting another NW slice in a procedure for selecting a PLMN, the UE continues the back-off timer received in a case that the last PDU session establishment request is rejected. Specifically, the seventh behavior may be behavior in which, in a case that the first PDU session establishment request is rejected, in a case that PLMN selection has been performed and that an NW slice can be specified that is the same as the NW slice specified in the first PDU session establishment request in the selected PLMN, the UE continues the back-off timer received in a case that the first PDU session establishment request is rejected.

Eighth behavior in the present embodiment is behavior in which the UE configures a value notified from the network or a value previously configured for the UE as a first timer value. Specifically, the eighth behavior may be behavior in which the UE configures, as the first timer value, the back-off timer value received in the reject notification for the first PDU session establishment request, or configures, as the first timer value, a value previously configured or held in the UE. Note that the case where the timer previously configured or held in the UE is configured as the first timer value may be limited to a case where the UE is served by an HPLMN or an equivalent PLMN.

Ninth behavior in the present embodiment is behavior in which, in a case that the PDU session establishment request is rejected, the UE transmits no new PDU session establishment request until terminal power on/off or removal and insertion of a Universal Subscriber Identity Module (USIM). Specifically, in the ninth behavior, in a case that the back-off timer received from the network is invalid or that the first PDU session rejection cause is a difference in PDP type between the UE and the network, the UE transmits no new PDU session establishment request until terminal power on/off or removal and insertion of the USIM. Additionally, the ninth behavior may be behavior in which, in a case that the first PDU session is rejected because the designated APN/DNN is not supported by the radio in the connected PLMN and that no information element of the back-off timer is obtained from the network, with no Re-attempt information obtained or in a case that PDU session reconnection to an equivalent PLMN is allowed, no new PDU session establishment request is transmitted in the connected PLMN until terminal power on/off or removal and insertion of the USIM. Additionally, the ninth behavior may be behavior in which, in a case that the first PDU session is rejected because the designated APN/DNN is not supported by the radio in the connected PLMN and that no information element of the back-off timer is obtained from the network, with no Re-attempt information obtained or in a case that PDU session reconnection to an equivalent PLMN is not allowed, no new PDU session establishment request is transmitted in the connected PLMN until terminal power on/off or removal and insertion of the USIM. Additionally, the ninth behavior may be behavior in which, in a case that the first PDU session is rejected because the designated APN/DNN is not supported by the radio in the connected PLMN and that the back-off timer from the network is not zero or invalid, no new PDU session establishment request is transmitted until terminal power on/off or removal and insertion of the USIM. In addition, the ninth behavior may be behavior in which, in a case that the first PDU session is rejected because the designated APN/DNN is not supported by the radio in the connected PLMN and that the back-off timer from the network is invalid, no new PDU session establishment request is transmitted until terminal power on/off or removal and insertion of the USIM.

Tenth behavior in the present embodiment is behavior in which, in a case that the PDU session establishment request is rejected, the UE transmits a new PDU session establishment request. Specifically, the 10th behavior may be behavior in which, in a case that the back-off timer received from the network is zero or in a case that the first PDU session establishment request is rejected for a temporary cause and that back-off timer information element itself is not notified from the network, the UE transmits a new PDU session establishment request. Additionally, the 10th behavior may be behavior in which, in a case that another PLMN or another NW slice is selected and that the first PDU session establishment request is rejected for a temporary cause and that the back-off timer is not activated for the target APN/DNN in the selected PLMN or in a case that the back-off timer received from the network is invalid, a new PDU session establishment request is transmitted. Additionally, the 10th behavior may be behavior in which, in a case that the first PDU session establishment request is rejected due to a difference in PDP type between the UE and the network and that, in a case that a different PLMN is selected, no Re-attempt information is received or a PLMN that is not included in an equivalent PLMN list is selected, or in a case that the PDP type is changed or in a case that terminal power on/off or removal and insertion of the USIM are performed, a new PDU session establishment request is transmitted. Additionally, the 10th behavior may be behavior in which, in a case that the first PDU session is rejected because the designated APN/DNN is not supported by the radio in the connected PLMN and that the back-off timer notified from the network is zero, a new PDU session establishment request is transmitted.

Eleventh behavior in the present embodiment is behavior in which the UE ignores the first timer and the Re-attempt information. Specifically, the 11th behavior may be behavior in which, in a case that the first PDU session establishment request is rejected because no target PDN session context is present in handover from non-3GPP access or that the first PDU session establishment is rejected because the number of bearers provided in the PDN connection reaches a maximum allowable value, the UE ignores the first timer and the Re-attempt information.

Twelfth behavior in the present embodiment is behavior in which, based on information for identifying one NW slice received in the reject notification for the first PDU session establishment request, the UE determines information for identifying multiple associated NW slices, and based on information for identifying one NW slice, the UE inhibits reconnection to the multiple associated NW slices. Specifically, the 12 behavior may be behavior that the UE derives information to identify another NW slice associated with information for identifying a NW slice notified with the first PDU session establishment request reject based on the network slice association rule. Note that the network slice association rule may be previously configured in the UE or may be notified from the network in a reject notification for the PDU session establishment.

Thirteenth behavior in the present embodiment may be behavior in which, in a case that multiple, different types of congestion control are activated for establishment of one or multiple PDU sessions by the identical UE and that multiple timers are provided from the network, the UE manages the timers based on the priority management rule for the back-off timer. For example, a first PDU session establishment request for a combination of DNN_1 and slice_1 from the UE is subjected to congestion control based on both DNN and slice information, and the UE receives a first timer #1. Furthermore, the UE makes a second PDU session establishment request for a combination of DNN_1 and slice_2, and is subjected to congestion control based only on the DNN, and receives a first timer #2. At this time, the UE is based on the priority management rule for the back-off timer, and the behavior of PDU session reestablishment by the UE may be managed by the first timer #2, which is prioritized. Specifically, the value of the timer held by the UE may be overwritten with the timer value generated by prioritized congestion control.

Fourteenth behavior in the present embodiment may be behavior in which, in a case that multiple, different types of congestion control are applied for establishment of one or multiple PDU sessions by the identical UE and that multiple timers are provided from the network, the UE manages the timers for each session management instance (PDU session unit). For example, in a case that first PDU session establishment of a combination of DNN #1 and slice #1 by the UE is subjected to congestion based on both DNN and slice information, the UE manages the back-off timer value of interest as the first timer #1. Thereafter, furthermore, in a case that, at a time when the UE attempts to establish a PDU session for a combination of DNN #1 and slice #2 as a second PDU session, the establishment is subjected to congestion based only on the DNN, the UE manages the back-off timer value of interest as the first timer #2. At this time, the UE simultaneously manages multiple timers (here, the first timer #1 and the first timer #2). Specifically, the UE manages the timers in units of the session management instance/PDU session. Alternatively, in a case of simultaneously receiving multiple timers in one session management procedure, the UE simultaneously manages the back-off timers of interest in the units of congestion control identified by the UE.

Fifteenth behavior in the present embodiment may be behavior in which the UE_A 10 performs first identification processing for identifying which of the first to fourth types of congestion control is to be applied and second identification processing for identifying the DNN and/or the S-NSSAI associated with the applied congestion control. Note that the first identification processing may include identification based on one or more pieces of identification information from at least a first to a fourth pieces of identification information and/or one or more pieces of identification information from at least an 11th to an 18th pieces of identification information. Similarly, the second identification processing may include identification based on one or more pieces of identification information from at least the first to the fourth pieces of identification information and/or one or more pieces of identification information from at least the 11th to the 18th pieces of identification information.

An example of the first identification processing will be described below. In the first identification processing, the type of congestion control applied in a case that any one of the following cases or a combination of two or more of the following cases are satisfied may be identified as the first type of congestion control.

At least a case where the 15th piece of identification information is a value corresponding to the first type of congestion control.

At least a case where the 16th piece of identification information is a value corresponding to the first type of congestion control.

At least a case where the 14th piece of identification information includes information indicating the first type of congestion control.

At least a case where the 17th piece of identification information includes only the DNN and does not include the S-NSSAI.

A case where, in a case that the 16th piece of identification information is information for identifying identification information for one of the first type of congestion control and the second type of congestion control and that the 16th piece of identification information is information enabling configuration, for the 16th piece of identification information, of only the value corresponding to the second type of congestion control, then at least the 16th piece of identification information is not received.

A case where, in a case that the 16th piece of identification information is information for identifying identification information for one of the first type of congestion control and the fourth type of congestion control and that the 16th piece of identification information is information enabling configuration, for the 16th piece of identification information, of only the value corresponding to the fourth type of congestion control, then at least the 16th piece of identification information is not received.

A case where, in a case that the 16th piece of identification information is information for identifying the identification information for one of the first type of congestion control, the second type of congestion control, and the fourth type of congestion control and that the 16th piece of identification information is information enabling configuration, for the 16th piece of identification information, of only the value corresponding to the second type of congestion control and the value corresponding to the fourth type of congestion control, then at least the 16th piece of identification information is not received.

However, the present invention is not limited to the example described above, and the UE_A 10 may perform identification based on one or more pieces of identification information from at least the first to the fourth pieces of identification information and/or one piece of identification information from at least the 11th to the 18th pieces of identification information or a combination of two or more pieces of identification information.

In the first identification processing, the type of congestion control applied in a case that any one of the following cases or a combination of two or more of the following cases are satisfied may be identified as the second type of congestion control.

At least a case where the 15th piece of identification information is a value corresponding to the second type of congestion control.

At least a case where the 16th piece of identification information is a value corresponding to the second type of congestion control.

At least a case where the 14th piece of identification information includes information indicating the second type of congestion control.

At least a case where the 17th piece of identification information includes only the S-NSSAI and does not include the DNN.

A case where, in a case that the 16th piece of identification information is information for identifying identification information for one of the first type of congestion control and the second type of congestion control and that the 16th piece of identification information is information enabling configuration, for the 16th piece of identification information, of only the value corresponding to the first type of congestion control, then at least the 16th piece of identification information is not received.

A case where, in a case that the 16th piece of identification information is information for identifying identification information for one of the second type of congestion control and the third type of congestion control and that the 16th piece of identification information is information enabling configuration, for the 16th piece of identification information, of only the value corresponding to the third type of congestion control, then at least the 16th piece of identification information is not received.

A case where, in a case that the 16th piece of identification information is information for identifying identification information for one of the second type of congestion control, the third type of congestion control, and the fourth type of congestion control and that the 16th piece of identification information is information enabling configuration, for the 16th piece of identification information, of only the value corresponding to the third type of congestion control and the value corresponding to the fourth type of congestion control, then at least the 16th piece of identification information is not received.

However, the present invention is not limited to the example described above, and the UE_A 10 may perform identification based on one or more pieces of identification information from at least the first to the fourth pieces of identification information and/or one piece of identification information from at least the 11th to the 18th pieces of identification information or a combination of two or more pieces of identification information.

In the first identification processing, the type of congestion control applied in a case that any one of the following cases or a combination of two or more of the following cases are satisfied may be identified as the third type of congestion control.

At least a case where the 15th piece of identification information is a value corresponding to the third type of congestion control.

At least a case where the 16th piece of identification information is a value corresponding to the third type of congestion control.

At least a case where the 14th piece of identification information includes information indicating the third type of congestion control.

At least a case where the 15th piece of identification information is a value corresponding to multiple types of congestion control including the third type of congestion control and not including the fourth type of congestion control and where the 17th piece of identification information includes the S-NSSAI and the DNN.

Case where, in a case that the 16th piece of identification information is information for identifying identification information for one of the third type of congestion control and the fourth type of congestion control and that the 16th piece of identification information is information enabling configuration, for the 16th piece of identification information, of only the value corresponding to the fourth type of congestion control, then at least the 16th piece of identification information is not received.

A case where, in a case that the 16th piece of identification information is information for identifying identification information for one of the second type of congestion control and the third type of congestion control and that the 16th piece of identification information is information enabling configuration, for the 16th piece of identification information, of only the value corresponding to the second type of congestion control, then at least the 16th piece of identification information is not received.

A case where, in a case that the 16th piece of identification information is information for identifying identification information for one of the second type of congestion control, the third type of congestion control, and the fourth type of congestion control and that the 16th piece of identification information is information enabling configuration, for the 16th piece of identification information, of only the value corresponding to the second type of congestion control and the value corresponding to the fourth type of congestion control, then at least the 16th piece of identification information is not received.

However, the present invention is not limited to the example described above, and the UE_A 10 may perform identification based on one or more pieces of identification information from at least the first to the fourth pieces of identification information and/or one piece of identification information from at least the 11th to the 18th pieces of identification information or a combination of two or more pieces of identification information.

In the first identification process, the type of congestion control applied in a case that any one of the following cases or a combination of two or more of the following cases are satisfied may be identified as the fourth type of congestion control.

At least a case where the 15th piece of identification information is a value corresponding to the fourth type of congestion control.

At least a case where the 16th piece of identification information is a value corresponding to the fourth type of congestion control.

At least a case where the 14th piece of identification information includes information indicating the fourth type of congestion control.

At least a case where the 15th piece of identification information is a value corresponding to multiple types of congestion control including the fourth type of congestion control and not including the third type of congestion control and where the 17th piece of identification information includes the S-NSSAI and the DNN.

A case where, in a case that the 16th piece of identification information is information for identifying identification information for one of the third type of congestion control and the fourth type of congestion control and that the 16th piece of identification information is information enabling configuration, for the 16th piece of identification information, of only the value corresponding to the third type of congestion control, then at least the 16th piece of identification information is not received.

A case where, in a case that the 16th piece of identification information is information for identifying identification information for one of the second type of congestion control and the fourth type of congestion control and that the 16th piece of identification information is information enabling configuration, for the 16th piece of identification information, of only the value corresponding to the second type of congestion control, then at least the 16th piece of identification information is not received.

A case where, in a case that the 16th piece of identification information is information for identifying identification information for one of the first type of congestion control and the fourth type of congestion control and that the 16th piece of identification information is information enabling configuration, for the 16th piece of identification information, of only the value corresponding to the first type of congestion control, then at least the 16th piece of identification information is not received.

A case where, in a case that the 16th piece of identification information is information for identifying identification information for one of the second type of congestion control, the third type of congestion control and the fourth type of congestion control and that the 16th piece of identification information is information enabling configuration, for the 16th piece of identification information, of only the value corresponding to the second type of congestion control and the value corresponding to the third type of congestion control, then at least the 16th piece of identification information is not received.

A case where, in a case that the 16th piece of identification information is information for identifying identification information for one of the first type of congestion control, the second type of congestion control and the fourth type of congestion control and that the 16th piece of identification information is information enabling configuration, for the 16th piece of identification information, of only the value corresponding to the first type of congestion control and the value corresponding to the second type of congestion control, then at least the 16th piece of identification information is not received.

However, the present invention is not limited to the example described above, and the UE_A 10 may perform identification based on one or more pieces of identification information from at least the first to the fourth pieces of identification information and/or one piece of identification information from at least the 11th to the 18th pieces of identification information or a combination of two or more pieces of identification information, or using any other means.

As described above, the type of congestion control may be identified by the first identification processing.

Now, an example of the second identification processing will be described. Note that the second identification processing may be processing for identifying the DNN and/or S-NSSAI corresponding to the type of the congestion control identified by the first identification processing.

More specifically, the DNN corresponding to the first type of congestion control, the third type of congestion control, and the fourth type of congestion control may be determined based on the 12th piece of identification information. And/or the DNN corresponding to the first type of congestion control, the third type of congestion control, and the fourth type of congestion control may be determined based on the 17th piece of identification information. And/or the DNN corresponding to the first type of congestion control, the third type of congestion control, and the fourth type of congestion control may be determined based on the second piece of identification information.

Accordingly, the DNN corresponding to the first type of congestion control, the third type of congestion control, and the fourth type of congestion control may be the DNN indicated by the 12th piece of identification information. And/or the DNN corresponding to the first type of congestion control, the third type of congestion control, and the fourth type of congestion control may be the DNN included in the 17th piece of identification information. And/or the DNN corresponding to the first type of congestion control, the third type of congestion control, and the fourth type of congestion control may be the DNN indicated by the second piece of identification information.

Additionally, the S-NSSAI corresponding to the second type of congestion control, the third type of congestion control, and the fourth type of congestion control may be determined based on the 17th piece of identification information. And/or the DNN corresponding to the first type of congestion control, the third type of congestion control, and the fourth type of congestion control may be determined based on the first piece of identification information.

Thus, the DNN corresponding to the first type of congestion control, the third type of congestion control, and the fourth type of congestion control may be the S-NSSAI indicated by the 17th piece of identification information. And/or the DNN corresponding to the first type of congestion control, the third type of congestion control, and the fourth type of congestion control may be the S-NSSAI included in the first piece of identification information.

However, the present invention is not limited to the example described above, and the UE_A 10 may perform identification based on one or more pieces of identification information from at least the first to the fourth pieces of identification information and/or one piece of identification information from at least the 11th to the 18th pieces of identification information or a combination of two or more pieces of identification information, or using any other means.

Based on the above-described 15th behavior, the UE_A 10 may identify the congestion control that the core network_B 190 applies to the UE_A 10. In other words, the UE_A 10 may identify the corresponding type of congestion control and the corresponding S-NSSAI and/or DNN as applied congestion control based on the 15th behavior. Note that the UE_A 10 may store and manage one or multiple pieces of identification information from the first to fourth pieces of identification information and the 11th to 18th pieces of identification information in association with the applied congestion control. Here, the third piece of identification information, and/or the fourth piece of identification information, and/or the 13th piece of identification information may be stored and managed as information for identifying the applied congestion control.

The 16th behavior in the present embodiment is behavior in which, in a case that an NW-initiated session management procedure is performed while the first timer is active, the UE stops the first timer.

Here, the 16th behavior may be behavior in which, for example, in a case that multiple first timers are active, the UE determines, based on the 21st piece of identification information, one of the active first timers to be stopped and stops the determined first timer. And/or the 16th behavior may be behavior in which the first timer associated with congestion control identified by the 17th behavior is stopped. Note that, in a case that multiple types of congestion control are identified by the 17th behavior, the timers associated with the respective types of congestion control may each be stopped.

The 17th behavior in the present embodiment may be behavior in which the UE identifies, based on reception of a control message transmitted by the core network, the congestion control that is included in the one or multiple types of congestion control applied by the UE and for which the application is to be stopped. For example, the UE may identify, based on the 21st identification information, the congestion control for which the application is to be stopped or changed.

Specifically, as described above, in the fourth step of processing, the UE stores, for example, the third piece of identification information, and/or the fourth piece of identification information, and/or the 13th piece of identification information and/or the like as information for identifying congestion control, and may identify the congestion control for which the identification information matches the 13th piece of identification information included in the 21st identification information may be identified as the congestion control for which the application is to be stopped.

And/or the UE may identify the congestion control for which the application is to be stopped, based on one piece of identification information or a combination of multiple pieces of identification information from the 11th to 18th pieces of identification information included in the 21st piece of identification information. Here, the details of the identification method may be the same as the identification processing in the 15th behavior described in the fourth step of processing in an example of the PDU session establishment procedure described below. That is, the UE may identify the congestion control to be stopped, by using a method similar to the method for identifying the applied congestion control.

Note that the UE may identify multiple types of congestion control for which the application is to be stopped. Hereinafter, a method will be described that includes determining the congestion control identified by using the above-described method to be the first type of congestion control and identifying the second type of congestion control different from the first type of congestion control.

For example, the UE may identify, as the second type of congestion control, the congestion control associated with the same DNN as the DNN associated with the first type of congestion control. And/or the UE may identify the congestion control associated with the same S-NSSAI as the S-NSSAI associated with the first type of congestion control as the second type of congestion control. Note that the configuration may be such that identifying multiple types of congestion control for which the application is to be stopped is performed only in a case that the first type of congestion control and/or the second type of congestion control is of a particular type of congestion control.

Specifically, in a case that the first type of congestion control is one of the first to fourth types of congestion control, the UE may identify the second type of congestion control. And/or in identifying the second type of congestion control, the UE may identify the second type of congestion control in a case that the congestion control to be searched for is one of the first to fourth types of congestion control. Note that it is sufficient that what type of the first type of congestion control and/or the second type of identification information enables multiple types of congestion control to be identified may be initially configured in the core network and/or the UE. Note that the number of particular types of congestion control for which identification is allowed need not be specified as one and that multiple types of congestion control may be configured.

The first piece of identification information in the present embodiment is information for identifying belonging to a first NW slice. In other words, the first piece of identification information may be information indicating that the UE desires to establish a PDU session belonging to the first NW slice. Specifically, for example, the first piece of identification information may be information for identifying the first NW slice. Note that the slice information may be identification information indicating a specific S-NSSAI. Note that the first piece of identification information may be information for identifying a particular NW slice in the operator A network, or may be information for identifying identical NW slices in common in operator B (other operators other than operator A). Furthermore, the first piece of identification information may be information for identifying the first NW slice configured from the HPLMN, information for identifying the first NW slice obtained from the AMF in the registration procedure, or information for identifying the first NW slice granted from the network. Furthermore, the first piece of identification information may be information for identifying the first NW slice stored for each PLMN.

The second piece of identification information in the present embodiment may the Data Network Name (DNN) and may be used to identify the Data Network (DN).

The third piece of identification information in the present embodiment may be a PDU Session ID and may be information used to identify the PDU Session.

The fourth piece of identification information in the present embodiment may a Procedure transaction identity (PTI) and may be information for identifying, as a single group, transmission and/or reception of a sequence of messages for a particular session management procedure and may further be information used to identify and/or distinguish the transmission and/or reception from transmission and/or reception of other sequences of session management related messages.

The 11th piece of identification information in the present embodiment may be information indicating that a request for PDU session establishment or a request for PDU session modification is rejected. Note that the request for PDU session establishment or the request for PDU session modification is a request made by the UE and includes the DNN and/or S-NSSAI. That is, the 11th piece of identification information may be information indicating that the NW rejects the establishment request or modification request for the PDU session corresponding to the DNN and/or S-NSSA.

Additionally, the NW may also indicate the congestion control to the UE by transmitting at least one of the 12th to 18th pieces of identification information to the UE along with the 11th identification information. In other words, the NW may notify the UE of the congestion control corresponding to one piece of identification information or a combination of multiple pieces of identification information from the 12th to 18th pieces of identification information. On the other hand, the UE may identify the congestion control corresponding to one piece of identification information or a combination of multiple pieces of identification information from the 12th to 18th pieces of identification information, and perform processing based on the identified congestion control. Specifically, the UE may initiate counting the first timers associated with the identified congestion control. Note that the timer value of the first timer may be determined by using the 14th piece of identification information or a timer value configured by another method such as the use of a value previously saved by the UE, or a random value may be configured as the timer value.

The 12th piece of identification information in the present embodiment may be DNN not granted by the network or may be information indicating that the DNN identified by the second piece of identification information has not been granted. Furthermore, the 12th identification information may be the same DNN as that of the second piece of identification information.

The 13th piece of identification information in the present embodiment may be a PDU Session ID and/or PTI, and may be a PDU session ID and/or PTI not granted by the network, or may be information indicating that the PDU session ID and/or PTI identified by the third piece of identification information has not been granted. Furthermore, the PDU Session ID of the 13th piece of identification information may be the same PDU session ID as that of the third piece of identification information. Additionally, the PTI of the 13th piece of identification information may be the same PTI as that of the fourth piece of identification information.

Here, the 13th piece of identification information may be used as information for identifying the congestion control that the NW notifies to the UE based on the rejection of PDU session establishment. In other words, the UE may store and manage the 13th piece of identification information in association with the congestion control performed based on the 15th behavior and use the 13th piece of identification information as information for identifying the performed congestion control. Note that the information for identifying the congestion control may include a combination of the 13th piece of identification information and one or more pieces of identification information from the 14th to 18th pieces of identification information.

The 14th piece of identification information in the present embodiment may be information indicating the value of the back-off timer. In other words, the back-off timer may be a value indicating an effective period of the congestion control that the NW notifies to the UE based on the rejection of PDU session establishment. In other words, the UE may use the 14th piece of identification information as the timer value in the 15th behavior performed in response to the reception of the 14th piece of identification information. Furthermore, the 14th piece of identification information may include information for identifying the type of congestion control in addition to the timer value. Specifically, the 14th piece of identification information may include information for identifying which of the first to fourth types of congestion control corresponds to the congestion control of interest. For example, the information for identifying the congestion control type may be a timer name that identifies each type of congestion control, or a flag that identifies each type of congestion control. No such limitation is intended, and any other identification method may be used, such as identification based on the location in the control message where the information is stored.

The 15th identification information in the present embodiment is information indicating one or more Cause Values indicating the cause of rejection of the present procedure. In other words, the cause value may be information indicating the congestion control applied to the present procedure by the NW or information indicating a cause value for the cause of rejection of the present procedure applied by the NW, other than congestion control.

Note that the cause value may be information for identifying which of the first to fourth type of congestion control the NW notifies to the UE based on the rejection of PDU session establishment. In this case, the NW may transmit a different value depending on each of the first to fourth types of congestion control, to the UE as the cause value. The UE may understand, in advance, the meaning of the values transmitted as cause values, and in the 15th behavior, may identify, based at least on the 15th piece of identification information, which of the first to fourth types of congestion control corresponds to the congestion control of interest.

Alternatively, the cause value may be information for identifying whether the congestion control that the NW notifies to the UE based on the rejection of PDU session establishment is the first type of congestion control or one of the second, third, and fourth types of congestion control. In this case, depending on a case where the congestion control to be notified is the first type of congestion control or a case where the congestion control to be notified is one of the second, third, and fourth types of congestion control, the NW may transmit a different value to the UE as a cause value. The UE may understand, in advance, the meaning of the values transmitted as cause values, and in the 15th behavior, may identify, based at least on the 15th piece of identification information, whether the congestion control to be notified corresponds to the first type of congestion control or the second, third, and fourth types of congestion control.

Alternatively, the cause value may be information for identifying whether the congestion control that the NW notifies to the UE based on the rejection of PDU session establishment is the first type of congestion control, the second type of congestion control, or one of the third and fourth types of congestion control. In this case, depending on a case where the congestion control to be notified is the first type of congestion control, a case where the congestion control to be notified is the second type of congestion control, or a case where the congestion control to be notified is one of the third and fourth types of congestion control, the NW may transmit a different value to the UE as a cause value. The UE may understand, in advance, the meaning of the values transmitted as cause values, and in the 15th behavior, may identify, based at least on the 15th piece of identification information, whether the congestion control to be notified is the first type of congestion control, the second type of congestion control, or one of the third and fourth types of congestion control.

Alternatively, the cause value may be information for identifying whether the congestion control that the NW notifies to the UE based on the rejection of PDU session establishment corresponds to the first or second type of congestion control or the third or fourth type of congestion control. In this case, depending on a case where the congestion control to be notified is the first or second type of congestion control or a case where the congestion control to be notified is the third or fourth type of congestion control, the NW may transmit a different value to the UE as a cause value. The UE may understand, in advance, the meaning of the values transmitted as cause values, and in the 15th behavior, may identify, based at least on the 15th piece of identification information, whether the congestion control to be notified is the first or second type of congestion control or the third or fourth type of congestion control.

Alternatively, the cause value may be information for identifying whether the congestion control that the NW notifies to the UE based on the rejection of PDU session establishment corresponds to the second or third type of congestion control or the first or fourth type of congestion control. In this case, depending on a case where the congestion control to be notified is the second or third type of congestion control or a case where the congestion control to be notified is the first or fourth type of congestion control, the NW may transmit a different value to the UE as a cause value. The UE may understand, in advance, the meaning of the values transmitted as cause values, and in the 15th behavior, may identify, based at least on the 15th piece of identification information, whether the congestion control to be notified is the second or third type of congestion control or the first or fourth type of congestion control.

Alternatively, the cause value may be information for identifying whether the congestion control that the NW notifies to the UE based on the rejection of PDU session establishment corresponds to the second or fourth type of congestion control or the first or third type of congestion control. In this case, depending on a case where the congestion control to be notified is the second or fourth type of congestion control or a case where the congestion control to be notified is the first or third type of congestion control, the NW may transmit a different value to the UE as a cause value. The UE may understand, in advance, the meaning of the values transmitted as cause values, and in the 15th behavior, may identify, based at least on the 15th piece of identification information, whether the congestion control to be notified is the second or fourth type of congestion control or the first or third type of congestion control.

Alternatively, the cause value may be information indicating that the NW performs congestion control for the UE based on the rejection of PDU session establishment. In other words, the cause value may be information for causing one of the first to fourth types of congestion control to be performed for the UE. In this case, the cause value need not be information allowing certain congestion control to be identified.

Note that in the present embodiment, in a case that the third type of congestion control is not performed, the implications, corresponding to the third type of congestion control, of the cause value in the 15th piece of identification information as described above are unnecessary, and the cause value in the 15th piece of identification information may correspond to the above description from which the processing, description, and implications related to the third type of congestion control are omitted. Additionally, in the present embodiment, in a case that the fourth type of congestion control is not performed, the implications, corresponding to the fourth type of congestion control, of the cause value in the 15th piece of identification information as described above are unnecessary, and the cause value in the 15th piece of identification information may correspond to the above description from which the processing, description, and implications related to the fourth type of congestion control are omitted.

As a more detailed example, the 15th piece of identification information for identifying the first type of congestion control may be a cause value indicating Insufficient resources. The 15th piece of identification information for identifying the second type of congestion control may be a cause value indicating Insufficient resources for specific slice. The 15th piece of identification information for identifying the third type of congestion control may be a cause value indicating Insufficient resources for specific slice and DNN.

In this way, the 15th piece of identification information may be information allowing the type of congestion control to be identified, and indicating which type of congestion control corresponds to the back-off timer and/or the back-off timer value indicated by the 14th piece of identification information.

Accordingly, the UE_A 10 may identify the type of congestion control based on the 15th piece of identification information. Furthermore, the UE_A 10 may determine, based on the 15th piece of identification information, which type of congestion control corresponds to the back-off timer and/or the back-off timer value indicated by the 14th piece of identification information.

The 16th piece of identification information in the present embodiment is one or more pieces of Indication information indicating that the present procedure has been rejected. In other words, the Indication information may be information indicating the congestion control applied by the NW to the present procedure. The NW may indicate the congestion control applied by the NW based on the 16th piece of identification information.

For example, the Indication information may be information indicating which of two or more types of congestion control included in the first to fourth types of congestion control is restricted for the UE by the NW. Accordingly, the NW may transmit, as Indication information, a value associated with restrictive management applied to the UE. The UE may understand, in advance, the meaning of the values transmitted as Indication information, and in the 15th behavior, may identify, based at least on the 16th piece of identification information, which of the first to fourth types of congestion control is to be restricted. Here, the two or more types of congestion control included in the first to fourth types of congestion control are each congestion control that can be identified by using the Indication information, and the two or more types of congestion control to be identified may be all four types of congestion control, the first and second types of congestion control, the third and fourth types of congestion control, the second to fourth types of congestion control, or any other combination.

Note that the Indication information does not necessarily require the values corresponding to all the types of congestion control to be identified. For example, as long as values of the Indication information are assigned to and associated with the respective types of congestion control except for congestion control A, the value of the Indication information need not necessarily be configured for the congestion control A. In this case, the NW and the UE can identify the first type of congestion control based on the lack of transmission and/or reception of the Indication information. Note that the congestion control A may be any of the first to fourth types of congestion control.

In addition, in a case that the congestion control is notified to the UE based on transmission of the PDU session establishment reject message, the Identification may or may not be included depending on the types of the first to fourth types of congestion controls. In other words, depending on the type of congestion control, the NW may use the Identification information as information indicating the congestion control, and for a certain type of congestion control, instead of the Identification information, any other type of identification information may be as information indicating the congestion control.

Note that in the present embodiment, in a case that the third type of congestion control is not performed, the implications, corresponding to the third type of congestion control, of the Indication information in the 16th piece of identification information as described above are unnecessary, and the Indication information in the 16th piece of identification information may correspond to the above description from which the processing, description, and implications related to the third type of congestion control are omitted. Additionally, in the present embodiment, in a case that the fourth type of congestion control is not performed, the implications, corresponding to the fourth type of congestion control, of the Indication information in the 16th piece of identification information as described above are unnecessary, and the Indication information in the 16th piece of identification information may correspond to the above description from which the processing, description, and implications related to the fourth type of congestion control are omitted.

The 17th identification information in the present embodiment is one or more pieces of Value information indicating that the present procedure has been rejected. In other words, the Value Information may be information indicating the congestion control applied to the present procedure by the NW. Note that the 17th piece of identification information may be information including at least one of identification information for identifying one or multiple NW slices included in the 18th piece of identification information and/or the 12th piece of identification information.

The NW may indicate the congestion control applied by the NW based on the 17th piece of identification information. In other words, the NW may indicate which of the first to fourth types of congestion control has been applied, based on the 17th piece of identification information. Furthermore, based on the 17th piece of identification information, the NW may indicate the DNN and/or S-NSSAI to be subjected to the congestion control applied to the UE based on the transmission of the PDU session reject message. For example, in a case that the 17th piece of identification information is only DNN #1, the information may indicate that the first type of congestion control directed to DNN #1 is in effect. In a case that the 17th piece of identification information is only S-NSSAI #1, the information may indicate that the second type of congestion control directed to S-NSSAI #1 is in effect. In a case that the 17th piece of information includes DNN #1 and S-NSSAI #1, then the information may indicate that the third or fourth type of congestion control directed to at least one of DNN #1 and/or S-NSSAI #1 is in effect.

Note that the 17th piece of identification information need not necessarily be information allowing identification of which of the first to fourth types of congestion control has been applied and that the 17th piece of identification information may be information indicating the DNN and/or S-NSSAI to be subjected to the congestion control identified by any other means, for example, based on any other type of identification information.

The 18th piece of identification information in the present embodiment may be information indicating that a request for establishment of a PDU session belonging to the first NW slice has been rejected or information indicating that a request for establishment of the PDU session belonging to the first NW slice or for PDU session modification has not been granted. Here, the first NW slice may be a NW slice determined by the first piece of identification information or may be a different NW slice. Furthermore, the 18th piece of identification information may be information indicating that establishment of a PDU session belonging to the first NW slice in the DN identified by the 12th piece of identification information is not granted or information indicating that establishment of a PDU session belonging to the first NW slice in the PDU session identified by the 13th piece of identification information is not granted. Furthermore, the 11th piece of identification information may be information indicating non-granting of establishment of a PDU session belonging to the first slice in a registration area and/or a tracking area to which the UE_A 10 currently belongs or non-granting of establishment of a PDU session belonging to the first NW slice in the access network to which the UE_A 10 is connected. Furthermore, the 11th piece of identification information may be identification information for identifying one or multiple NW slices determining the NW slice to which the rejected PDU session request belongs. Furthermore, the 18th piece of identification information may be identification information indicating auxiliary information for the radio access system to select the appropriate MME in a case that the UE switches a connection destination to the EPS. Note that the auxiliary information may be information indicating the DCN ID. Furthermore, the 18th piece of identification information may be a network slice association rule that is a rule for associating multiple pieces of slice information.

The 21st piece of identification information in the present embodiment may be information used to stop one or multiple first timers activated by the UE, or may be information indicating the first timer that is included in the first timers activated by the UE and that is to be stopped. Specifically, the 21st piece of identification information may be information indicating the 13th piece of identification information stored in the UE in association with the first timers. Furthermore, the 21st piece of identification information may be information indicating at least one of the 12th to 18th pieces of identification information stored in the UE in association with the first timers.

Furthermore, the 21st piece of identification information may be information used to change the association between the first timer stored in the UE and information indicating at least one of the 13th to 17th pieces of identification information. For example, in a case that, while the first timer inhibiting a UE-initiated session management for a combination of DNN #A and S-NSSAI #A is active, the UE receives an NW-initiated session management request including the 21st piece of identification information granting connection to DNN #A, the UE may change the association target of the active timer to S-NSSAI #A only and recognize that the UE-initiated session management request to DNN #A has been granted. In other words, the 21st piece of identification information may be information indicating that the congestion control in effect at the time of reception of the 21st piece of identification information is changed to another type of congestion control included in the first to fourth types of congestion control.

Figure 9:
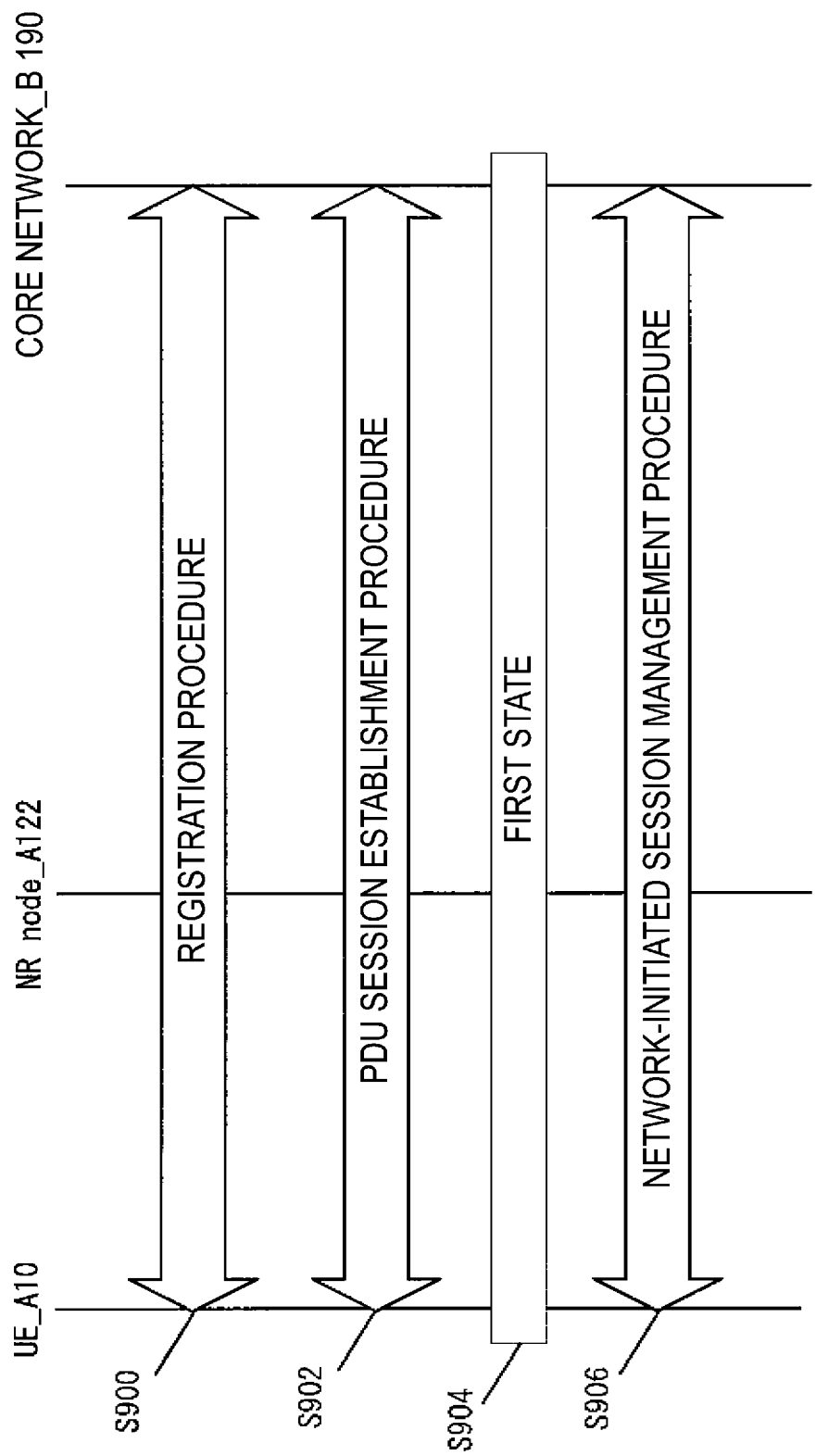
FIG. 9 is a diagram illustrating an initial procedure.

Now, an initial procedure according to the present embodiment will be described with reference to FIG. 9. Hereinafter, the initial procedure is also referred to as the present procedure, and the present procedure includes the Registration procedure, the PDU session establishment procedure, and the network-initiated session management procedure. Details of the registration procedure, the PDU session establishment procedure, the network-initiated session management procedure will be described below.

Specifically, with the apparatuses performing the registration procedure (S900), the UE_A 10 transitions to a state registered with the network (RM-REGISTERED state). Then, with the apparatuses performing the PDU session establishment procedure (S902), the UE_A 10 establishes, via the core network_B 190, a PDU session with the DN_A 5 providing a PDU connection service, and then the apparatuses transition to the first state (S904). Although the PDU session is assumed to be established via the access network and the UPF_A 235, no such limitation is intended. That is, a UPF (UPF_C 239) different from the UPF_A 235 may be present between the UPF_A 235 and the access network. At this time, the PDU session is established via the access network, the UPF_C 239, and the UPF_A 235. Then, the apparatuses in the first state may perform the network-initiated session management procedure at any time (S906).

Note that, in the registration procedure and/or the PDU session establishment procedure and/or the network-initiated session management procedure, the apparatuses may exchange various pieces of capability information and/or various pieces of request information of the respective apparatuses with one another. Additionally, in a case of performing exchange of various pieces of information and/or negotiation of various requests in the registration procedure, each of the apparatuses may or may not perform exchange of various pieces of information and/or negotiation of various requests in the PDU session establishment procedure and/or the network-initiated session management procedure. Additionally, in a case of not performing exchange of various pieces of information and/or negotiation of various requests in the registration procedure, each of the apparatuses may perform exchange of various pieces of information and/or negotiation of various requests in the PDU session establishment procedure and/or the network-initiated session management procedure. Additionally, even in a case of performing exchange of various pieces of information and/or negotiation of various requests in the registration procedure, each of the apparatuses may perform exchange of various pieces of information and/or negotiation of various requests in the PDU session establishment procedure and/or the network-initiated session management procedure.

In addition, each apparatus may perform the PDU session establishment procedure in the registration procedure or after the registration procedure is completed. Furthermore, in a case that the PDU session establishment procedure is performed in the registration procedure, the PDU session establishment request message included in the registration request message may be transmitted and/or received, and the PDU session establishment accept message included in the registration accept message may be transmitted and/or received, a PDU session establishment complete message included in a registration complete message may be transmitted and/or received, and a PDU session establishment reject message included in a registration reject message may be transmitted and/or received. In addition, in a case that the PDU session establishment procedure is performed during the registration procedure, based on the completion of the registration procedure, each apparatus may establish a PDU session or may transition to the state in which a PDU session is established between apparatuses.

Furthermore, each apparatus involved in the present procedure may transmit and/or receive each control message described in the present procedure to transmit and/or receive one or more pieces of identification information included in each control message and store each piece of identification information transmitted and/or received as a context.

1.3.1. Overview of Registration Procedure First, the following describes the overview of the registration procedure. The registration procedure is a procedure initiated by the UE_A 10 to register with a network (the access network and/or the core network_B 190 and/or the DN_A 5). In a state in which the UE_A 10 is not registered in the network, the UE_A 10 can perform the present procedure at any timing such as the timing of turning on power. In other words, the UE_A 10 may initiate the present procedure at any timing in a non-registered state (RM-DEREGISTERED state). In addition, each apparatus may transition to a registered state (RM-REGISTERED state), based on the completion of the registration procedure.

Furthermore, the present procedure may be a procedure for updating location registration information of the UE_A 10 in the network, for regularly notifying a state of the UE_A 10 from the UE_A 10 to the network, and/or for updating particular parameters related to the UE_A 10 in the network.

The UE_A 10 may initiate the present procedure in a case that the UE_A 10 applies mobility across TAs. In other words, the UE_A 10 may initiate the present procedure in a case that the UE_A 10 moves to a TA different from a TA indicated in a TA list that the UE_A 10 holds. Furthermore, the UE_A 10 may initiate the present procedure in a case that a running timer expires. Furthermore, the UE_A 10 may initiate the present procedure in a case that a context of each apparatus needs to be updated due to disconnection or disabling (also referred to as deactivation) of a PDU session. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, besides the above, the UE_A 10 can perform the present procedure at any timing as long as a PDU session is established.

1.3.1.1. Example of Registration Procedure

Figure 10:
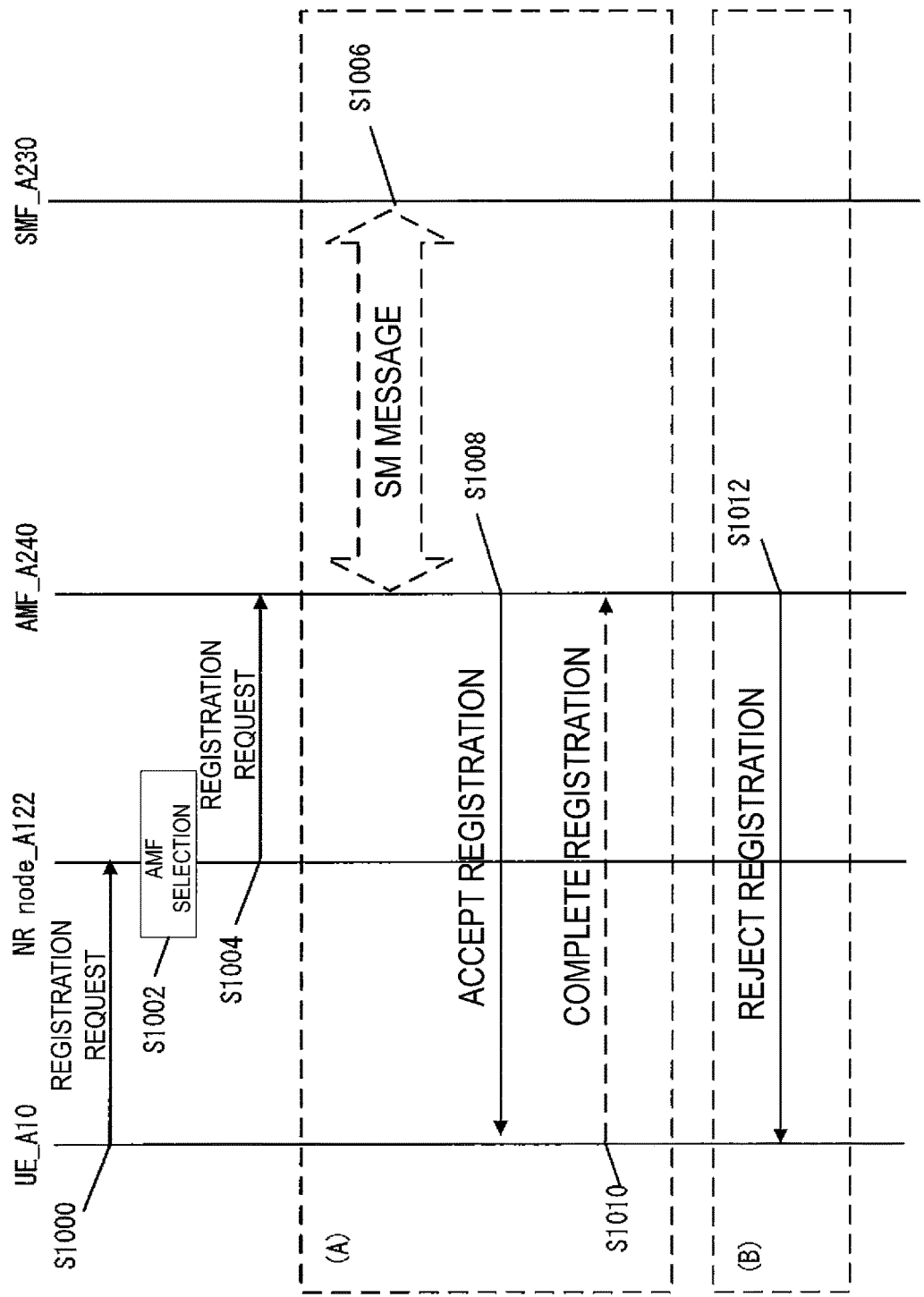
FIG. 10 is a diagram illustrating a registration procedure.

An example procedure of performing the registration procedure will be described with reference to FIG. 10. In the present section, the present procedure refers to the registration procedure. Each step of the present procedure will be described below.

First, the UE_A 10 transmits a Registration Request message to the AMF_A 240 via the NR node (also referred to as the gNB)_A 122 and/or the ng-eNB (S1000) (S1002) (S1004) to initiate the registration procedure. In addition, the UE_A 10 transmits a Session Management (SM) message (e.g., a PDU session establishment request message) included in the registration request message, or transmits the SM message (e.g., the PDU session establishment request message) along with the registration request message to initiate a procedure for a session management (SM), such as the PDU session establishment procedure, during the registration procedure.

Specifically, the UE_A 10 transmits, to the NR node_A 122 and/or the ng-eNB, a Radio Resource Control (RRC) message including the registration request message (S1000). In a case of receiving the RRC message including the registration request message, the NR node_A 122 and/or the ng-eN B retrieves the registration request message from the RRC message and selects the AMF_A 240 as a NF or a common CP function to which the registration request message is routed (S1002). Here, the NR node_A 122 and/or the ng-eNB may select the AMF_A 240 based on information included in the RRC message. The NR node_A 122 and/or the ng-eNB transmits or transfers the registration request message to the selected AMF_A 240 (S1004).

Note that the registration request message is a Non-Access-Stratum (NAS) message transmitted and/or received on the N1 interface. In addition, the RRC message is a control message transmitted and/or received between the UE_A 10 and the NR node_A 122 and/or the ng-eNB. Additionally, the NAS message is processed in a NAS layer, the RRC message is processed in a RRC layer, and the NAS layer is a layer higher than the RRC layer.

In addition, in a case that there are multiple NSIs requesting registration, the UE_A 10 may transmit a registration request message for each of the NSIs, or may transmit multiple registration request messages included in one or more RRC messages. Furthermore, the above-described multiple registration request messages included in one or more RRC messages may be transmitted as one registration request message.

In a case of receiving the registration request message and/or the control message different from the registration request message, the AMF_A 240 performs a first condition determination. The first condition determination is intended to determine whether or not the AMF_A 240 accepts a request of the UE_A 10. In the first condition determination, the AMF_A 240 determines whether the first condition determination is true or false. The AMF_A 240 initiates the procedure of (A) in the present procedure in a case that the first condition determination is true (in other words, the network accepts the request of the UE_A 10), and initiates a procedure of (B) in the present procedure in a case that the first condition determination is false (in other words, the network does not accept the request of the UE_A 10).

As follows, steps in a case that the first condition determination is true, in other words, each step of the procedure of (A) in the present procedure will be described. The AMF_A 240 performs a fourth condition determination, and initiates the procedure of (A) in the present procedure. The fourth condition determination is to determine whether the AMF_A 240 transmits and/or receives the SM message to/from the SMF_A 230. In other words, the fourth condition determination may be intended to determine whether or not the AMF_A 240 performs the PDU session establishment procedure during the present procedure. In a case that the fourth condition determination is true (in other words, an SM message is transmitted and received between the AMF_A 240 and the SMF_A 230), the AMF_A 240 selects the SMF_A 230 and transmits and/or receives the SM message to and/or from the selected SMF_A 230. In a case that the fourth condition determination is false (in other words, no SM message is transmitted or received between the AMF_A 240 and the SMF_A 230), the AMF_A 240 skips such processes (S1006). Note that in a case that the AMF_A 240 receives an SM message indicating rejection from the SMF_A 230, the AMF_A 240 may terminate the procedure of (A) in the present procedure, and may initiate the procedure of (B) in the present procedure.

Furthermore, the AMF_A 240 transmits the Registration Accept message to the UE_A 10 via the NR node_A 122 based on the reception of the registration request message from the UE_A 10 and/or the completion of the transmission and/or reception of the SM message to/from the SMF_A 230 (S1008). For example, in a case that the fourth condition determination is true, the AMF_A 240 may transmit the registration acceptance message based on the reception of the registration request message from the UE_A 10. In a case that the fourth condition determination is false, the AMF_A 240 may transmit the registration acceptance message based on the completion of the transmission and reception of the SM message to and from the SMF_A 230. Here, the registration accept message may be transmitted as a response message for the registration request message. The registration accept message is a NAS message transmitted and received on the N1 interface, for example, the AMF_A 240 may transmit the registration accept message to the NR node_A 122 as a control message for the N2 interface, and the NR node_A 122 may receive and include the message in the RRC message, which is then transmitted to the UE_A 10.

Furthermore, in a case that the fourth condition determination is true, the AMF_A 240 may include the SM message (e.g., a PDU session establishment accept message) in the registration accept message and transmit the registration accept message, or transmit the SM message (e.g., a PDU session establishment accept message) along with the registration accept message. This transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF_A 240 may indicate that the procedure for SM has been accepted by performing such a transmission method.

The UE_A 10 receives the registration accept message via the NR node_A 122 (S1008). The UE_A 10 receives the registration accept message and recognizes the contents of various types of identification information included in the registration accept message.

Then, the UE_A 10 transmits the Registration Complete message to the AMF_A 240 based on the registration accept message (S1010). Note that, in a case that the UE_A 10 has received an SM message such as a PDU session establishment accept message, the UE_A 10 may transmit the SM message such as the PDU session establishment complete message included in the registration complete message, or may include the SM message therein to indicate that the procedure for SM is completed. Here, the registration complete message may be transmitted as a response message for the registration accept message. The registration complete message is a NAS message transmitted and received on the N1 interface, for example, the UE_A 10 may include the message in the RRC message and transmit the RRC message to the NR node_A 122, and the NR node_A 122 may receive and transmit the message to the AMF_A 240 as an N2 interface control message.

The AMF_A 240 receives the registration complete message (S1010). In addition, each apparatus completes the procedure of (A) in the present procedure based on the transmission and/or reception of the registration accept message and/or the registration complete message.

Now, steps performed in a case that the first condition determination is false, in other words, each step of the procedure of (B) in the present procedure will be described. The AMF_A 240 transmits a Registration Reject message to the UE_A 10 via the NR node_A 122 (S1012) to initiate the procedure of (B) in the present procedure. Here, the registration reject message may be a response message for the registration request message. Additionally, the registration reject message is a NAS message transmitted and received on the N1 interface, for example, the AMF_A 240 may transmit the registration reject message to the NR node_A 122 as a control message for the N2 interface, and the NR node_A 122 may receive and include the message in the RRC message and transmit the RRC message to the UE_A 10. Further, the registration reject message transmitted by the AMF_A 240 is not limited thereto as long as it is a message for rejecting the request of the UE_A 10.

Note that the procedure of (B) in the present procedure may be initiated in a case that the procedure of (A) in the present procedure is canceled. Note that, in the procedure of (A), in a case that the fourth condition determination is true, the AMF_A 240 may include, in the registration reject message, the SM message, which indicates rejection, such as the PDU session establishment reject message and transmit the registration reject message, or include, in the registration reject message, the SM message indicating rejection to indicate that the procedure for SM has been rejected. In that case, the UE_A 10 may further receive the SM message, such as the PDU session establishment reject message, that indicates rejection, or may recognize that the procedure for SM has been rejected.

Furthermore, the UE_A 10 may recognize that a request of the UE_A 10 has been rejected by receiving the registration reject message or not receiving the registration accept message. Each apparatus completes the procedure of (B) in the present procedure based on the transmission and/or reception of the registration reject message.

Each apparatus completes the present procedure (registration procedure), based on the completion of the procedure of (A) or (B) in the present procedure. Note that each apparatus may transition to a state in which the UE_A 10 is registered with the network (RM_REGISTERED state) based on the completion of the procedure of (A) in the present procedure, or may maintain a state in which the UE_A 10 is not registered with the network (RM_DEREGISTERED state) based on the completion of the procedure of (B) in the present procedure. Transition to each state of each apparatus may be performed based on completion of the present procedure, or may be performed based on an establishment of a PDU session.

Furthermore, each apparatus may perform processing based on identification information transmitted and/or received in the present procedure, based on completion of the present procedure.

Furthermore, the first condition determination may be performed based on identification information, and/or subscriber information, and/or an operator policy included in the registration request message. For example, the first condition determination may be true in a case that the network allows a request of the UE_A 10. In addition, the first condition determination may be false in a case that the network does not allow a request of the UE_A 10. Furthermore, the first condition determination may be true in a case that the network of a destination of registration of the UE_A 10 and/or an apparatus in the network supports a function requested by the UE_A 10, and may be false in a case that the network and/or the apparatus does not support the function. Furthermore, the first condition determination may be true in a case that the network determines that the network is congested, and may be false in a case that the network determines that the network is not congested. Note that conditions for determining whether the first condition determination is true or false may not be limited to the above-described conditions.

The fourth condition determination may also be performed based on whether AMF_A 240 has received an SM and may be performed based on whether a SM message is included in the registration request message. For example, the fourth condition determination may be true in a case that the AMF_A 240 has received the SM and/or the SM message is included in the registration request message, and may be false in a case that the AMF_A 240 has not received the SM and/or the SM message is not included in the registration request message. Note that conditions for determining whether the fourth condition determination is true or false may not be limited to the above-described conditions.

1.3.2. Overview of PDU Session Establishment Procedure

Next, an overview of the PDU session establishment procedure performed to establish a PDU session with the DN_A 5 will be described. The PDU session establishment procedure is also referred to as a present procedure below. The present procedure is a procedure for each apparatus to establish the PDU session. Note that each apparatus may perform the present procedure in a state in which the registration procedure is completed or during the registration procedure. In addition, each apparatus may initiate the present procedure in a registered state, or may initiate the present procedure at any timing after the registration procedure. Each apparatus may establish the PDU session, based on completion of the PDU session establishment procedure. Furthermore, each apparatus may perform the present procedure multiple times to establish multiple PDU sessions.

1.3.2.1. Example of PDU Session Establishment Procedure

Figure 11:
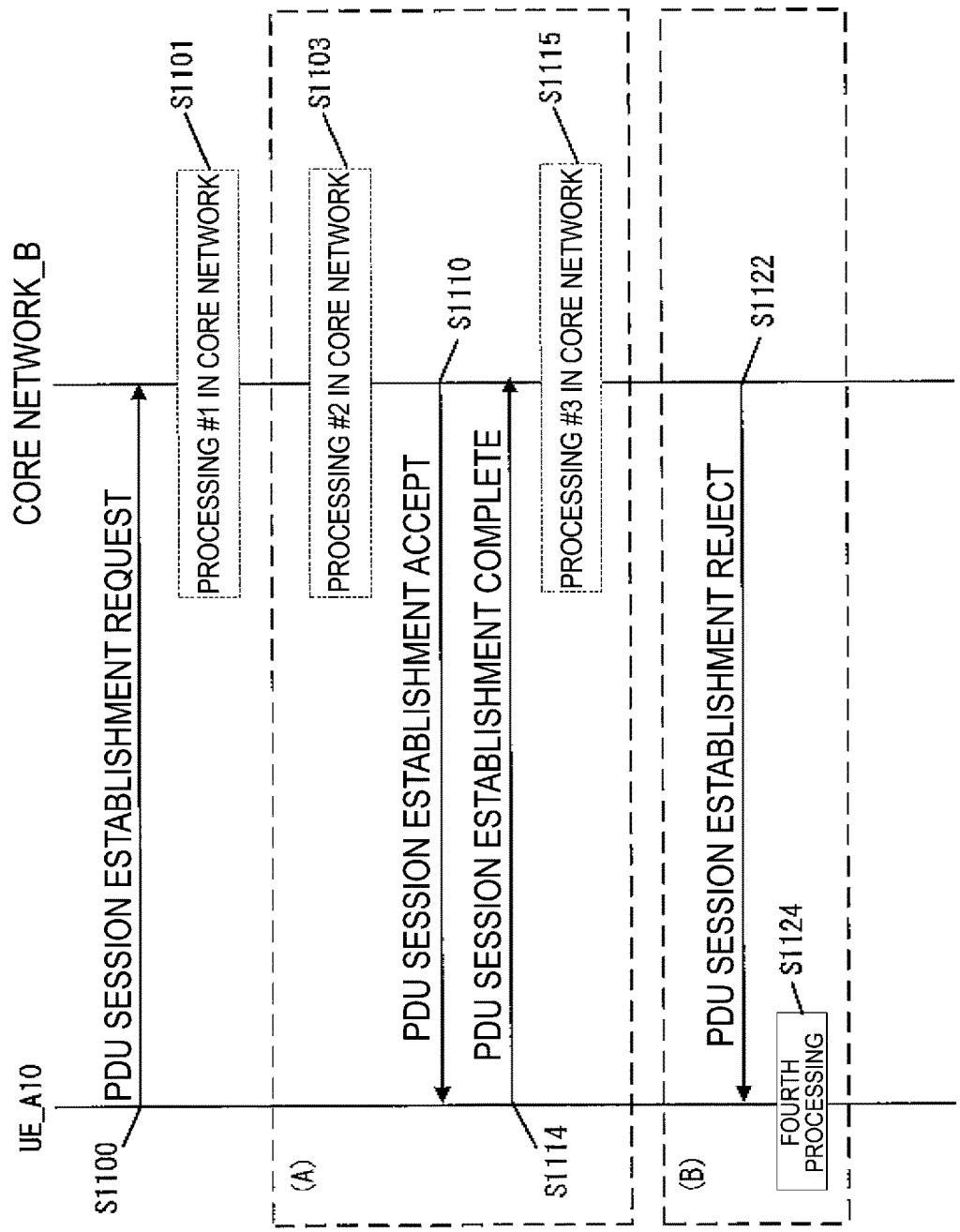
FIG. 11 is a diagram illustrating a PDU session establishment procedure.

With reference to FIG. 11, an example of a procedure for performing the PDU session establishment procedure will be described. Each step of the present procedure will be described below. First, the UE_A 10 transmits a PDU Session Establishment Request message to the core network_B via the access network_B (S1100), and initiates the PDU session establishment procedure.

Specifically, the UE_A 10 transmits the PDU session establishment request message to the AMF_A 240 in the core network_B 190 via the NR node_A 122 by using the N1 interface (S1100). The AMF_A receives the PDU session establishment request message, and performs a third condition determination. The third condition determination is intended to determine whether the AMF_A accepts the request of the UE_A 10. In the third condition determination, the AMF_A determines whether a fifth condition determination is true or false. In a case that the third condition determination is true, the core network_B initiates processing #1 in the core network (S1101), and in a case that the third condition determination is false, the core network_B initiates the procedure of (B) in the present procedure. Note that steps performed in a case that the third condition determination is false will be described below. Here, the processing #1 in the core network may be SMF selection performed by the AMF_A in the core network_B 190 and/or transmission and/or reception of the PDU session establishment request message between the AMF_A and the SMF_A.

The core network_B 190 initiates the processing #1 in the core network. In a case that, in the processing #1 in the core network, the AMF_A 240 may select the SMF_A 230 as an NF to which the PDU session establishment request message is routed, and may transmit or forward the PDU session establishment request message to the selected SMF_A 230 by using the N11 interface. Here, the AMF_A 240 may select the SMF_A 230 of the routing destination based on the information included in the PDU session establishment request message. More specifically, the AMF_A 240 may select the SMF_A 230 of the routing destination based on each piece of identification information acquired based on the reception of the PDU session establishment request message, and/or the subscriber information, and/or the capability information of the network, and/or the operator policy, and/or the state of the network, and/or the context already held by the AMF_A 240.

The PDU session establishment request message may be a NAS message. The PDU session establishment request message only needs to be a message requesting the PDU session establishment and not limited to this.

Here, the UE_A 10 may include one or more of the first to fourth pieces of identification information in the PDU session establishment request message, or may indicate the request of the UE_A 10 by inclusion of these pieces of identification information. Note that two or more of these pieces of identification information may be configured as one or more pieces of identification information.

Furthermore, by including the first piece of identification information and/or the second piece of identification information and/or the third piece of identification information and/or the fourth piece of identification information in the PDU session establishment request message for transmission, the UE_A 10 may request establishment of a PDU session belonging to the network slice, indicate the network slice to which the PDU session requested by the UE_A 10 belongs, or indicate the network slice to which the PDU session is to belong.

More particularly, by transmitting the first piece of identification information and the second piece of identification information in association with each other, the UE_A 10 may request establishment of a PDU session belonging to the network slice, the PDU session being established with the DN identified by the second piece of identification information, may indicate the network slice to which the PDU session requested by the UE_A 10 belongs, or may indicate the network slice to which the PDU session is to belong.

Furthermore, the UE_A 10 may combine and transmit two or more pieces of identification information from the first to fourth piece of identification information to make a request corresponding to a combination of the above-described matters. Note that the matters indicated by the UE_A 10 by transmitting the identification information need not be limited to the above-described matters.

Note that the UE_A 10 may determine which of the first to fourth pieces of identification information is to be included in the PDU session establishment request message, based on the capability information of the UE_A 10, and/or the policy such as the UE policy, and/or the preference of the UE_A 10, and/or the application (higher layer). Note that the determination performed by the UE_A 10 as to which piece of identification information is to be included in the PDU session establishment request message is not limited to the determination described above.

The SMF_A 230 in the core network_B 190 receives the PDU session establishment request message, and performs the third condition determination. The third condition determination is intended to determine whether the SMF_A 230 accepts the request of the UE_A 10. In the third condition determination, the SMF_A 230 determines whether the third condition determination is true or false. In a case that the third condition determination is true, the SMF_A 230 initiates the procedure of (A) in the present procedure, and in a case that the third condition determination is false, the SMF_A 230 initiates the procedure of (B) in the present procedure. Note that steps performed in a case that the third condition determination is false will be described below.

Steps performed in a case that the third condition determination is true, in other words, each step of the procedure of (A) in the present procedure will be described below. The SMF_A 230 selects the UPF_A 235, with which the PDU session is to be established, and performs an 11th condition determination.

Here, the 11th condition determination is intended to determine whether or not each apparatus performs processing #2 in the core network. Here, the processing #2 in the core network may include, for example, initiation and/or execution of the PDU session establishment authentication procedure by each apparatus, and/or transmission and/or reception of the Session Establishment request message between the SMF_A and UPF_A in the core network_B 190, and/or transmission and/or reception of the Session Establishment response message (S1103). In the 11th condition determination, the SMF_A 230 determines whether the 11th condition determination is true or false. The SMF_A 230 initiates a PDU session establishment authentication and/or authorization procedure in a case that the 11th condition determination is true, and omits the PDU session establishment authentication and/or authorization procedure in a case that the 11th condition determination is false. Note that the details of the PDU session establishment authentication and/or authorization procedure of the processing #2 in the core network will be described below.

Then, the SMF_A 230 transmits the session establishment request message to the selected UPF_A 235 based on the 11th condition determination and/or completion of the PDU session establishment authentication and/or authorization procedure, and initiates the procedure of (A) in the present procedure. Note that the SMF_A 230 may initiate the procedure of (B) in the present procedure without initiating the procedure of (A) in the present procedure, based on the completion of the PDU session establishment authentication and/or authorization procedure.

Here, the SMF_A 230 may select one or more UPFs_A 235 based on each piece of identification information acquired based on the reception of the PDU session establishment request message, and/or the capability information of the network, and/or the subscriber information, and/or the operator policy, and/or the state of the network, and/or the context already held by the SMF_A 230. Note that in a case that multiple UPFs_A 235 are selected, the SMF_A 230 may transmit the session establishment request message to each UPF_A 235.

The UPF_A 235 receives the session establishment request message and creates a context for the PDU session. Furthermore, the UPF_A 235 transmits the session establishment response message to the SMF_A 230 based on the reception of the session establishment request message and/or the creation of a context for the PDU session. Furthermore, the SMF_A 230 receives a session establishment response message. Note that the session establishment request message and the session establishment response message may be control messages transmitted and/or received on the N4 interface. Further, the session establishment response message may be a response message to the session establishment request message.

Further, the SMF_A 230 may assign an address to be assigned to the UE_A 10 based on the reception of the PDU session establishment request message and/or the selection of the UPF_A 235 and/or the reception of the session establishment response message. Note that the SMF_A 230 may assign the address to be assigned to the UE_A 10 during the PDU session establishment procedure, or may assign the address after the completion of the PDU session establishment procedure.

Specifically, in a case that the SMF_A 230 assigns the IPv4 address without using the DHCPv4, the SMF_A 230 may assign the address during the PDU session establishment procedure or may transmit the assigned address to the UE_A 10. In addition, in a case that the SMF_A 230 assigns the IPv4 address, and/or the IPv6 address, and/or the IPv6 prefix using the DHCPv4 or the DHCPv6 or Stateless Address Autoconfiguration (SLAAC), the SMF_A 230 may assign the address after the PDU session establishment procedure or may transmit the assigned address to the UE_A 10. Note that the address allocation performed by SMF_A 230 is not limited to these.

Furthermore, based on the completion of address assignment of an address to be assigned to the UE_A 10, the SMF_A 230 may include the assigned address in the PDU session establishment accept message and transmit the PDU session establishment accept message to the UE_A 10, or transmit the PDU session establishment accept message to the UE_A 10 after the completion of the PDU session establishment procedure.

The SMF_A 230 transmits the PDU session establishment accept message to the UE_A 10 via the AMF_A 240, based on the reception of the PDU session establishment request message, and/or the selection of the UPF_A 235, and/or the reception of the session establishment response message, and/or the completion of the address assignment of the address to be assigned to the UE_A 10 (S1110).

Specifically, the SMF_A 230 transmits the PDU session establishment accept message to the AMF_A 240 by using the N11 interface. The AMF_A 240 receives the PDU session establishment accept message and transmits the PDU session establishment accept message to the UE_A 10 by using the N1 interface.

Note that in a case that the PDU session is PDN connection, the PDU session establishment accept message may be a PDN connectivity accept message. Furthermore, the PDU session establishment accept message may be a NAS message transmitted and/or received on the N11 interface and the N1 interface. The PDU session establishment accept message is not limited to the PDU session establishment accept message described above, and only needs to be a message indicating the acceptance of the establishment of the PDU session.

The UE_A 10 receives the PDU session establishment accept message from the SMF_A 230. By receiving the PDU session establishment accept message, the UE_A 10 recognizes the contents of various types of identification information included in the PDU session establishment accept message.

Then, based on the completion of the reception of the PDU session establishment accept message, the UE_A 10 transmits the PDU session establishment complete message to the SMF_A 230 via the AMF_A 240 (S114). Furthermore, the SMF_A 230 receives the PDU session establishment complete message, and performs the second condition determination.

Specifically, the UE_A 10 transmits the PDU session establishment complete message to the AMF_A 240 by using the N interface. The AMF_A 240 receives the PDU session establishment complete message, and transmits the PDU session establishment complete message to the SMF_A 230 by using the N11 interface.

Note that in a case that the PDU session is PDN connection, the PDU session establishment complete message may be a PDN Connectivity complete message, or may be an Activate default EPS bearer context accept message. Furthermore, the PDU session establishment complete message may be a NAS message transmitted and/or received on the N1 interface and the N11 interface. The PDU session establishment complete message only needs to be a response message to the PDU session establishment accept message. However, the PDU session establishment complete message is not limited to this, and only needs to be a message indicating that the PDU session establishment procedure is completed.

The second condition determination is intended to determine, by the SMF_A 230, the type of the message on the N4 interface that is transmitted and/or received. In a case that the second condition determination is true, then processing #3 in the core network may be initiated (S1115). Here, the processing #3 in the core network may include transmission and/or reception of the Session Modification request message and/or transmission and/or reception of the Session Modification response message. The SMF_A 230 transmits the session modification request message to the UPF_A 235, and further receives the session modification accept message transmitted from the UPF_A 235, having received the session establishment request message. Additionally, in a case that the second condition determination is false, the SMF_A 230 performs the processing #2 in the core network. In other words, the SMF_A transmits the session establishment request message to the UPF_A 235, and further receives the session modification accept message transmitted from the UPF_A 235, having received the session establishment request message.

Each apparatus completes the procedure of (A) in the present procedure, based on the transmission and/or reception of the PDU session establishment complete message, and/or the transmission and/or reception of the session modification response message, and/or the transmission and/or reception of the session establishment response message, and/or the transmission and/or reception of Router Advertisement (RA).

Now, steps performed in a case that the third condition determination is false, in other words, each step of the procedure of (B) in the present procedure will be described. The SMF_A 230 transmits the PDU session establishment reject message to the UE_A 10 via the AMF_A 240 (S1122), and initiates the procedure of (B) in the present procedure.

Specifically, the SMF_A 230 transmits the PDU session establishment reject message to the AMF_A 240 by using the N11 interface, and the AMF_A 240 receives the PDU session establishment request message and transmits the PDU session establishment reject message to the UE_A 10 by using the N1 interface.

Note that in a case that the PDU session is PDN connection, the PDU session establishment reject message may be a PDN Connectivity reject message. Furthermore, the PDU session establishment reject message may be a NAS message transmitted and/or received on the N11 interface and the N1 interface. The PDU session establishment reject message is not limited to the PDU session establishment reject message described above, and only needs to be a message indicating that the PDU session establishment has been rejected.

Here, the SMF_A 230 may include, in the PDU session establishment reject message, one or more pieces of identification information from the 11th to 18th pieces of identification information, or may indicate that the request of the UE_A 10 has been rejected by including these pieces of identification information. Note that two or more of these pieces of identification information may be configured as one or more pieces of identification information.

Furthermore, the SMF_A 230 may transmit the 11th piece of identification information and/or the 12th piece of identification information and/or the 13th piece of identification information and/or the 14th piece of identification information and/or the 15th piece of identification information and/or the 16th piece of identification information and/or the 17th piece of identification information; and/or the 18th piece of identification information included in the PDU session establishment reject message to indicate that the request to establish a PDU session belonging to the network slice has been rejected, or may indicate network slices to which the PDU session is not allowed to belong.

More particularly, the SMF_A 230 may transmit the 18th piece of identification information and the 12th piece of identification information in association with each other to indicate, in a PDU session established for the DN identified by the 12th piece of identification information, that the request to establish a PDU session belonging to the network slice has been rejected, or indicate the network slices to which the PDU session is not allowed to belong.

Furthermore, the SMF_A 230 may transmit the 18th piece of identification information included in the PDU session establishment reject message to indicate that the request to establish a PDU session belonging to the network slice has been rejected in the registration area and/or tracking area to which the UE_A 10 currently belongs or to indicate the network slices not allowed to belong to the PDU session.

Furthermore, the SMF_A 230 may transmit the 18th piece of identification information included in the PDU session establishment reject message to indicate that the request to establish a PDU session belonging to the network slice has been rejected in the access network to which the UE_A 10 is currently connected or to indicate the network slices to which the PDU session is not allowed to belong.

Furthermore, the SMF_A 230 may indicate the value of the first timer by transmitting the 11th piece of identification information and/or the 14th piece of identification information included in the PDU session establishment reject message, and may indicate whether the same procedure as the present procedure is to be performed again after the completion of the present procedure.

Furthermore, the SMF_A 230 may transmit two or more pieces of identification information from the 11th to 18th pieces of identification information in combination to make a request for a combination of the above-described matters. Note that the matters indicated by the SMF_A 230 transmitting the identification information may not be limited thereto.

Note that the SMF_A 230 may determine which piece of identification information from the 11th to 18th pieces of identification information is to be included in the PDU session establishment reject message, based on the received identification information, and/or the capability information of the network, and/or the policy such as the operator policy, and/or the state of the network.

Furthermore, the 12th piece of identification information may be information indicating the same DNN as the DNN indicated by the second piece of identification information. Furthermore, the 13th piece of identification information may be information indicating the same PDU session ID as the PDU session ID indicated by the third piece of identification information. Furthermore, the 18th piece of identification information may be information transmitted in a case that the first piece of identification information is received and/or in a case that the network slice indicated by the first piece of identification information is not granted by the network. Note that determination performed by the SMF_A 230 as to which piece of identification information is to be included in the PDU session establishment reject message is not limited to the determination described above.

As described above, the core network_B 190 transmits the PDU session reject message to notify the UE_A 10 of congestion control to be applied to the UE_A 10. Note that the core network_B 190 may notify the UE_A 10 that the congestion control is applied to the UE_A 10 and/or that the congestion control is indicated to be performed on the UE_A 10, and/or information for identifying the type of the congestion control to apply, and/or information for identifying the target of the congestion control, such as the DNN and/or S-NSSAI corresponding to the congestion control to apply, and/or the value of the timer associated with the congestion control to apply.

Here, each of the above-described pieces of information may be information identified by one or more piece of identification information from the 11th to 18th pieces of identification information.

The PDU session establishment reject message received by the UE_A 10 from the SMF_A 230 may include one or more pieces of identification information from the 11th to 18th pieces of identification information.

Then, the UE_A 10 performs the fourth step of processing based on the reception of the PDU session establishment reject message (S1124). Alternatively, the UE_A 10 may perform the fourth step of processing based on the completion of the present procedure.

A first example of the fourth step of processing will be described below.

Here, the fourth step of processing may be processing in which the UE_A 10 recognizes the matter indicated by the SMF_A 230. Furthermore, the fourth step of processing may be processing in which the UE_A 10 stores the received identification information as a context, or processing in which the received identification information is transferred to a higher layer and/or a lower layer. Furthermore, the fourth step of processing may be processing in which the UE_A 10 recognizes that the request for the present procedure has been rejected.

Furthermore, in a case that the UE_A 10 receives the 14th piece of identification information and the 11th piece of identification information, the fourth step of processing may be processing in which the UE_A 10 configures a first timer value by using the value indicated by the 14th piece of identification information, or processing for initiating the first timer with the timer value configured. Furthermore, in a case that the UE_A 10 receives the 11th piece of identification information, the fourth step of processing may be processing for performing one or more behaviors from the first to 11th behaviors.

Furthermore, in a case that the UE_A 10 receives the 18th piece of identification information and the 11th piece of identification information, the fourth step of processing may be processing in which the UE_A 10 performs 12th behavior based on information for identifying the NW slice included in the 18th piece of identification information, the network slice association rule included in the 18th piece of identification information, or the network slice association rule initially held and configured by the UE_A 10.

Furthermore, in a case that the UE_A 10 receives the multiple 14th pieces of identification information and the 11th piece of identification information, the fourth step of processing may be processing in which the UE_A 10 performs 13th behavior based on the multiple first timers included in the 14th pieces of identification information and the priority management rule for the back-off timer held by the UE_A 10.

Furthermore, in a case that the UE_A 10 receives the multiple 14th piece of identification information and the 11th piece of identification information, the fourth step of processing may be processing in which the UE_A 10 performs 14th behavior based on the multiple first timers included in the 14th pieces of identification information.

Here, the 12th to 15th behaviors may be congestion control initiated and performed by the UE_A 10 based on rules and/or policies inside the UE_A 10. Specifically, for example, the UE_A 10 may include, in a storage unit and/or a controller inside the UE_A 10, a policy (UE policy) and/or a rule, a management function for the policy and/or rule, a policy enforcer operating the UE_A 10 based on the policy and/or rule, one or more applications, and a session management instance (session manager) for managing one or more PDU sessions that the UE_A 10 establishes or attempts to establish based on a request from each application. By performing any of the 12th to 15th behaviors as the fourth step of processing based on the above, the congestion control initiated by the UE_A 10 may be implemented. Here, the policy and/or rule may include one or more of the network slice association rule and/or the priority management rule for the back-off timer, and/or a Network Slice Selection Policy (NSSP), which may be initially configured in the UE_A 10 or received from the network. Here, the policy enforcer may be an NSSP enforcer. Additionally, here, the application may be a protocol in the application layer, and an PDU session may be established or an attempt may be made to establish a PDU session, based on a request from the protocol in the application layer. Additionally, here, the session management instance may be a software element dynamically generated in units of PDU sessions. Additionally, here, as internal processing by the UE_A 10, S-NSSAI may be grouped or processing based on the grouping of the S-NSSAI may be performed. Note that the present invention is not limited to the internal configuration and processing of the UE_A 10 described above, and each element may be implemented in software or may be performed as software processing within the UE_A 10.

Furthermore, the UE_A 10 may switch to the EPS, in the fourth step of processing or based on the completion of the fourth step of processing, and may initiate position registration in the EPS based on the DCN ID included in the 18th piece of identification information. Note that switching to the EPS by the UE_A 10 may be based on a handover procedure, or may be RAT switching initiated by the UE_A 10. Additionally, in a case that the UE_A 10 receives the 18th piece of identification information including the DCN ID, the UE_A 10 may perform switching to EPS during the fourth step of processing or after the completion of the fourth step of processing.

Furthermore, the fourth step of processing may be processing in which the UE_A 10 initiates the present procedure again after a certain period of time, or processing in which the UE_A 10 request transitions to a limited or restricted state.

Note that, in response to the completion of the fourth step of processing, the UE_A 10 may transition to the first state.

Now, a second example of the fourth step of processing will be described.

Here, the fourth step of processing may be processing in which the UE_A 10 recognizes the matter indicated by the SMF_A 230. Furthermore, the fourth step of processing may be processing in which the UE_A 10 stores the received identification information as a context, or processing in which the received identification information is transferred to a higher layer and/or a lower layer.

Furthermore, in the fourth step of processing, processing for identifying application of the congestion control may be performed based on one or more piece of identification information from the 11th to 18th pieces of identification information.

Furthermore, in the fourth step of processing, the following may be performed: processing for identifying which of the first to fourth types of congestion control is to be applied based on one or more pieces of identification information from the 11th to 18th pieces of identification information, and processing for identifying the DNN and/or S-NSSAI associated with the congestion control to apply. More specifically, the present processing may be processing described in 15th behavior.

Furthermore, in the fourth step of processing, the value configured for the first timer indicated by the 14th piece of identification information associated with the congestion control to apply may be identified and configured based on one or more pieces of identification information from the 11th to 18th pieces of identification information, and counting of the first timer may be initiated. More specifically, the present processing may be the processing described in eighth behavior.

Furthermore, in the fourth step of processing, one or more of the first to seventh behaviors may be performed in response to the initiation or completion of any of the steps of processing described above.

Furthermore, in the fourth step of processing, one or more of ninth to 15th behaviors may be performed in response to the initiation or completion of any of the steps of processing described above.

Note that, in response to the completion of the fourth step of processing, the UE_A 10 may transition to the first state.

While processing contents have been described with respect to the fourth step of processing using the first example and the second example, the present embodiment need not be limited to these steps of processing of the fourth step of processing. For example, the fourth step of processing may be a combination of some of the multiple steps of detailed processing described in the first example and some of the multiple steps of detailed processing described in the second example.

Furthermore, the UE_A 10 may recognize that the request of the UE_A 10 has been rejected by receiving the PDU session establishment reject message or not receiving the PDU session establishment accept message. Each apparatus completes the procedure of (B) in the present procedure, based on transmission and/or reception of the PDU session establishment reject message.

Each apparatus completes the present procedure, based on completion of the procedure of (A) or (B) in the present procedure. Note that each apparatus may transition, based on the completion of the procedure of (A) in the present procedure, to a state in which the PDU session is established, may recognize, based on the completion of the procedure of (B) in the present procedure, that the present procedure has been rejected, or may transition to a state in which the PDU session is not established or to the first state.

Furthermore, each apparatus may perform processing based on identification information transmitted and/or received in the present procedure, based on completion of the present procedure. In other words, the UE_A 10 may perform the fourth step of processing based on the completion of the present procedure, or may transition to the first state after completion of the fourth step of processing.

Additionally, the third condition determination may be performed based on the identification information included in the PDU session establishment request message, and/or the subscriber information, and/or the operator policy. For example, the third condition determination may be true in a case that the network grants the request of the UE_A 10. In addition, the third condition determination may be false in a case that the network does not grant the request of the UE_A 10. Furthermore, in a case that the network corresponding to the connection destination of the UE_A 10 and/or the apparatus in the network supports the function requested by the UE_A 10, the third condition determination may be true, and in a case that the function is not supported, the third condition determination may be false. Furthermore, the third condition determination may be true in a case that the network is determined to be congested, and may be false in a case that the network is determined not to be congested. Note that conditions for determining whether the third condition determination is true or false need not be limited to the above-described conditions.

The second condition determination may be performed based on whether the session on the N4 interface for the PDU session has been established. For example, in a case that the session on the N4 interface for the PDU session has been established, the second condition determination may be true, and in a case that the session on the N4 interface for the PDU session is not established, the second condition determination may be false. Conditions for determining true or false of the second condition determination need not be limited to the above-described conditions.

The 11th condition determination may be performed based on the identification information included in the PDU session establishment request message, and/or the subscriber information, and/or the operator policy. For example, the 11th condition determination may be true in a case that the network allows authentication and/or authorization by the DN_A 5 to be performed during the present procedure. Additionally, the 11 condition determination may be false in a case that the network does not allow authentication and/or authorization by the DN_A 5 to be performed during the present procedure. Furthermore, in a case that the network corresponding to the connection destination of the UE_A 10 and/or the apparatus in the network supports the performance of the authentication and/or authorization by the DN_A 5 during the present procedure, the 11th condition determination may be true, and in a case that the performance during the present procedure is not supported, the 11th condition determination may be false. Furthermore, the 11th condition determination may be true in a case that 61st piece of identification information is received, and may be false in a case that the 61st piece of identification information is not received. In other words, the 11th condition determination may be true in a case that information such as an SM PDU DN Request Container and/or a container including multiple pieces of information is received, and the 11th condition information may be false in a case that such information is not received. Note that conditions for determining whether the 1th condition determination is true or false may not be limited to the above-described conditions.

The transmission and reception of the PDU session reject message in the above-described procedure allow the core network_B 190 to notify the UE_A 10 of the congestion control to apply, and allow the UE_A 10 to apply the congestion control indicated by the core network_B 190. Note that the core network_B 190 and the UE_A 10 may apply multiple types of congestion control by performing the procedures and processes described in the present procedure multiple times. Note that the congestion control to apply may vary in terms of different types of congestion control, and/or correspondence to different DNNs, and/or correspondence to different pieces of S-NNSAI, and/or correspondence to different combinations of the DNN and S-NSSAI.

1.3.3. Overview of Network Initiated Session Management Procedure

Now, an overview of the network-initiated session management procedure will be provided. Hereinafter, the network-initiated session management procedure is also referred to as the present procedure. The present procedure is a procedure for session management initiated and performed on an established PDU session by the network. Note that the present procedure may be performed at any timing after the registration procedure and/or the PDU session establishment procedure described above is completed to cause each apparatus to transition to the first state. Additionally, each apparatus may transmit and/or receive a message including identification information for stopping or changing the congestion control during the present procedure, or may initiate the behavior based on new congestion control indicated by the network based on the completion of the present procedure.

Alternatively, the UE_A 10 may stop the application of the congestion control identified based on control information transmitted and/or received in accordance with the present procedure. In other words, by initiating the present procedure and further transmitting the control message and control information of the present procedure to the UE_A 10, the core network_B 190 can notify the UE_A 10 to stop the application of the congestion control that can be identified by using the control information.

Note that the present procedure may be a network-initiated PDU session modification procedure, and/or a network-initiated PDU session release procedure, or the like, or a network-initiated session management procedure not limited to the above-described procedures may be performed. Each apparatus may transmit and/or receive the PDU session modification message in the network-initiated PDU session modification procedure, or may transmit and/or receive the PDU session release message in the network-initiated PDU session release procedure.

1.3.3.1 Example of First Network-Initiated Session Management Procedure

Figure 12:
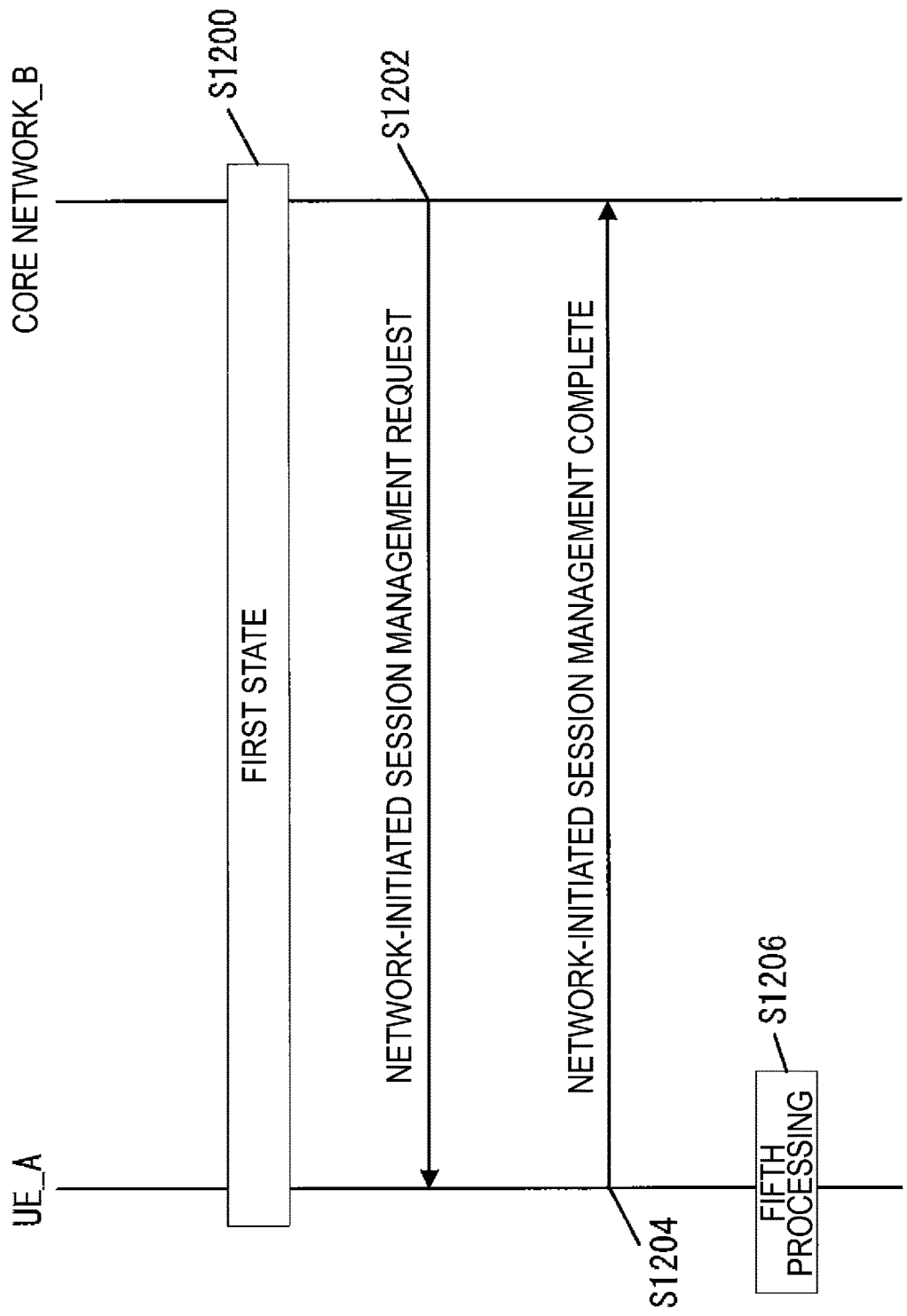
FIG. 12 is a diagram illustrating a network-initiated session management procedure.

An example of a network-initiated session management procedure will be described by using FIG. 12. In the present section, the present procedure refers to a network-initiated session management procedure. Each step of the present procedure will be described below.

As described above, based on the completion of the registration procedure and/or the PDU session establishment procedure (S1200), the UE_A 10 and each apparatus in the core network_B 190 transition to the first state and initiate the network-initiated session management procedure at any timing. Here, the apparatus in the core network_B 190 that initiates the present procedure may be the SMF_A and/or the AMF_A, and the UE_A may transmit and/or receive the message in the present procedure via the AMF_A and/or the access network_B.

Specifically, the apparatus in the core network_B 190 transmits the network-initiated session management request message to the UE_A (S1202). Here, the apparatus in the core network_B 190 may include 21st piece of identification information in the network-initiated session management request message, or may indicate the request of the core network_B 190 by including the identification information.

Then, the UE_A receives the network-initiated session management request message and transmits a network-initiated session management complete message (S1204). Furthermore, based on the 21st piece of identification information received from the core network_B 190, the UE_A may perform the fifth processing (S1206) to complete the present procedure. The UE_A 10 may perform the fifth processing based on the completion of the present procedure.

An example of the fifth processing will be described below.

Here, the fifth processing may be processing in which the UE_A 10 recognizes the matter indicated by the core network_B 190, or recognizes the request of the core network_B 190. Furthermore, the fifth processing may be processing in which the UE_A 10 stores the received identification information as a context, or processing in which the received identification information is transferred to a higher layer and/or a lower layer.

The message transmitted and/or received in the network-initiated session management request may be, although not limited to, a PDU session modification command (PDU SESSION MODIFICATION COMMAND) or a PDU session release command (PDU SESSION RELEASE COMMAND).

Note that the UE_A 10 may perform congestion control identification processing applied by the UE_A 10 based on the received 21st piece of identification information in the fifth processing. Here, the congestion control identification processing may be the 17th behavior.

Furthermore, in a case that the UE_A 10 receives the 21st identification information, the fifth processing may be the 16th behavior. Specifically, the processing may be, for example, processing involving stopping one or multiple timers run based on the above-described fourth step of processing.

In other words, the UE_A 10 receives the 21st identification information, then performs the 17th behavior to identify the congestion control to be stopped or changed in accordance with an indication from the network, and subsequently performs the 16th behavior to stop or change the identified congestion control.

Furthermore, each apparatus may perform processing based on identification information transmitted and/or received in the present procedure, based on completion of the present procedure. In other words, the UE_A 10 may perform the fifth processing based on the completion of the present procedure, or may complete the present procedure after the completion of the fifth processing.

In the above-described procedure, the network-initiated session management request message is transmitted and/or received to allow the core network_B 190 to indicate to the UE_A 10 to stop or change the congestion control already applied to the UE_A 10. Furthermore, the UE_A 10 may stop or change the congestion control applied by the UE_A 10, based on the network-initiated session management request message. Here, in a case that the UE_A 10 has one or more congestion control in effect, the UE_A 10 may identify the congestion control to be stopped or changed based on the reception of the identification information included in the network-initiated session management request message from the core network_B 190. Note that the congestion control to apply may vary in terms of different types of congestion control, and/or correspondence to different DNNs, and/or correspondence to different pieces of S-NNSAI, and/or correspondence to different combinations of the DNN and S-NSSAI.

1.3.3.2 Example of Second Network-Initiated Session Management Procedure

In the example of the first network-initiated session management procedure described in section 1.3.3.1, an example in which the congestion control is stopped during the procedure regardless of whichever congestion control of the first to fourth types of congestion control is applied to the UE_A 10 is described.

The present invention is not limited to the example, and the procedure described in the example of the first network-initiated session management procedure described in section 1.3.3.1 may be a procedure performed in accordance with the congestion control. For example, of one or multiple types of congestion control applied by the UE_A 10, the procedure may be performed on the congestion control classified into the first, third, or fourth type of congestion control.

In other words, the UE_A 10 may perform the fifth processing to stop the congestion control corresponding to the first, third, and fourth types of congestion control.

In a case of receiving the network-initiated session management request message for the second type of congestion control while performing counting of the back-off timer associated with the second type of congestion control, the UE_A 10 may respond to the core network_B 190 without stopping the back-off timer associated with the second type of congestion control.

In other words, in a case of receiving the network-initiated session management request message for S-NSSAI #A, which is congested, and any DNN while performing the counting of the back-off timer associated with the S-NSSAI #A, the UE_A 10 may respond to the core network_B 190 without stopping the back-off timer associated with the S-NSSAI #A.

Thus, for the second type of congestion control, in receiving the network-initiated session management request message, the UE_A 10 may transmit, to the core network_B 190, the response message for the network-initiated session management request message, but may continue the congestion control. Accordingly, the transmission of the UE-initiated session management request message, restricted by the second type of congestion control, may continue to be inhibited.

Here, as described above, the network-initiated session management request message in the present embodiment may be the PDU session modification command (PDU SESSION MODIFICATION COMMAND) message in the network-initiated PDU session modification procedure or the PDU session release command (PDU SESSION RELEASE COMMAND) message in the network-initiated PDU session release procedure.

Moreover, as described above, the network-initiated session management complete message responsive to the PDU session modification command message in the present embodiment may be a PDU session modification complete message (PDU SESSION MODIFICATION COMPLETE), and the network-initiated session management complete message responsive to the PDU session release command message in the present embodiment may be a PDU session release complete message (PDU SESSION RELEASE COMPLETE). Additionally, in a case that the network-initiated session management request message is the PDU session modification command and/or the PDU session release message, the UE_A 10 and the core network_B 190 may be configured to perform, in addition to the above-described processing, further detailed processing described below.

For example, in a case that the core network_B 190 transmits the network-initiated session management request message including information indicating a Reactivation Required, the core network_B 190 may perform processing as follows. Note that the information indicating the Reactivation Required is information indicating that activation is requested, and particular examples may be a 5G session management cause value #39 (5G SM Cause #39).

Hereinafter, an example of the first step of processing and procedure performed in a case that information indicating the reactivation required is received will be described.

In a case that the UE_A 10 receives a network-initiated session management request message including information indicating the Reactivation Required, then instead of initiating the UE-initiated PDU session establishment procedure immediately after completion of the network-initiated session management procedure, the UE_A 10 initiates the UE-initiated PDU session establishment procedure again after the congestion control is released. Here, the UE-initiated PDU session establishment procedure may be a UE-initiated PDU session establishment procedure for the PDU session type, the SSC mode, and the DNN and S-NSSAI provided in the UE-initiated PDU establishment procedure in a case that a PDU session to be modified or released is established.

Note that the initiation after the release of the congestion control may mean execution after the timer associated with the second type of congestion control Expires. In other words, the initiation after the release of the congestion control may mean execution after completion of the counting of the timer associated with the second type of congestion control and/or after the timer value associated with the second type of congestion control becomes zero.

Furthermore, the UE_A 10 may include the following supplemental information in the network-initiated session management complete message.

The supplemental information may be information indicating execution after expiry of the timer and/or information indicating the remaining timer value. Here, the timer may be a timer associated with the second type of congestion control. The execution after expiry of the timer may mean that the procedure is performed after the timer Expires. In other words, the execution after expiry of the timer may mean execution after completion of the counting of the timer associated with the second type of congestion control and/or after the timer value associated with the second type of congestion control becomes zero.

Note that the core network_B 190 may receive the network-initiated session management complete message including the supplemental information and recognize the remaining timer value. Furthermore, the core network_B 190 may recognize that the UE-initiated PDU session establishment procedure is initiated after the time corresponding to the value indicated by the remaining timer elapses.

Here, the remaining timer recognized by the core network_B 190 may correspond to a value indicated by the received supplemental information, or a value obtained by considering the offset between the time of the transmission, by the UE_A 10, of the network-initiated session management complete message and the time of the reception, by the core network_B 190, of the network-initiated session management complete message, with respect to the value indicated by the received supplemental information.

In addition, the present invention is not limited to the example of the first step of processing and procedure for a case of reception of the information indicating the reactivation required, but an example of the second step of processing and procedure for a case of reception of the information indicating the reactivation required may be performed as described below.

As described above, for the second type of congestion control, in receiving the network-initiated session management request message, the UE_A 10 may transmit, to the core network_B 190, a response message for the network-initiated session management request message, but may continue the congestion control. Thus, the configuration may be such that, while the transmission of the UE-initiated session management request message, restricted by the second type of congestion control, continues to be inhibited, the UE_A 10 and/or the core network_B 190 is only allowed to initiate the UE-initiated PDU session establishment procedure again.

In other words, in a case of receiving the network-initiated session management request message including information indicating the Reactivation Required, then the UE_A 10 completes the network-initiated network-initiated session management procedure and then initiates the UE-initiated PDU session establishment procedure again. Here, the UE-initiated PDU session establishment procedure may be a UE-initiated PDU session establishment procedure for the PDU session type, the SSC mode, and the DNN and S-NSSAI provided in the UE-initiated PDU establishment procedure in a case that a PDU session to be modified or released is established.

Note that, while the congestion control remains in effect, the UE_A 10 and the core network B 190 may perform and complete the procedure accepted as an exception but that the UE_A 10 may be inhibited from initiating other UE-initiated session management procedures inhibited by the second type of congestion control.

In addition, the present invention is not limited to the examples of the first and second steps of processing and procedures for a case of reception of the information indicating the reactivation required, but an example of the third step of processing and procedure for a case of reception of the information indicating the reactivation required may be performed as described below.

As described above, for the second type of congestion control, in receiving the network-initiated session management request message, the UE_A 10 transmits, to the core network_B 190, a response message for the network-initiated session management request message. Furthermore, in a case that the UE_A 10 receives the network-initiated session management request message including information indicating the Reactivation Required, the UE_A 10 may stop the application of the second type of congestion control.

In other words, the UE_A 10 may continue the congestion control in a case that the network-initiated session management request message does not include information indicating a Reactivation Required. In this case, the transmission of the UE-initiated session management request message, restricted by the second type of congestion control, may continue to be inhibited.

Accordingly, in a case of receiving the network-initiated session management request message including information indicating the Reactivation Required, then the UE_A 10 completes the network-initiated network-initiated session management procedure and then initiates the UE-initiated PDU session establishment procedure again. Here, the UE-initiated PDU session establishment procedure may be a UE-initiated PDU session establishment procedure for the PDU session type, the SSC mode, and the DNN and S-NSSAI provided in the UE-initiated PDU establishment procedure in a case that a PDU session to be modified or released is established.

In addition, the present invention is not limited to the examples of the first, second, and third steps of processing and procedures for a case of reception of the information indicating the reactivation required, but the information indicating the reactivation required may be prevented from being transmitted by the core network_B 190 as described below.

More specifically, the core network_B 190 may be configured to, in a case of transmitting the network-initiated session management request message to the UE_A 10 with the congestion control in effect, to inhibit information indicating the Reactivation Required from being included in the network-initiated session management request message.

Alternatively, the core network_B 190 may be configured to, in a case of transmitting the network-initiated session management request message to the UE_A 10 with the second type of congestion control in effect, to inhibit information indicating the Reactivation Required from being included in the network-initiated session management request message.

Although the processing and procedure performed by the UE_A 10 and the core network B 190 have been described above, the processing by the core network_B 190 described in the present section may be processing performed by a control apparatus such as the SMF_A 230 and/or the AMF_A 240, which are apparatuses within the core network_B 190. Thus, the core network B 190 transmitting and/or receiving control messages may correspond to a control apparatus such as the SMF_A 230 and/or AMF_A 240, which is an apparatus in the core network_B 190, transmitting and/or receiving the control messages.

Furthermore, although not limited to this section, in expressions used in the description of the present embodiment, releasing the application of congestion control or stopping congestion control may include processing for stopping the back-off timer associated with congestion control, and continuing the application of congestion control or continuing congestion control may include continuing to count the back-off timer associated with congestion control.

Additionally, in the description of the examples of the first, second, and third steps of processing and procedures for a case that receiving the information indicating the reactivation required described in the present section, in the network-initiated session management request message and/or the network-initiated session management procedure, the UE_A 10 is for S-NSSAI #A being congested, and any DNN.

In other words, S-NSSAI #A, which is congested, and any DNN may be S-NSSAI #A and any DNN associated with the PDU session for which the network-initiated session management request message and/or network-initiated session management procedure are intended in the present section.

Note that the UE_A 10 and the core network_B 190 may perform an anchor relocation procedure in an SSC mode 2 including the procedure in the present section, and switch to the anchor of a PDU session or to a PDU session with a different anchor to continue communication. Here, the anchor relocation procedure in the SSC mode 2 is a procedure initiated by the core network_B 190, and the procedure involved in transmission of the PDU session release command performed in the procedure may be any procedure described in this section.

Additionally, the UE_A 10 and the core network_B 190 may perform an anchor relocation procedure in an SSC mode 3 including the procedure in the present section, and switch to the anchor of a PDU session or a PDU session with a different anchor to continue communication. Here, the anchor relocation procedure in the SSC mode 3 is a procedure initiated by the core network_B 190, and the procedure involved in transmission of the PDU session modification command performed in the procedure may be any procedure described in this section.

Now, processing will be described that is performed in a case that, with congestion control in effect, the UE makes movement involving a change of the PLMN.

Here, processing will be described in which the UE_A 10 changes the PLMN, particularly while the first type of congestion control is in effect. Here, the first type of congestion control and the processing restricted in a case that the first type of congestion control is applied may be as described above.

Again, the first type of congestion control may be a DNN-based congestion control. For example, the first type of congestion control may be congestion control applied to the UE_A 10 by the NW based on a message indicating rejection of the UE-initiated session management request in a case that the NW receives, from the UE_A 10, the UE-initiated session management request with DNN #A and that the NW detects congestion on a specific DNN, for example, DNN #A. In this case, when the first type of congestion control is applied, the UE_A 10 initiates counting the back-off timer for the first type of congestion control received from the NW and is configured not to transmit the UE-initiated session management request with the DNN #A until the back-off timer expires. Note that "with DNN" may indicate to include DNN information in the UE-initiated session management request such as the PDU session establishment request message.

Here, for description, the first type of congestion control as described above is expressed as "the first type of congestion control for a specific DNN."

Additionally, in the first type of congestion control, on the initiative of the NW, the default DNN may be selected as a congestion control target even in a case that no DNN information is included in the UE-initiated session management request. In other words, the first type of congestion control may be configured to: receive a UE-initiated session management request that does not use DNN information from the UE_A 10 and detects congestion to the default DNN at the NW: Based on the message rejecting the UE-initiated session management request, the NW can be congestion control for application to the UE_A 10. In this case, the application of the first type of congestion control may be configured such that the UE_A 10 initiates counting the back-off timer corresponding to the first type of congestion control received from the NW and refrains from transmitting the UE-initiated session management request without DNN until the back-off timer expires. Note that not using the DNN may be to include no DNN information in the UE-initiated session management request such as the PDU session establishment request message.

Here, for description, the first type of congestion control for the default DNN is applied based on the UE-initiated session management request without DNN information, and is thus expressed as "congestion control for No DNN" to distinguish from the first type of congestion control for a specific DNN. Furthermore, the UE-initiated session management request such as the PDU session establishment request message without DNN is expressed as the UE-initiated session management request using No DNN. For example, the PDU session establishment request message using No DNN is the PDU session establishment request message without DNN.

Upon a PLMN change, in a case that the UE_A 10 has the back-off timer associated with the first type of congestion control for a specific DNN running, or the back-off timer associated with the first type of congestion control for the specific DNN is deactivated, then the UE_A 10 is configured to be able to transmit, in the new PLMN, the PDU session establishment request message with the specific DNN. Accordingly, based on this configuration, the UE_10 may transmit the PDU session establishment request message with the specific DNN.

Here, the UE_A 10 may not stop the running back-off timer and keep the back-off timer running until the timer expires. Alternatively, the UE_A 10 may keep the deactivated back-off timer in a deactivated state.

Thus, the first type of congestion control for the specific DNN may be associated with the PLMN.

For example, in a case that the first type of congestion control for the specific DNN is applied, the UE initiates counting with the back-off timer associated with the PLMN and the specific DNN. In a case that the back-off timer is not zero or deactivated, the UE does not perform, in the PLMN associated with the back-off timer, establishment of a PDU session using the specific DNN associated with the back-off timer. In addition, in a case that the back-off timer is deactivated, the UE does not perform, in the PLMN associated with the back-off timer, establishment of a PDU session using the specific DNN associated with the back-off timer until the terminal is powered off or the USIM is removed. Additionally, in a case that the back-off timer is zero, establishment of a PDU session with the specific DNN associated with the back-off timer may be performed in the PLMN associated with the back-off timer.

In other words, upon a PLMN change, in a case that the UE_A 10 has the back-off timer associated with the first type of congestion control for a specific DNN and old PLMN running, or the back-off timer associated with the first type of congestion control for the specific DNN and the old PLMN is deactivated, and in a case that the back-off timer associated with the first type of congestion control for the specific DNN and new PLMN is not running, and the back-off timer associated with the first type of congestion control for the specific DNN and the new PLMN is not deactivated, then the UE_A 10 is configured to be able to transmit, in the new PLMN, the PDU session establishment request message with the specific DNN. Furthermore, based on this configuration, the UE_10 may transmit the PDU session establishment request message with the specific DNN.

Upon a PLMN change, in a case that the UE_A 10 has the back-off timer associated with the first type of congestion control for No DNN running, or the back-off timer associated with the first type of congestion control for No DNN is deactivated, then the UE_A 10 is configured to be able to transmit, in the new PLMN, the PDU session establishment request message without DNN. Accordingly, based on this configuration, the UE_10 can transmit the PDU session establishment request message with the specific DNN.

Here, the UE_A 10 does not stop the back-off timer being counted by the UE_A 10 and may continue counting until the timer expires. Alternatively, the UE_A 10 may continue to hold the deactivated back-off timer in a deactivated state.

As described above, the first type of congestion control for No DNN may be associated with the PLMN. In other words, upon a PLMN change, in a case that the UE_A 10 has the back-off timer for the first type of congestion control for No DNN associated with old PLMN running, or the back-off timer for the first type of congestion control for No DNN associated with the old PLMN is deactivated, and in a case that the back-off timer for the first type of congestion control for No DNN associated with new PLMN is not running, and the back-off timer for the first type of congestion control for No DNN associated with the PLMN is not deactivated, then the UE_A 10 is configured to be able to transmit, in the new PLMN, the PDU session establishment request message without DNN. Furthermore, based on this configuration, the UE_10 may transmit the PDU session establishment request message without DNN.

As described above, the UE_A 10 may perform similar processing regardless of whether the first type of congestion control is for a specific DNN or for No DNN.

That is, upon a PLMN change, in a case that the UE_A 10 has the back-off timer for the first type of congestion control associated with the unchanged PLMN running, or the back-off timer for the first type of congestion control associated with the unchanged PLMN is deactivated, and in a case that the back-off timer for the first type of congestion control associated with the PLMN resulting from the change is not running, or the back-off timer for the first type of congestion control associated with the PLMN is not deactivated, then the UE_A 10 is configured to be able to transmit, in the new PLMN, the PDU session establishment request message with the specific DNN, restricted by the congestion control associated with the unchanged PLMN, and/or the PDU session establishment request message without DNN.

Alternatively, the UE_A 10 may perform different processing depending on whether the first type of congestion control is for a specific DNN or for No DNN.

Upon a PLMN change, in a case that the UE_A 10 has the back-off timer associated with the first type of congestion control for a specific DNN running, or the back-off timer associated with the first type of congestion control for the specific DNN is deactivated, then the UE_A 10 is configured not to perform, in the new PLMN, transmission of the PDU session establishment request message using the specific DNN. Accordingly, based on this configuration, the UE_10 may be restricted from transmitting the PDU session establishment request message with the specific DNN.

Here, the UE_A 10 does not stop the back-off timer being counted by the UE_A 10 and may continue counting until the timer expires. Alternatively, the UE_A 10 may continue to hold the deactivated back-off timer in a deactivated state.

Thus, the first type of congestion control for a specific DNN may also be applied in a different PLMN.

On the other hand, upon a PLMN change, in a case that the UE_A 10 has the back-off timer associated with the first type of congestion control for No DNN running, or the back-off timer associated with the first type of congestion control for No DNN is deactivated, the UE_A 10 is configured to be able to transmit, in the new PLMN, the PDU session establishment request message without DNN. Accordingly, based on this configuration, the UE_10 may transmit the PDU session establishment request message with the specific DNN.

Here, the UE_A 10 does not stop the back-off timer being counted by the UE_A 10 and may continue counting until the timer expires. Alternatively, the UE_A 10 may continue to hold the deactivated back-off timer in a deactivated state.

As described above, the first type of congestion control for No DNN may be associated with the PLMN.

For example, in a case that the first type of congestion control for No DNN is applied, the UE initiates counting with the back-off timer associated with the PLMN and No DNN. In a case that the back-off timer is not zero or deactivated, the UE does not perform, in the PLMN associated with the back-off timer, establishment of a PDU session using No DNN associated with the back-off timer. Additionally, in a case that the back-off timer is deactivated, the UE does not perform, in the PLMN associated with the back-off timer, establishment of a PDU session using No DNN associated with the back-off timer until the terminal is powered off or the USIM is removed. Additionally, in a case that the back-off timer is zero, establishment of a PDU session using No DNN associated with the back-off timer may be performed in the PLMN associated with the back-off timer.

In other words, upon a PLMN change, in a case that the UE_A 10 has the back-off timer for the first type of congestion control for No DNN associated with old PLMN running, or the back-off timer for the first type of congestion control for No DNN associated with the old PLMN is deactivated, and in a case that the back-off timer for the first type of congestion control for No DNN associated with new PLMN is not running, or the back-off timer for the first type of congestion control for No DNN associated with the PLMN is not deactivated, then the UE_A 10 is configured to be able to transmit, in the new PLMN, the PDU session establishment request message without DNN. Furthermore, based on this configuration, the UE_10 may transmit the PDU session establishment request message without DNN.

Here, as processing associated with a change of the PLMN described above, whether similar processing is to be performed regardless of whether the first type of congestion control is for a specific DNN or for No DNN or different processing is to be performed may be configured in advance based on information configured in the UE_A 10, but may be determined depending on whether a second PLMN resulting from the change is a PLMN equivalent to the first PLMN unchanged or not. For example, in a case that the second PLMN resulting from the change is not a PLMN equivalent to the first PLMN unchanged, similar processing may be applied. Additionally, in a case that the second PLMN resulting from the change is a PLMN equivalent to the first PLMN unchanged, different processing may be performed.

Note that in the present embodiment, the expression "back-off timer is deactivated" may be equivalent to the expression "back-off timer and/or the congestion control associated with the back-off timer transitions to a deactivated state." Note that, in a case of receiving a timer value indicating deactivation, the UE_A 10 may deactivate the back-off timer and/or the congestion control associated with the back-off timer.

Here, the back-off timer to be deactivated and/or the congestion control associated with the back-off timer to be deactivated may be associated with one to four types of congestion control. Which type of congestion control is associated with the back-off timer to be deactivated and/or the congestion control associated with the back-off timer to be deactivated may be similarly determined and recognized in a case that the back-off timer value is received.

More specifically, the UE_A 10 may receive, from the NW, the 14th and 15th pieces of identification information indicating that the back-off timer and/or the congestion control associated with the back-off timer is to be deactivated, and deactivate the back-off timer corresponding to the type of congestion control indicated by the 15th piece of identification information.

Additionally, with the back-off timer and/or congestion control deactivated, the application of the congestion control may continue until the terminal is powered off or the USIM is removed. Furthermore, the processing restricted at this time may be similar to the processing restricted in a case that the back-off timer is counted in accordance with the type of the congestion control.

Although the above description of the processing by the UE_A 10 and NW involved upon a PLMN change is directed to the first type of congestion control and/or the back-off timer for the first type of congestion control, similar processing may be performed for the second, third, and the fourth types of congestion control. However, the PDU session establishment request message for which the transmission is restricted or accepted may be a message corresponding to each type. In other words, the congestion control and/or the back-off timer associated with the congestion control may be associated with the PLMN regardless of the type of congestion control. Alternatively, the configuration may be such that any type of congestion control and/or the back-off timer associated with the congestion control is associated with the PLMN. Thus, the first, second, and third types of congestion control may be configured such that the congestion control and/or the back-off timer associated with congestion control are associated with the PLMN. Alternatively, the first, second, and third types of congestion control for No DNN may be configured such that the congestion control and/or the back-off timer associated with congestion control is associated with a PLMN, and the first type of congestion control for a specific DNN need not be associated with the PLMN. Note that processing performed in a case that each type of congestion control is associated with the PLMN and/or processing related to the back-off timer corresponding to each type of congestion control may correspond to the description of the processing for the first type of congestion control associated with the PLMN and/or the processing related to the back-off timer corresponding to the first type of congestion control associated with the PLMN in which the first type of congestion control is replaced with the second to fourth types of congestion control. Additionally, processing performed in a case that each type of congestion control is not associated with the PLMN and/or processing related to the back-off timer corresponding to each type of congestion control may correspond to the above description of the processing for the first type of congestion control not associated with the PLMN and/or the processing related to the back-off timer corresponding to the first type of congestion control not associated with the PLMN in which the first type of congestion control is replaced with each of the second to fourth types of congestion control. However, as described above, the PDU session establishment request message for which the transmission is restricted or accepted may be a message corresponding to each type.

Additionally, in the description of the present embodiment, the expression "NW transmits to the UE_A 10," may mean that the AMF or the SMF transmits to the UE_A 10, and the expression "UE_A 10 transmits to the NW," may mean that the UE_A 10 transmits to the AMF or the SMF. Furthermore, the expression "NW receives from the UE_A 10" may mean that the AMF or the SMF receives from the UE_A 10, and the expression "UE_A 10 receives from the NW" may mean that the UE_A 10 receives from the AMF or the SMF.

2. Modified Examples

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. Furthermore, in a case that a circuit integration technology that replaces the present integrated circuit appears with advances in semiconductor technology, one or more aspects of the present invention can also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
6 PDN_A
10 UE_A
20 UTRAN_A
22 NB_A
24 RNC_A
30 PGW_A
35 SGW_A
40 MME_A
45 eNB_A
50 HSS_A
80 E-UTRAN_A
90 Core network_A
120 NG-RAN_A
122 NR node_A
190 Core network_B
230 SMF_A
235 UPF_A
239 UPF_C
240 AMF_A

The invention claimed is:

1. A User Equipment (UE) comprising:
transmitting and receiving circuitry, wherein
upon Public Land Mobile Network (PLMN) change, in a case that first timer is running for a Data Network Name (DNN) and old PLMN, but second timer is not running and is not deactivated for the DNN and new PLMN, the transmitting and receiving circuitry is allowed to send a PDU (Protocol Data Unit) SESSION ESTABLISHMENT REQUEST message for the DNN in the new PLMN without stopping the first timer.

2. The UE according to claim 1, wherein the first timer and the second timer are timers for DNN based congestion control.

3. A User Equipment (UE) comprising:
transmitting and receiving circuitry, wherein
upon Public Land Mobile Network (PLMN) change, in a case that first timer is running for no Data Network Name (DNN) and old PLMN, but second timer is not running and is not deactivated for no DNN and new PLMN, the transmitting and receiving circuitry is allowed to send a PDU (Protocol Data Unit) SESSION ESTABLISHMENT REQUEST message for no DNN in the new PLMN without stopping the first timer.

4. The UE according to claim 3, wherein the first timer and the second timer are timers for DNN based congestion control.

5. A communication control method performed by a User Equipment (UE), the communication control method comprising:
upon Public Land Mobile Network (PLMN) change, in a case that first timer is running for a Data Network Name (DNN) and old PLMN, but second timer is not running and is not deactivated for the DNN and new PLMN, sending a PDU (Protocol Data Unit) SESSION ESTABLISHMENT REQUEST message for the DNN in the new PLMN without stopping the first timer.

* * * * *